United States Patent
Andreou

(10) Patent No.: US 12,033,191 B2
(45) Date of Patent: *Jul. 9, 2024

(54) GENERATION, CURATION, AND PRESENTATION OF MEDIA COLLECTIONS WITH AUTOMATED ADVERTISING

(71) Applicant: Snap Inc., Santa Monica, CA (US)

(72) Inventor: Jacob Andreou, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,376

(22) Filed: Mar. 29, 2023

(65) Prior Publication Data
US 2023/0237535 A1    Jul. 27, 2023

Related U.S. Application Data

(63) Continuation of application No. 17/119,412, filed on Dec. 11, 2020, now Pat. No. 11,640,625, which is a (Continued)

(51) Int. Cl.
*G06Q 30/02* (2023.01)
*G06F 3/04847* (2022.01)
(Continued)

(52) U.S. Cl.
CPC ..... *G06Q 30/0276* (2013.01); *G06F 3/04847* (2013.01); *G06F 40/166* (2020.01)

(58) Field of Classification Search
CPC .............. G06Q 30/02; G06Q 30/0276; G06Q 30/0254; G06Q 10/067; G06Q 30/0246; (Continued)

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

Ruxandra Paun, Methods, systems, and media for presenting ticker content with video content (Engish (United States)), The IP.com Prior Art Database, May 2, 2014 (Year: 2014).*

(Continued)

*Primary Examiner* — Marilyn G Macasiano
(74) *Attorney, Agent, or Firm* — Schwegman Lundberg & Woessner, P.A.

(57) ABSTRACT

Systems, devices, media, instructions, and methods for computer based automated content generation, curation, and presentation are described. In one embodiment a content collection is generated with a first continuous presentation group by associating a first content element from a first content message of the plurality of content messages and a second content element from a second content message of the plurality of content messages to associate the first content element and the second content element as the first continuous presentation group. Advertising element placement within the presentation order for the first media collection is determined, and adjusted to avoid interrupting the continuous presentation group. In other embodiments, various advertising patterns are used and adjusted based on curated presentation groups within content collections.

20 Claims, 38 Drawing Sheets

Related U.S. Application Data continuation of application No. 16/548,758, filed on Aug. 22, 2019, now Pat. No. 10,885,559, application No. 18/192,376, filed on Mar. 29, 2023 is a continuation of application No. 15/195,655, filed on Jun. 28, 2016, now Pat. No. 10,430,838.

(51) Int. Cl.
 *G06F 40/166* (2020.01)
 *G06Q 30/0241* (2023.01)

(58) Field of Classification Search
 CPC ............ G06Q 30/0207; G06F 3/04847; G06F 40/166; G06F 3/04817; G11B 27/031; G11B 27/28; H04N 21/23424; H04N 21/2668; H04N 21/812
 See application file for complete search history.

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Brondrup | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,639,386 B1 * | 12/2009 | Siegel .................... | G06Q 40/03 358/1.18 |
| 7,639,943 B1 | 12/2009 | Kalajan | |
| 7,650,231 B2 | 1/2010 | Gadler | |
| 7,668,537 B2 | 2/2010 | DeVries | |
| 7,706,740 B2 * | 4/2010 | Collins .................. | H04H 60/13 455/3.06 |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |
| 8,312,086 B2 | 11/2012 | Velusamy et al. | |
| 8,312,097 B1 | 11/2012 | Siegel et al. | |
| 8,326,315 B2 | 12/2012 | Phillips et al. | |
| 8,326,327 B2 | 12/2012 | Hymel et al. | |
| 8,332,475 B2 | 12/2012 | Rosen et al. | |
| 8,352,546 B1 | 1/2013 | Dollard | |
| 8,379,130 B2 | 2/2013 | Forutanpour et al. | |

(56) References Cited

U.S. PATENT DOCUMENTS

| | | |
|---|---|---|
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,351,027 B2 * | 5/2016 | Carlucci ............ H04N 21/4335 |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,430,838 B1 | 10/2019 | Andreou |
| 10,885,559 B1 | 1/2021 | Andreou |
| 11,640,625 B2 | 5/2023 | Andreou |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0162396 A1* | 7/2007 | Goldman ............... G06F 16/954 |
| | | 705/51 |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |

(56) References Cited

U.S. PATENT DOCUMENTS

| | | |
|---|---|---|
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0112903 A1* | 5/2011 | Goldman ............ G06F 16/954 706/47 |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |

(56) References Cited

U.S. PATENT DOCUMENTS

| | | |
|---|---|---|
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |

(56) References Cited

U.S. PATENT DOCUMENTS

| | | | |
|---|---|---|---|
| 2016/0182422 | A1 | 6/2016 | Sehn et al. |
| 2016/0182875 | A1 | 6/2016 | Sehn |
| 2016/0239248 | A1 | 8/2016 | Sehn |
| 2016/0277419 | A1 | 9/2016 | Allen et al. |
| 2016/0321708 | A1 | 11/2016 | Sehn |
| 2017/0006094 | A1 | 1/2017 | Abou Mahmoud et al. |
| 2017/0061308 | A1 | 3/2017 | Chen et al. |
| 2017/0287006 | A1 | 10/2017 | Azmoodeh et al. |
| 2021/0201364 | A1 | 7/2021 | Andreou |

FOREIGN PATENT DOCUMENTS

| | | | | | |
|---|---|---|---|---|---|
| EP | 2151797 | A1 | | 2/2010 | |
| GB | 2399928 | A | | 9/2004 | |
| JP | 2016-505996 | A | * | 2/2016 | ............ G09F 19/00 |
| JP | 2016505996 | A | | 2/2016 | |
| KR | 19990073076 | A | | 10/1999 | |
| KR | 20010078417 | A | | 8/2001 | |
| TW | 200941381 | A | * | 10/2009 | ............ G06Q 30/00 |
| WO | WO-1996024213 | A1 | | 8/1996 | |
| WO | WO-1999063453 | A1 | | 12/1999 | |
| WO | WO-2000058882 | A1 | | 10/2000 | |
| WO | WO-2001029642 | A1 | | 4/2001 | |
| WO | WO-2001050703 | A3 | | 7/2001 | |
| WO | WO-2006118755 | A2 | | 11/2006 | |
| WO | WO-2007082190 | A2 | | 7/2007 | |
| WO | WO-2007092668 | A2 | | 8/2007 | |
| WO | WO-2009043020 | A2 | | 4/2009 | |
| WO | WO-2011040821 | A1 | | 4/2011 | |
| WO | WO-2011119407 | A1 | | 9/2011 | |
| WO | WO-2013008238 | A1 | | 1/2013 | |
| WO | WO-2013045753 | A1 | | 4/2013 | |
| WO | WO-2014006129 | A1 | | 1/2014 | |
| WO | WO-2014068573 | A1 | | 5/2014 | |
| WO | WO-2014115136 | A1 | | 7/2014 | |
| WO | WO-2014194262 | A2 | | 12/2014 | |
| WO | WO-2015192026 | A1 | | 12/2015 | |
| WO | WO-2016044424 | A1 | | 3/2016 | |
| WO | WO-2016054562 | A1 | | 4/2016 | |
| WO | WO-2016065131 | A1 | | 4/2016 | |
| WO | WO-2016100318 | A2 | | 6/2016 | |
| WO | WO-2016100318 | A3 | | 6/2016 | |
| WO | WO-2016100342 | A1 | | 6/2016 | |
| WO | WO-2016149594 | A1 | | 9/2016 | |
| WO | WO-2016179166 | A1 | | 11/2016 | |

OTHER PUBLICATIONS

Abhinav Shukla; Shruti Shriya Gullapuram; Harish Katti; Mohan Kankanhalli; Stefan Winkler; Ramanathan Subramanian, Recognition of advertisement Emotions with Application tom Computational Advertising(English), IEEE Transactions on Affective Computing (vol. PP, Issue: 99, p. 1), Jan. 6, 2020 (Year: 2020).*

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/195,655, Non Final Office Action dated Jan. 25, 2019", 9 pgs.

"U.S. Appl. No. 15/195,655, Notice of Allowance dated May 16, 2019", 8 pgs.

"U.S. Appl. No. 15/195,655, Response filed Apr. 25, 2019 to Non Final Office Action dated Jan. 25, 2019", 11 pgs.

"U.S. Appl. No. 16/548,758, Notice of Allowance dated Sep. 4, 2020", 8 pgs.

"U.S. Appl. No. 16/548,758, Preliminary Amendment filed Sep. 9, 2019", 9 pgs.

"U.S. Appl. No. 17/119,412, Advisory Action dated Nov. 3, 2022", 2 pgs.

"U.S. Appl. No. 17/119,412, Final Office Action dated Jul. 29, 2022", 8 pgs.

"U.S. Appl. No. 17/119,412, Non Final Office Action dated Jan. 6, 2022", 9 pgs.

"U.S. Appl. No. 17/119,412, Notice of Allowance dated Dec. 19, 2022", 9 pgs.

"U.S. Appl. No. 17/119,412, Response filed May 6, 2022 to Non Final Office Action dated Jan. 6, 2022", 9 pgs.

"U.S. Appl. No. 17/119,412, Response filed Oct. 27, 2022 to Final Office Action dated Jul. 29, 2022", 9 pgs.

"U.S. Appl. No. 17/119,412, Response filed Nov. 29, 2022 to Advisory Action dated Nov. 3, 2022", 9 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

"Surprise!", [Online] Retrieved from the Internet: <URL: https://www.snap.com/en-US/news/post/surprise>, (Oct. 3, 2013), 1 pg.

"System, method and computer program Product for presenting an advertisement within content", The IP.com Prior Art Database, (Nov. 29, 2006).

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

(56) References Cited

OTHER PUBLICATIONS

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term =.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Ruxandra, Paun, "Methods, systems, and media for presenting ticker content with video content", (English (United States)), The IP.com Prior Art Database, (May 2, 2014).

Shukla, Abhinav, et al., "Recognition of Advertisement Emotions with Application to Computational Advertising(English)", (Jan. 6, 2020), 1.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

\* cited by examiner

RECEIVING, AT A SERVER COMPUTER, A PLURALITY OF CONTENT MESSAGES FROM A PLURALITY OF CONTENT SOURCES, EACH CONTENT MESSAGE COMPRISING MEDIA CONTENT, AND EACH CONTENT MESSAGE BEING ASSOCIATED WITH A FIRST MEDIA COLLECTION
1202

GENERATING A PRESENTATION ORDER FOR THE FIRST PLURALITY OF MESSAGES OF THE FIRST MEDIA COLLECTION
1204

GENERATING A FIRST CONTINUOUS PRESENTATION GROUP BY ASSOCIATING A FIRST CONTENT ELEMENT FROM A FIRST CONTENT MESSAGE OF THE PLURALITY OF CONTENT MESSAGES AND A SECOND CONTENT ELEMENT FROM A SECOND CONTENT MESSAGE OF THE PLURALITY OF CONTENT MESSAGES TO ASSOCIATE THE FIRST CONTENT ELEMENT AND THE SECOND CONTENT ELEMENT AS THE FIRST CONTINUOUS PRESENTATION GROUP
1206

DETERMINING ADVERTISING ELEMENT PLACEMENT WITHIN THE PRESENTATION ORDER FOR THE FIRST MEDIA COLLECTION
1208

ADJUSTING PLACEMENT OF A FIRST ADVERTISING ELEMENT WITHIN THE PRESENTATION ORDER BASED ON THE ASSOCIATION BETWEEN THE FIRST CONTENT ELEMENT AND THE SECOND CONTENT ELEMENT AS THE CONTINUOUS PRESENTATION GROUP TO GENERATE AN ADJUSTED PRESENTATION ORDER
1210

*FIG. 12*

GENERATION, CURATION, AND PRESENTATION OF MEDIA COLLECTIONS WITH AUTOMATED ADVERTISING

PRIORITY

This application claims the benefit of priority of U.S. patent application Ser. No. 17/119,412, filed Dec. 11, 2020, which application is a continuation of and claims the benefit of priority of U.S. patent application Ser. No. 16/548,758, filed Aug. 22, 2019, now issued as U.S. Pat. No. 10,885,559, which application is a continuation of and claims the benefit of priority of U.S. patent application Ser. No. 15/195,655, filed on Jun. 28, 2016, now issued as U.S. Pat. No. 10,430,838, which is hereby incorporated by reference herein in its entirety.

BACKGROUND

In the modern Internet era, many news sources have fragmented, but core aspects of news gathering and presentation often remain associated with professional journalists gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer. Additionally, presentation of ads along with news has long been a source of support for news creators.

BRIEF DESCRIPTION OF THE DRAWINGS

Various ones of the appended drawings merely illustrate example embodiments of the present disclosure and should not be considered as limiting its scope.

FIG. 2B is an example user interface for viewing a calendar view of media collections, according to some example embodiments.

FIG. 2C-2D are example user interfaces for creating a media collection, according to some example embodiments.

FIG. 2F-2H are example user interfaces to view operators working on media collections, according to some example embodiments.

FIG. 12 illustrates a method for communicating content elements with automated advertising in accordance with some embodiments.

DETAILED DESCRIPTION

Figure 1:
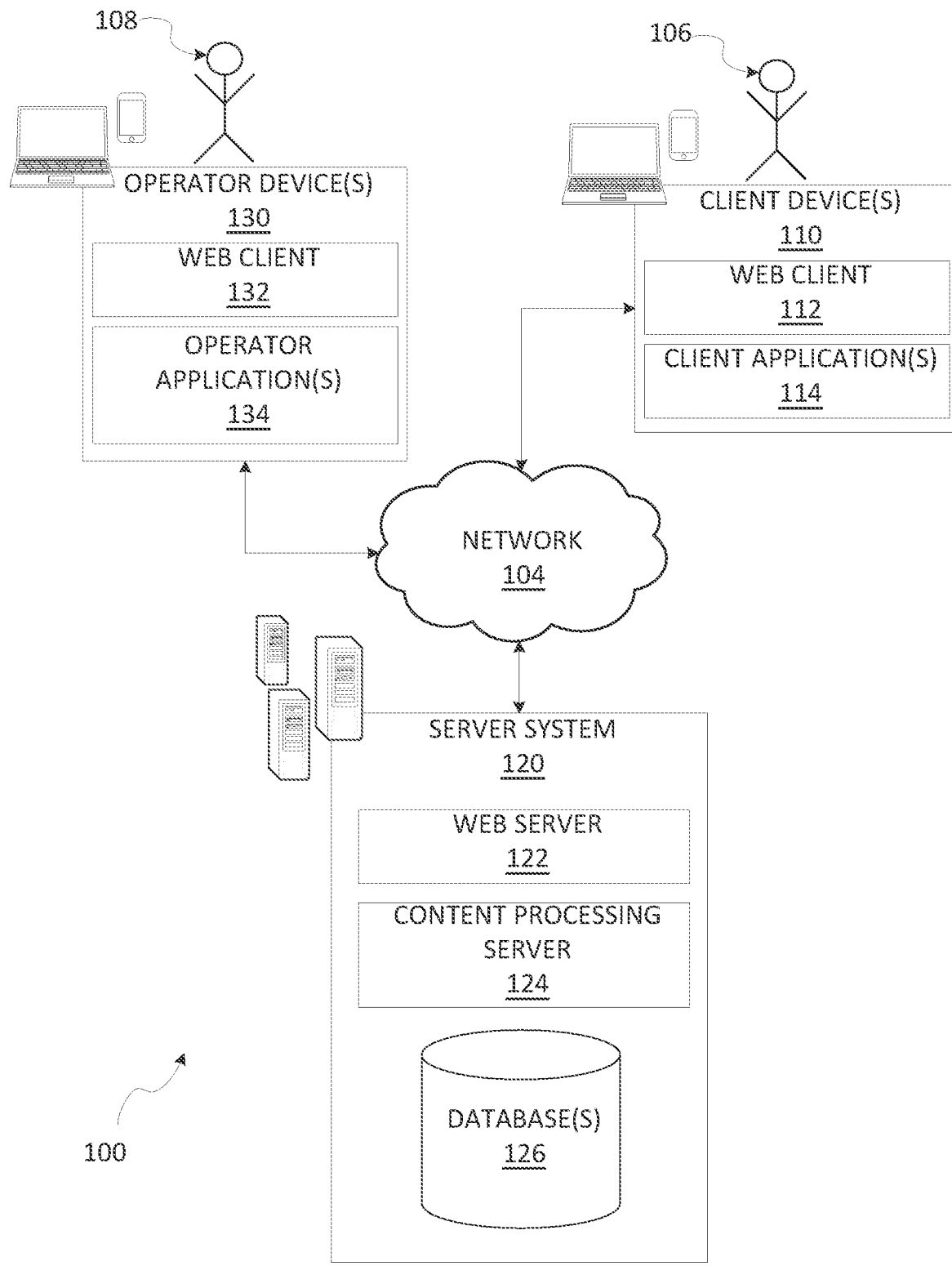
FIG. 1 is a block diagram illustrating a networked system, according to some example embodiments.

Systems and methods described herein relate to automated advertisement systems that accompany computer assisted story generation, curation, and presentation from received content. In some embodiments, advertisements are automatically inserted into content or media collections. Curators or operators may gather together content, such as, photos, video, audio, text, metadata, and other media content from content messages to put together one or more media collections or stories. These media collections may be based on a certain geolocation, event, topic, common user interest, product, etc. A content curator may modify the automatic advertisement integration with content collections based on identification of coherent groups of content to prevent the content groupings from being interrupted by advertisements which may not be related to the content. The content messages may be sent by users (e.g., users in a particular geolocation, users attending a particular event, users sharing a particular interest, etc.) using client devices. A server system may receive tens of thousands of content messages (if not more) for each media collection that need to be reviewed by the system or a curator to choose what content to include in one or more media collections. These media collections may be referred to as "stories." Moreover, many media collections may be time sensitive or "live" stories (e.g., only available for a certain window of time such as a 24 hour period, during a particular event, etc.). Accordingly, methods and systems are described that provide tools to assist a system and curator to be able to quickly curate such a high volume of content messages into media collections for immediate, ongoing, or periodic posting, as well as for integrating advertising with such media collections.

In one example embodiment, systems and methods are provided for receiving, at a server computer, content messages from various content sources (e.g. smartphone users), each content message comprising media content or content elements (e.g. images, video clips, etc.) For each of the content messages received, the media content is associated with the predetermined media collection, and the content message is stored in a database. In some embodiments, the plurality of content messages are displayed on an operator device with other content messages associated with the media collection. In some embodiments, a predetermined trigger related to the media collection may be activated, and in response, an identifier of the media collection is updated from a first indicator to a second indicator. This update notifies a user of the change (e.g. with a display alert or update) and indicates that an action needs to be taken on the media collection. The content in the database is sorted into a presentation order either automatically, or by an operator of a curation tool. Advertising elements are automatically inserted into the presentation order, and the content elements and advertising elements are sent to client devices to be displayed in the presentation order when the client devices request the media collection. In various embodiments, curation selection of content elements may be automatically integrated with advertising elements in a variety of ways as described in detail below.

In one embodiment, a media collection may be directed to recent basketball games, and may include content elements from content messages (e.g. video clips up to 10 seconds long or images presented for up to 10 seconds) related to a basketball game that is in progress. The media collection may have advertising that is automatically inserted between content elements of the content collection at predetermined periodic spacing. For example, an advertising element (e.g. video, image, audio, network link, etc.) may be inserted between content elements every five minutes, between every 15 pieces of content, or in some other automated format. When particular events of interest occur during the basketball game, a server may receive content messages that include new information not currently in the media collection. This may include content for particularly interesting play, or an ending play with a final score. These content messages are stored in a database, and a trigger (e.g. a spike in content messages or a time since the last review of related content messages) may create an alert indicating that the media collection should be reviewed for an update based on the content messages received. Such an alert may be placed on the display of a curator that is associated with the media collection. When the curator adjusts the content collection, the curator may identify groups of content elements within the collection that block the automatic presentation of advertising elements before, after, or between certain content elements.

For example, while a basketball game is ongoing, a media collection may include highlight clips of the game, and may allow advertising elements between any content elements that show game highlights. When the game ends, different content elements showing the final moments of the game, a final score, and post-game comments may be received as separate content elements that can be grouped as part of a media collection. A content curator may identify these content elements as related in a way that should not be interrupted by advertising, and can add structures to the media collection using a curation tool to create continuous groups of content elements that prevent the automatic insertion of ads between these content elements.

Similarly, in another embodiment, a content collection including multiple clips from multiple different basketball games may be curated to have content elements from individual games grouped together and identified to prevent ads between content elements from a single game, but to allow advertising elements between clips from different games.

In another embodiment, a media collection is associated with recent content from a particular geographic area. As content elements are received from users, they are automatically placed into a content collection. The best individual content elements are sorted for presentation on user devices that request the media collection. This sorting may be based on operator curation, or a combination of both automatic selection and operator curation. The content and the order of the content displayed to a user changes over time as new content elements are received and older content elements are removed. In some media collections, the content elements (e.g. images or video clips) are unrelated, other than being recent and captured within the geographic area. For such media collections, advertising is inserted at set points within the collection as it is displayed on a user device (e.g. after a certain number of pieces of content or a certain viewing time). Some content elements, however, may show different perspectives of the same event, exact location, or may be otherwise related. A content curator can identify these content elements as related, and delay or block presentation of an advertising element between these content elements. After these elements of the content collection are displayed to a user viewing the collection, advertising placement resumes as the user continues watching the content collection.

In some embodiments, advertising elements may be automatically integrated with content elements based on actual display times for content and advertising. Presentation orders for content elements and advertising elements may be adjusted based on a target ratio of advertising to content compared with an actual display time of advertising versus content. In embodiments which allow skipping of advertising, shorter times between advertising elements and longer sequences of add elements may be used to increase the ratio of advertising to content actually displayed on a client device. Similarly, when a user interacts with one or more advertising elements for an extended period, the time until a next advertising element is displayed may be extended, or fewer advertising elements may be used in the next continuous block or blocks of advertising elements.

FIG. 1 is a block diagram illustrating a networked system 100, according to some example embodiments. System 100 includes one or more client devices 110. System 100 further includes one or more operator devices 130, a server system 120, and a network 104 that is used to convey communications between client devices 110, operator device(s) 130, and the server system 120. For example, the networked system 100 may be a messaging system where clients may communicate and exchange data within the networked system 100. In some embodiments, for example, client device 110 capture ephemeral content using an application 112 or 114. The ephemeral content is not directly storable on client device 110 for longer than a threshold period of time, and is either communicated to server system 120 within the threshold period of time as part of a content message, or remove from the client device. Each ephemeral content element (e.g. an individual video clip or image) may also be associated with a display time or deletion trigger, such that each piece of content is associated with a limited display time. In some embodiments, video clips have a maximum run-time, and images have a maximum display time. This display time or deletion trigger may be stored as metadata with the content element as communicated as a content message from client devices 110 to server system 120. In some embodiments, the content messages are received at server system 120, and the content elements and any associated metadata are stored in databases 126. Content elements having metadata associating the content element with a particular media collection (e.g. within a geographic area, associated with a content tag describing similar content, capture time, etc.) are sorted into a presentation order. Another client device 110 may request to view a media collection, and the ordered content elements are sent from server system 120 to the requesting client device 110, along with any advertising elements inserted by the server system 120, content processing server 124, or an operator device 130.

The client device(s) 110 may comprise, but is not limited to, a mobile phone, desktop computer, laptop computer, portable digital assistants (PDAs), smart phones, tablet, phablet ultra-books, network-enabled camera, netbooks, multi-processor systems, microprocessor-based or programmable consumer electronics, game consoles, set-top boxes, computers in vehicles, or any other communication device that a user may utilize to access the networked system 100.

The client device 110 may include a camera device for capturing content, or may be coupled to a separate camera device that is used to capture the content (e.g., video, photographs, audio, etc.) prior to sending to server system 120 or other client devices 110. Some embodiments may include wearable devices such as a pendant with an integrated camera that is coupled to a client device 110. Other embodiments may include other associated devices with an integrated camera that may be wearable, such as a watch, eyeglasses, clothing, such as a hat or jacket with integrated electronics, a clip-on electronic device, or any other such devices that may communicate or be integrated with a client device 110.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more applications 114 (also referred to as "apps") such as, but not limited to, a web browser, messaging application, electronic mail (email) application, an e-commerce site application, a mapping or location application, a news or media application, and the like. In some embodiments, one or more applications 114 may be included in a given one of the client device 110, and configured to locally provide the user interface and at least some of the functionalities with the application 114 configured to communicate with other entities in the system 100 (e.g., operator device(s) 130, server system 120, etc.), on an as needed basis, for data and/or processing capabilities not locally available (e.g., access to various information, to authenticate a user 106, to verify a method of payment, to retrieve/synchronize footprints, etc.). Conversely, one or more applications 114 may not be included in the client device 110, and then the client device 110 may use its web browser to access the one or more applications hosted on other entities in the system 100 (e.g., operator device(s) 130, server system 120, etc.).

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., operator device(s) 130, server system 120, other client device(s) 110, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

An operator device(s) 130 may include, but is not limited to, a mobile phone, desktop computer, laptop computer, portable digital assistants (PDAs), smart phones, tablet, phablet ultra-books, network-enabled camera, netbooks, multi-processor systems, microprocessor-based or programmable consumer electronics, game consoles, set-top boxes, computers in vehicles, or any other communication device that a user or operator 108 may utilize to access the networked system 100.

The operator device(s) 130 may access the various data and applications provided by other entities in the system 100 via a web client 132 (e.g., a browser, such as the Internet Explorer® browser developed by Microsoft® Corporation of Redmond, Washington State) or one or more operator applications 134. The operator device(s) 130 may include one or more operator application(s) 134 (also referred to as "apps") such as, but not limited to, a web browser, messaging application, media curation tool, electronic mail (email) application, an e-commerce site application, a mapping or location application, a news or media application, and the like. In some embodiments, one or more applications 134 may be included in a given one of the operator device(s) 130, and configured to locally provide the user interface and at least some of the functionalities with the application 134 configured to communicate with other entities in the system 100 (e.g., client devices 110, server system 120, etc.), on an as needed basis, for data and/or processing capabilities not locally available (e.g., access to various information, to authenticate a user 106 or operator 108, to verify a method of payment, to retrieve/synchronize footprints, etc.). Conversely, one or more applications 134 may not be included in the operator device(s) 130, and then the operator device 134 may use its web browser to access the one or more applications hosted on other entities in the system 100 (e.g., server system 120, etc.).

One or more operators 108 may be a person, a machine, or other means of interacting with the operator device 130 (e.g., a user such as a curator or operator). In example embodiments, the operator 108 may not be part of the system 100, but may interact with the system 100 via the operator device 130 or other means. For instance, the operator 108 may provide input (e.g., touch screen input or alphanumeric input) to the operator device 130 and the input may be communicated to other entities in the system 100 (e.g., client device(s) 110, server system 120, etc.) via the network 104. In this instance, the other entities in the system 100, in response to receiving the input from the operator 108, may communicate information to the operator device 130 via the network 104 to be presented to the operator 108.

In this way, the operator 108 may interact with the various entities in the system 100 using the operator device 130.

The client device(s) 110 and the operator device(s) 130 are connected to the server system 120 via a network 104. The network 104 may include any combination of wired and wireless connections. This may include cellular access networks, access point interfaces to the internet, or any other such networks 104 or network elements. For example, a client device 110 may interface with network 104 using a Long Term Evolution (LTE) cellular network to communicate with server system 120. Or a client device 110 may use a Wi-Fi access point to interface with network 104 and communicate with server system 120.

Server system 120 may be one or more computing devices as part of a service or network computing system. In certain embodiments, particularly embodiments with large numbers of client devices 110 interfacing with a server system 120 from widely different locations all over the globe, server system 120 may be a distributed network of server computers that are similarly widely distributed, and which communicate with each other via network 104. The server system 120 may include a web server 122, and a content processing server 124, that may be communicatively coupled with one or more databases 126. Databases 126 may be storage devices that store information such as data related to content messages, media collections, etc.

The content processing server 124 may provide functionality to perform various computer assisted media collection generation, curation, advertisement insertion, and presentation from received content (as examples). The content processing server 124 may access one or more databases 126 to retrieve stored data to use in computer assisted media collection generation, curation, advertisement insertion, and presentation from received content.

In some embodiments, client devices 110, operator device(s) 130, and any elements of server system 120 and network 104, may be implemented using elements of software architecture 902 or machine 1000 described in FIGS. 9 and 10.

Networked system 100 may be used in communication of content messages from client devices 110 to a server system 120, and communication of media collections from the server system 120 to the client devices 110. A client device 110 may communicate content messages to server system 120, and a client device 110 may receive media collections from server system 120. In addition to this functionality of the embodiments described herein, client device 110 may additionally receive private pieces of content and communications from other users 106, and may convey a personal story or media collection to server system 120, with the personal story or media collection including images and or video from content messages generated by client device 110, another device coupled to client device 110, or other users 106. Similarly, client device 110 sends content messages and receives stories or media collections, and may additionally perform other actions.

In one example embodiment, an operator application 134 may include a media curation tool. The media curation tool may allow an operator 108 to create new media collections, view a list of media collections, view a plurality of content items or content messages associated with a predetermined media collection, curate content into media collections for immediate, ongoing, or periodic posting, etc. The plurality of media content may be received by server system 120 in a plurality of content messages from a plurality of users 106 (e.g., via client devices 110).

Figure 2A:
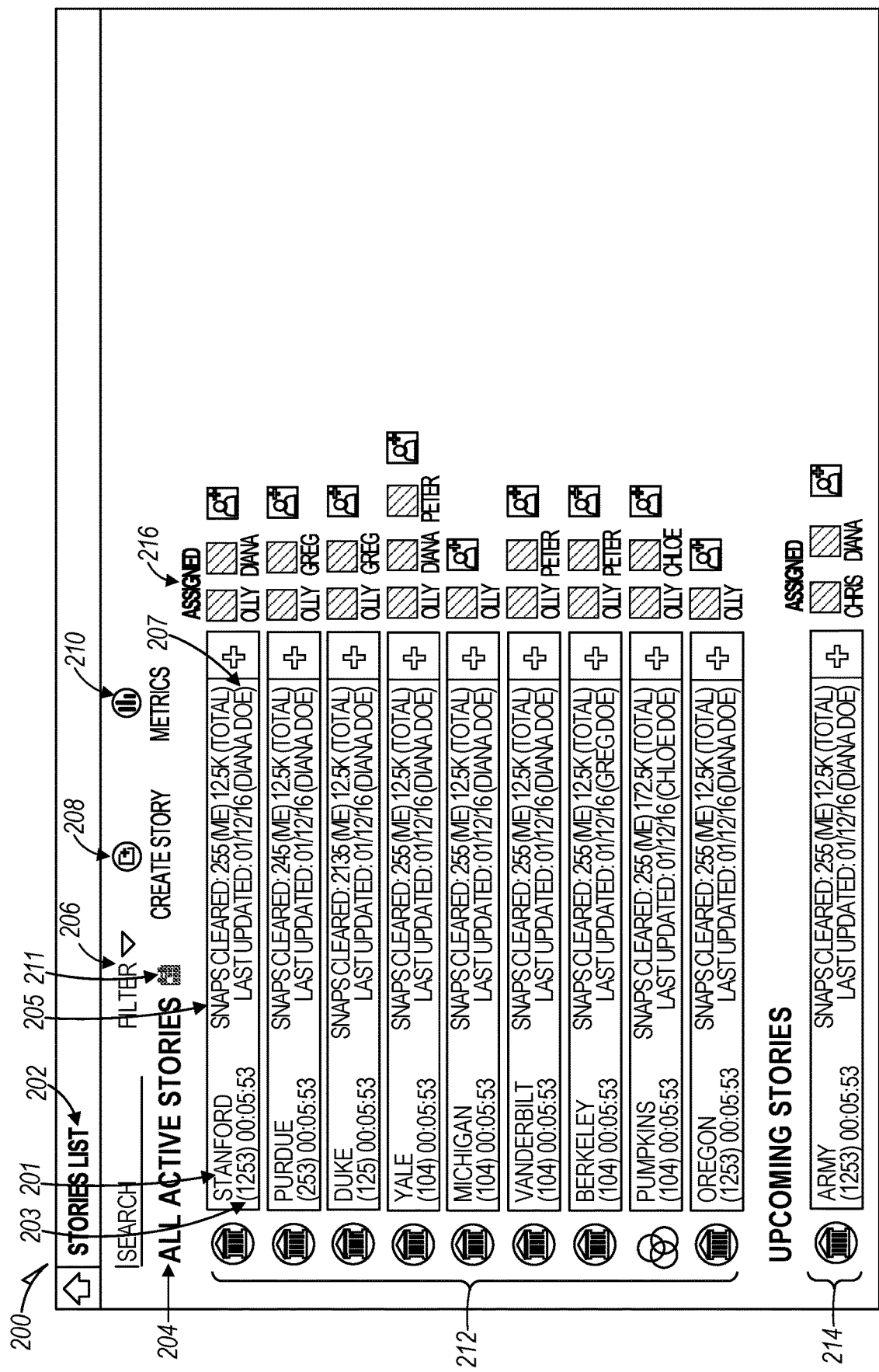
FIG. 2A is an example user interface for viewing a list of media collections, according to some example embodiments.

Using the curation tool, an operator 108 may be able to view a list of all of the media collections that are active, planned, or archived. For example, using the curation tool, the operator 108 may provide an indication to view a list of media collections (e.g., press a button, select an option, click on an icon, etc.). An example user interface 200 is shown in FIG. 2A. The example user interface 200 may display a list of media collections (e.g., stories list 202). The user interface 200 may allow an operator 108 to search for a particular media collection, by providing an area 204 for an operator 108 to enter search criteria. For example, the operator 108 may enter a media collection identifier, a media collection name, keywords, etc. The user interface 200 also provides a mechanism 206 to filter the results/list of media collections by various criteria. For example, an operator 108 may filter the media collections by location, campus, event, time zone, live event, etc.

The list of media collections may include a list of all active media collections 212 and a list of upcoming media collections 214. Each list may include an indication of what operators or curators 216 are assigned to each media collection. There may be one or more operators 108 assigned to each media collection. The user interface 200 also allows the operator 108 to add or remove operators 108 for each media collection. Each media collection may have a title 201, a number of content items or content messages 203 that are in the queue for that media collection, a number of content items that have been cleared 205 (viewed, reviewed, etc.), and the last time the media collection was updated 207. Upcoming media collections 214 may also include information about when they are scheduled to go "live."

The media collections may also indicate a status by an indicator such as color or other method. For example, media collections that do not need immediate attention may have a first indicator (e.g., a green color), media collections that need attention may have a second indicator (e.g., a red color), and media collections that are incomplete (e.g., do not have a geofence, need approval, do not have a thumbnail, etc.) may have a third indicator (e.g., a yellow color). The server system 120 may set or update a status indicator based on a predetermined trigger, as explained below. An operator 108 may select any of the media collections to go to a detailed view for a particular media collection.

Figure 2B:
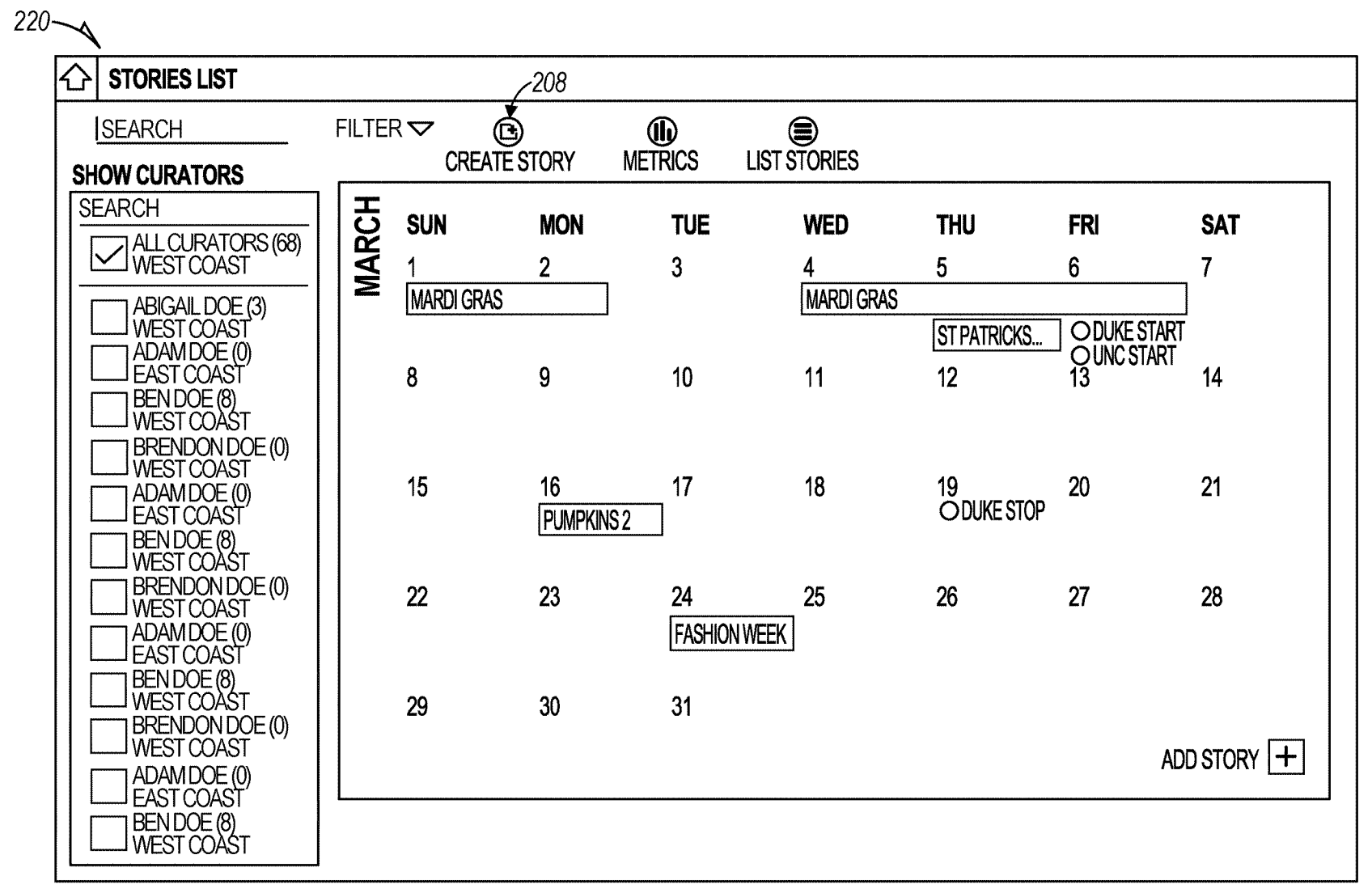

The user interface 200 may also provide a mechanism 210 for the operator 108 to view metrics associated with one or more media collections, one or more operators 108, etc. And the user interface 200 may also provide a mechanism 211 for accessing a calendar view of the media collections. A calendar view of the media collections is shown in FIG. 2B. In the calendar view 220, an operator 108 may see live media collections laid out in a monthly view.

Figure 2C:
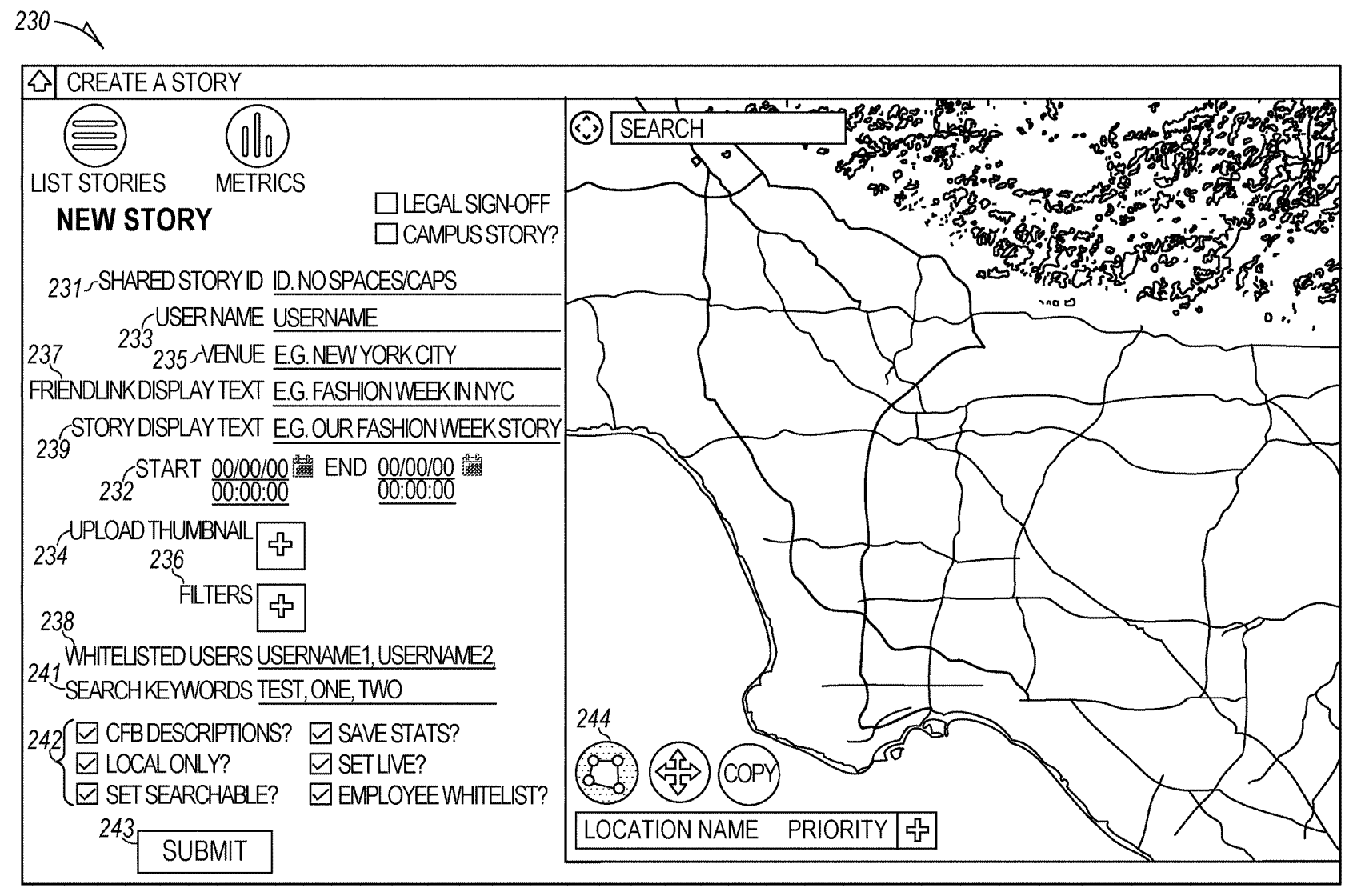
Figure 2D:
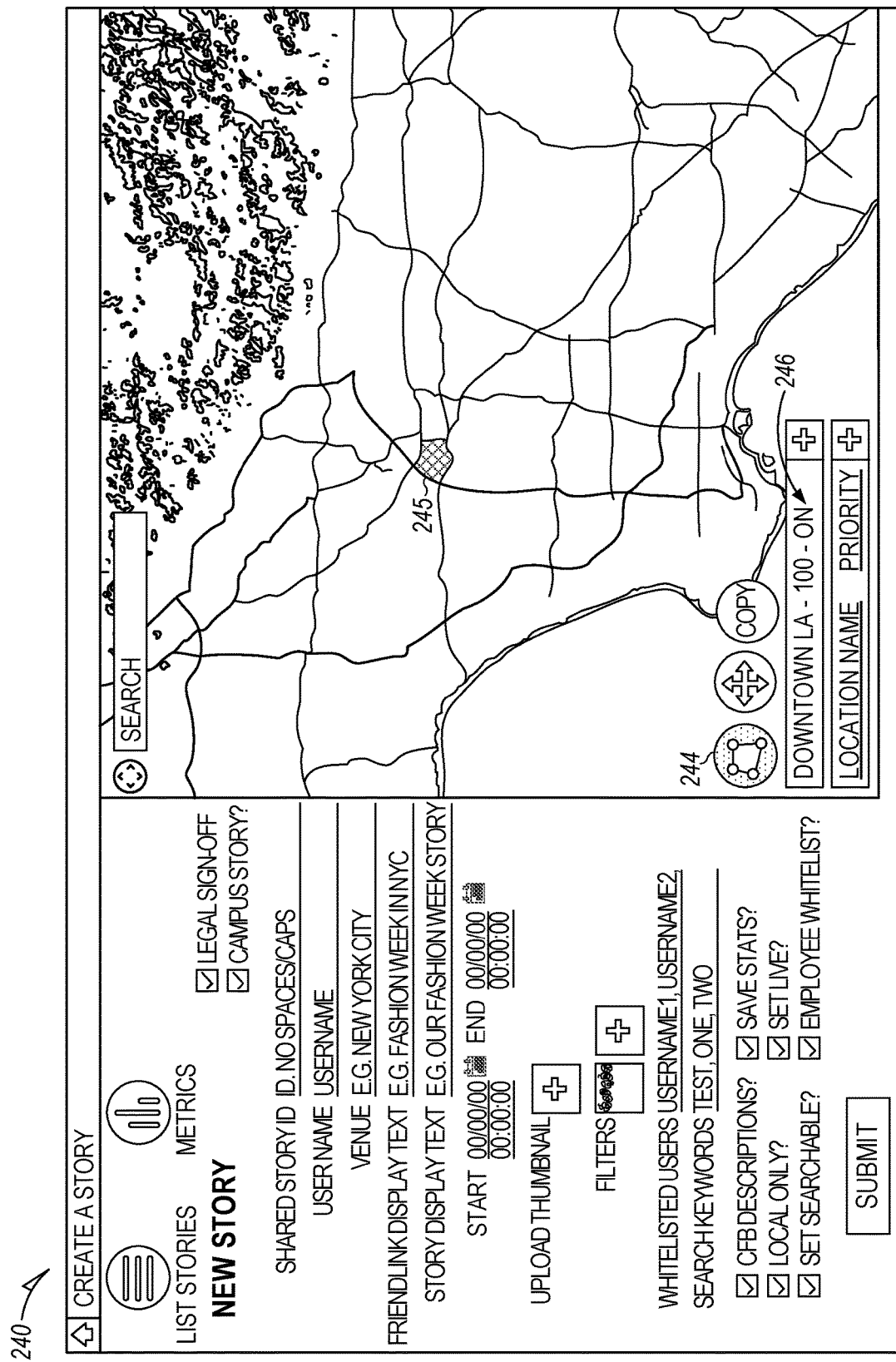
Figure 2E:
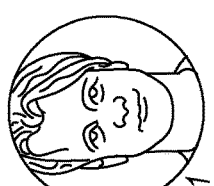
FIG. 2E is an example user interface for viewing a list of media collections, according to some example embodiments.

An operator 108 may also view a list of just the media collections assigned to the operator 108, as shown displayed in example interface 250 in FIG. 2E. The interface 250 may display the name 251 of the operator 108, a logout button 152, a picture 253 of the operator 108, a list of the media collections 254 that the operator 108 is currently working on, a list 255 of other operators 108 that are currently online (e.g., working on media collections), what operators 108 are working on each media collection 256, and other media collections 257.

Each media collection list item (e.g., media collection list item 258) may include information about the media collection. For example, the media collection list item may include a name of the media collection (e.g., Stanford, Purdue, etc.), a number of content items or content messages in the queue for that media collection (e.g., 1253, 253, 104, etc.), a time since the last update was pushed live or content items or content messages were added to the queue (e.g., 00:05:53), the amount of content items or content messages cleared or reviewed/curated (e.g., an amount for the operator 108 (e.g., 255, 245, 2135 etc.), and a total amount (e.g., 12.5 k, 172.5 k, etc.), and a last updated time stamp and by whom it was updated (e.g., 01/12/16 (D. Boone)). The operator 108 may also be able to add an operator 108 to a media collection, for example, using a drop down box 259 as shown in example interface 250.

Figure 2F:
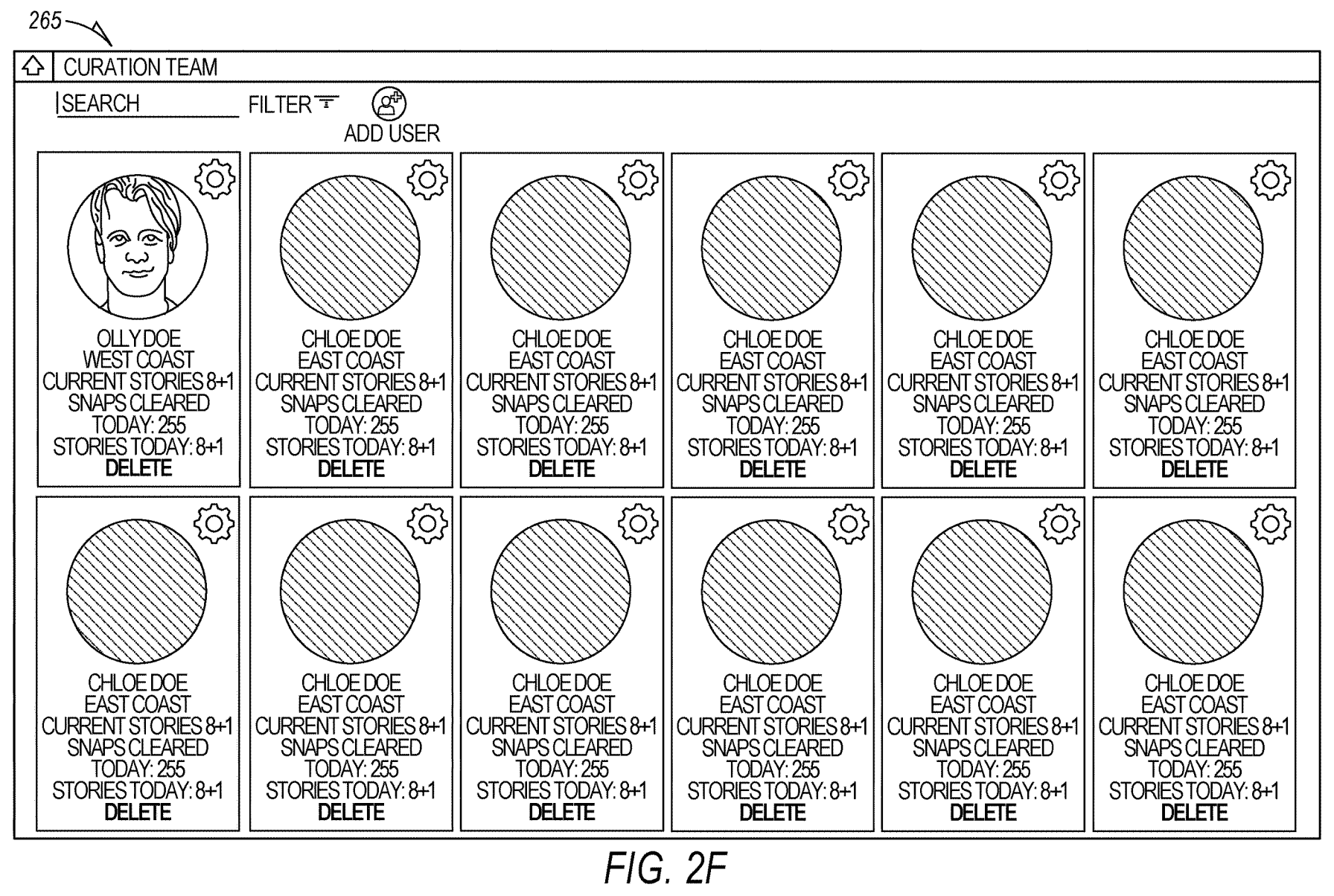
Figure 2G:
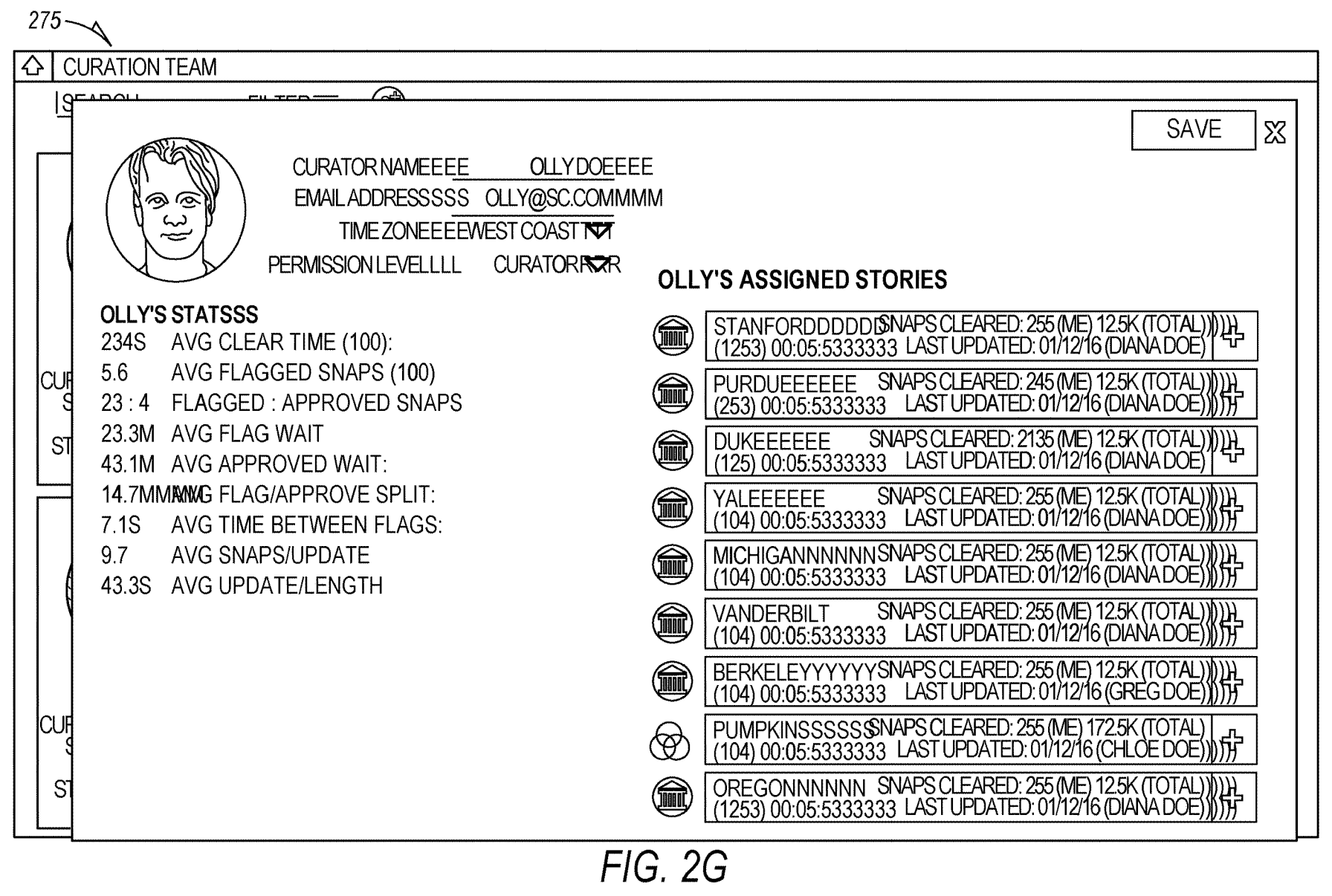
Figure 2H:

The operator 108 may be further provided with a mechanism to view all operators 108 currently working on media collections, as shown in interface 265 of FIG. 2F. The interface 265 may provide a photograph of the operator 108, a location of the operator 108 (e.g., west coast, east coast, etc.), a number of media collections the operator 108 is working on, the number of content items or content messages cleared or reviewed/curated for the day, media collections worked on for the day, etc. The operator 108 may view further details for each operator 108 as shown in interface 275 in FIG. 2G. For example, interface 275 may include various metrics for the operator 108, such as, average time it takes to clear 100 content items or content messages, average number of flagged (e.g., selected) content items or content messages per 100 content items or content messages, ratio of flagged to approved content items or content messages, average time a flagged content item or content message has been in the queue before it is flagged, average time an approved content item or content message has been in the queue before it is activated, average time it takes for an approved content item or content message to go from flagged to approved, average time between flagging two separate content items or content messages, average length of each updated number of content items or content messages per update, number of media collection seconds per update, etc. The operator 108 may also be able to view metrics specific to a media collection (with similar metrics as described above), as shown in interface 285 of FIG. 2H.

The operator 108 may further be provided with a mechanism to create a new media collection (e.g., via a selectable "create story" icon 208 as shown in FIGS. 2A and 2B). A user interface 230 such as the one shown in FIG. 2C may be provided to the operator 108 to create a new media collection. The user interface 230 may allow the operator 108 to input various information related to the new story or media collection. For example, the operator 108 may input a media collection identifier (ID) 231, username 233, location or venue 235 (e.g., city, state/country, various locations, etc.), friendlink display text 237 (e.g., "Fashion Week in NYC"), media collection display text 239 (e.g., "Our Fashion Week Story"), a start time and end time 232 (e.g., when the collection fence will open and close). The operator 108 may also be able to input a type of media collection (not shown). Some examples of types of media collections may be worldwide (e.g., appears to every user 106), public local (e.g., appears to local users 106 and other outputs), private local (e.g., only appears to local users 106), employee whitelist (e.g., only appears to employees such as an operator 108 or curator for a particular media collection).

The operator 108 may also be able to upload a thumbnail 234 that may be associated with the media collection and displayed in various media output displays (e.g., apps, websites, etc.). The operator 108 may be able to choose from a selection of predetermined thumbnails or create a new thumbnail. The operator 108 may also select or add filters 236 and/or intro animations to be associated with the media collection. The operator 108 may also include whitelisted users 238 and search for keywords 241 to be associated with the media collection. There may be additional information 242 that may be selected by the operator 108. For example, if the operator 108 has selected public local or private local for the media collection type, a check box may appear that can be selected to indicate that a collection fence is different from a broadcast fence. If the operator 108 selects this option (e.g., checks this box) then the operator 108 may be prompted to draw more than one geofence. Other additional information 242 may include an option to show the media collection on a website, show the media collection in a search or media forum (e.g., Google Now, Google search, etc.), and show media collections in a browser. If the operator 108 selects to show the media collection in one of these options, the operator 108 may be prompted to input additional information such as a description of the media collection (e.g., text box to input a description of the media collection), color for the media collection, etc.

The operator 108 may also be able to draw a geofence (e.g., a virtual fence over a geographic area) on a map to associate a particular location with the media collection. For example, the operator 108 may select a geofence drawing button 244 and then create a polygon 245 to indicate the location to associate with the media collection, as shown in FIG. 2D. After drawing the polygon 245, the operator 108 may be able to name and prioritize the geofence and then finalize it. An indication of the geofence 246 may be displayed to the operator 108. Additional geofences may be created by the operator 108, if desired. A media collection may have more than one geofence associated with the media collection. A geofence may be deleted by selecting the geofence and indicated it should be deleted (e.g., pressing a particular button). The operator 108 may also move the geofence around on the map to another location, or copy and paste the geofence to another location. A geofence may be used, for example, to determine eligibility of a user 106 to submit a content item or content message for a particular media collection. For example, if a user 106 is determined to be within the geofence for the media collection, the user 106 may be eligible to submit content items or content messages for that media collection.

After the operator 108 finishes entering information to create the new media collection, the operator 108 may submit the information. For example, the operator 108 may select a submit option 243 and the operator device 130 may send a request to create a new media collection with the information to server system 120. Server system 120 may receive and evaluate the request and information and create a new media collection and store the associated information in one or more databases 126. The server system 120 may generate a message indicating a new media collection has been created and send it to one or more operator devices 130.

Figure 3:
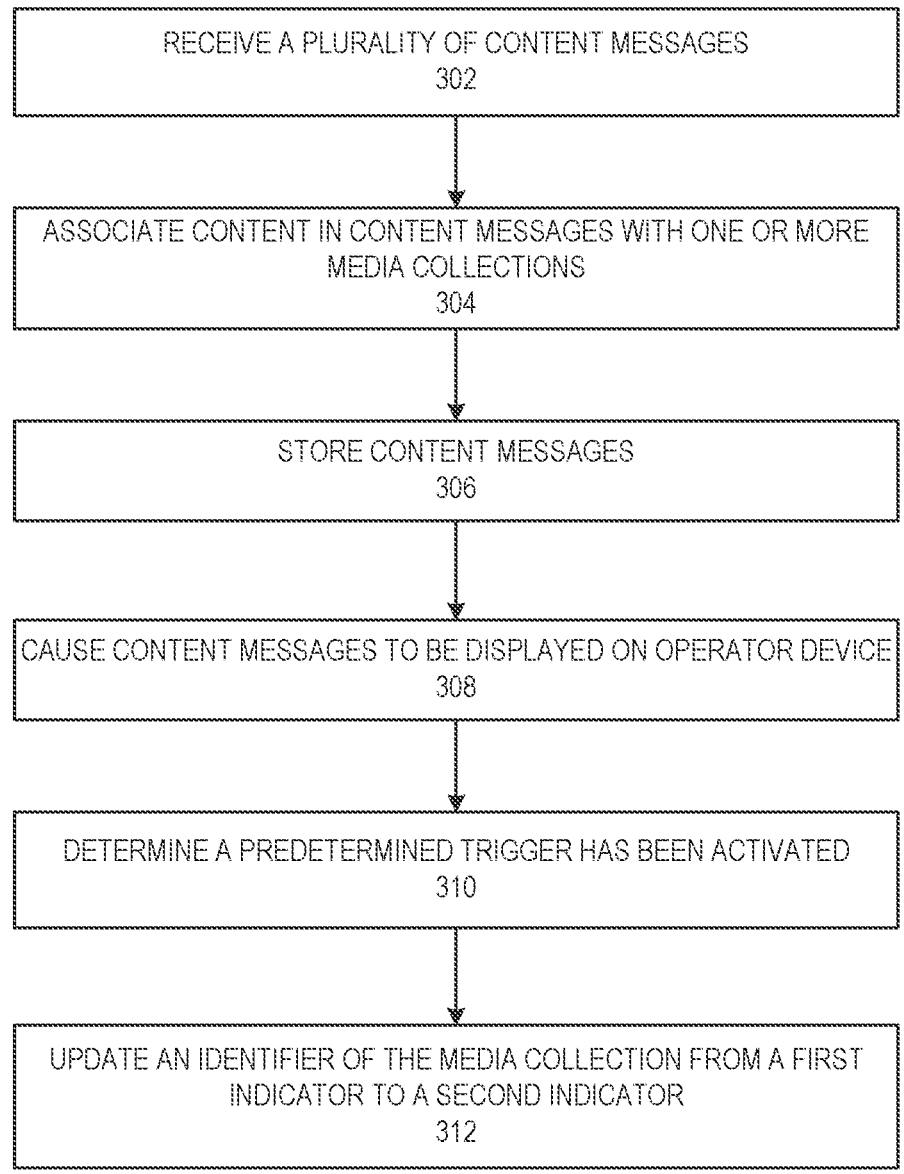
FIG. 3 is a flow chart illustrating aspects of a method, according to some example embodiments.

FIG. 3 is a flowchart illustrating aspects of a method 300, according to some example embodiments. For illustrative purposes, method 300 is described with respect to networked system 100 of FIG. 1. It is to be understood that method 300 may be practiced with other system configurations in other embodiments.

At operation 302, a server system 120 (e.g., at content processing server 124) may receive a plurality of content messages from a plurality of content sources. The content messages may comprise media content (e.g., photos, video, audio, text, etc.) and may be associated with one or more media collections.

For example, a plurality of users 106 may send a plurality of content messages related to a particular event (e.g., music concert, sports event, street fair, expo, etc.), a geolocation (e.g., concert venue, sports arena, city, neighborhood, state, etc.), a subject or topic (e.g., popular song, product, weather, etc.), a common user interest (e.g., shared interest in sports, music, clothing, celebrities, products, activities, etc.), etc. The content messages may be created and sent by a plurality of client devices 110. For example, a user 106 may take a picture, record a video, incorporate text or a media overlay (e.g., filter) with a picture, video, etc., and send the content message to another user 106 or to server system 120 to be associated with one or more predetermined media collections (or to create a new media collection). Content messages may include additional information such as a timestamp indicating the time the content was created or sent, a username, etc. The timestamp may be used to sort the content chronologically or determine any expiration day/time of a content message. The username may be used to identify the users 106, identify users 106 contributing good content to be flagged as a good contributor, identify users 106 who may be spammers so they can be muted, etc.

For each of the plurality of content messages received by the server system 120 (e.g., by content processing server 124), the content processing server 124 may associate the content in the content message with one or more predetermined media collections, as shown in operation 304. For example, an indication of one or more media collections may be included in the content message, and the content processing server 124 may utilize the indication to associate the content with the one or more media collections. In another example, the content processing server 124 may determine an associated media collection based on the content in the content message (e.g., via text recognition, object recognition, audio foot print, etc.). The content processing server 124 may store the content message associated with the one or more media collections, as shown in operation 306. In some embodiments, advertising elements may be associated with particular media collections based on a content type of the media collection, a location of the media collection, or some other characteristic associated with the media collection or metadata from content messages or content elements of the media collection.

Figure 4A:
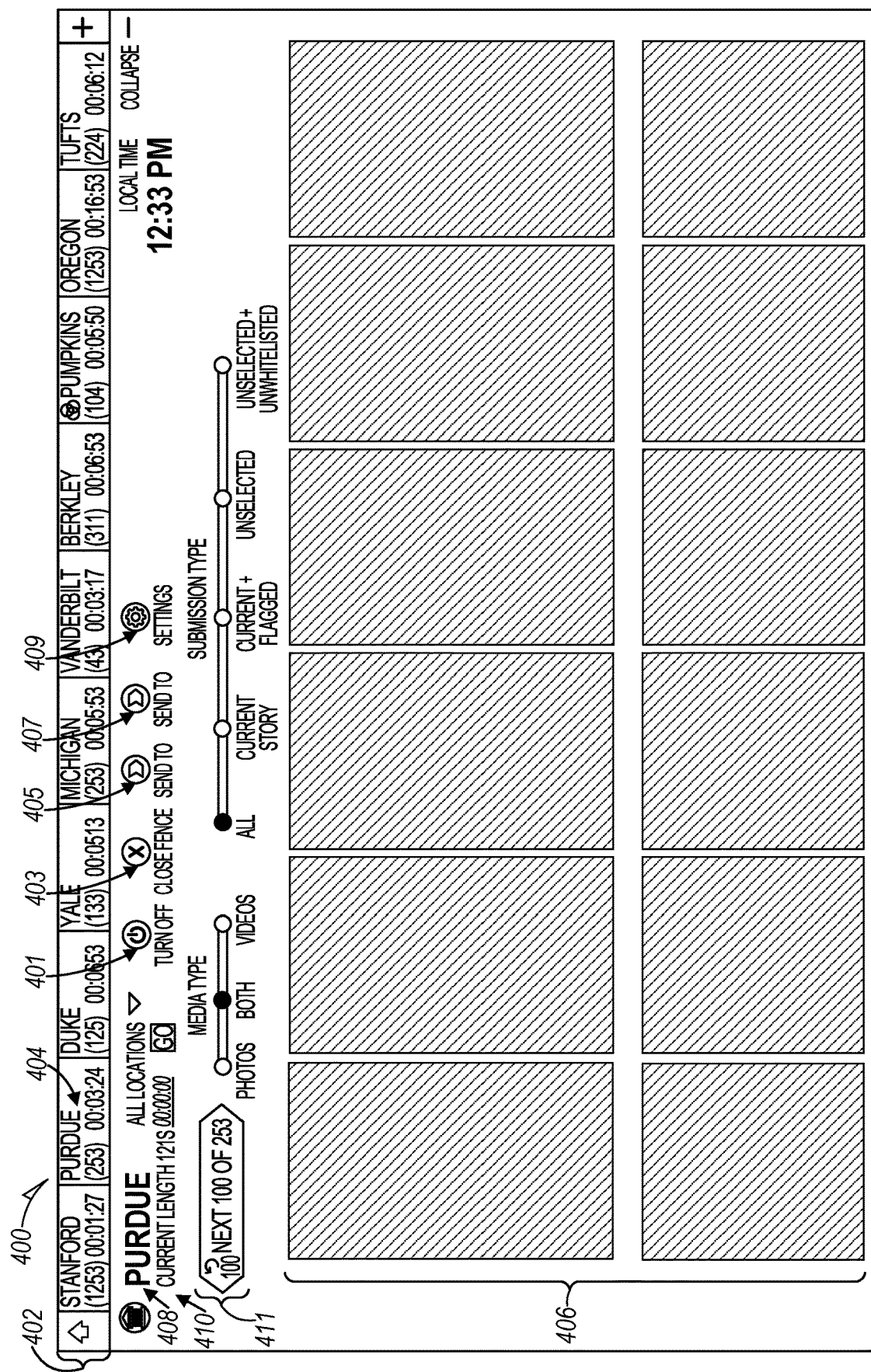
FIG. 4A-4E are example user interfaces to review and curate content for media collections.

In operation 308, the server system 120 may cause the content or content messages to be displayed on an operator device 130. For example, an operator 108 may use an interface in a web browser or in an application 134, such as the user interface 400 shown in FIG. 4A, to review and curate content for one or more media collections. In the example interface 400, the operator 108 is viewing/curating ten different media collections, as shown in the tool bar 402. The media collections in example interface 400 are associated with college campuses (e.g., Stanford, Purdue, Duke, Yale, Michigan, Vanderbilt, Berkeley, Oregon, Tufts). At any time, an operator 108 may be viewing or curating one or more media collections. Media collections may be ongoing stories (e.g., ongoing stories associated with a college campus, celebrity, music band, product, activity, etc.) or may be live stories associated with a live event (e.g., concert in progress, game in progress, black Friday, social event, etc.).

Each media collection may have an identifier associated with the media collection. The identifier (e.g., identifier 404) may include the name of the media collection, a number of content items or content messages in the queue (e.g., to be reviewed/curated), a local time of the specific story, a time which may indicate a time since the media collection was last updated by an operator 108 or a time of the most recent approved content item or content message, and a status indicator. Media collections may be removed or added to the interface 400 by the operator 108 or server system 120.

A status indicator in the identifier of the media collection may include a color, a flashing tab, etc. For example, the identifier of the media collection (e.g., tab 404) may appear green (e.g., a first indicator) when the media collection does not require immediate attention, red (e.g., a second indicator) when the media collection does require immediate attention, or yellow (e.g., a third indicator) when a media collection is incomplete.

The server system 120 may set or update an identifier of a media collection based on a trigger. For example, returning to FIG. 3, the server system 120 (e.g., content processing server 124) may determine a predetermined trigger has been activated, as shown in operation 310. The predetermined trigger may be a predetermined amount of time (e.g., 30 seconds, 1 minute, 15 minutes, 1 hour, 1 day, etc.) that has passed since the content items or content messages associated with the media collection have been viewed on the operator device 130, a predetermined number of content items or content messages that have not been viewed on the operator device 130, a predetermined amount of time that has passed since any content associated with the media collection has been pushed live to be viewed by users 106, etc. If the content processing server 124 determines that a predetermine trigger has been activated, it will then update an identifier of the media collection from a first indicator to a second indicator, as shown in operation 312.

For example, the content processing server 124 may determine that a predetermined amount of time (e.g., five minutes, fifteen minutes, one hour, one day, etc.) has passed since the content items or content messages associated with the media collection have been viewed on the operator device 130. The content processing server 124 may change the indicator from green (e.g., a first indicator) to red (e.g., a second indicator) to alert the operator 108 to the fact that the media collection needs immediate attention. This may be particularly important when an operator 108 is curating multiple media collections and for live media collections (e.g., events in progress) where timeliness may be important. For example, a concert may be only two hours long and so an operator 108 may not want to let more than a few minutes pass before updating content in a media collection related to the concert.

The operator 108 may select the identifier to view content to be reviewed and curated for a particular media collection. For example, the currently selected media collection in example interface 400 is "Purdue" 404. Once a media collection is selected, information specific to the selected media collection may be displayed. For example, for the selected "Purdue" media collection, information displayed may include the name of the media collection 408, the current length 410 of the media collection (e.g., the number of content messages or content items in the live or published version of the media collection), the location within the media collection (e.g., a particular geofence within the media collection, or all locations within the media collection), etc. There may be other mechanisms for performing additional functionality, such as a button 401 to turn the media collection on or off (e.g., turning a media collection on may push the selected media collection or story live). Other functionality may include a button 403 to open or close a geofence, a button 405 to preview the media collection in a video player, a button 407 to send the current media collection to a user 106 or list of users, and advanced settings 409 with additional options.

Example advanced settings may include filters to filter out content items or content messages of certain types by selecting various filters. For example, types that can be filtered out may include videos, photos, approved content items or content messages, flagged content items or content messages, whitelisted content items or content messages, unselected content items or content messages (e.g., not approved, flagged, or whitelisted), etc. Filtering may only effect the current queue.

The operator 108 may also filter a media collection by location, if there is more than one location within the media collection, default content item or content message length, how many content items or content messages that will be displayed on a page, how often the number of content items or content messages in the queue are updated, how may content items or content messages the operator 108 can go back when selecting an undo button, all submissions, current media collection only, current plus flagged, unselected, unselected plus whitelisted, etc.

Figure 4B:
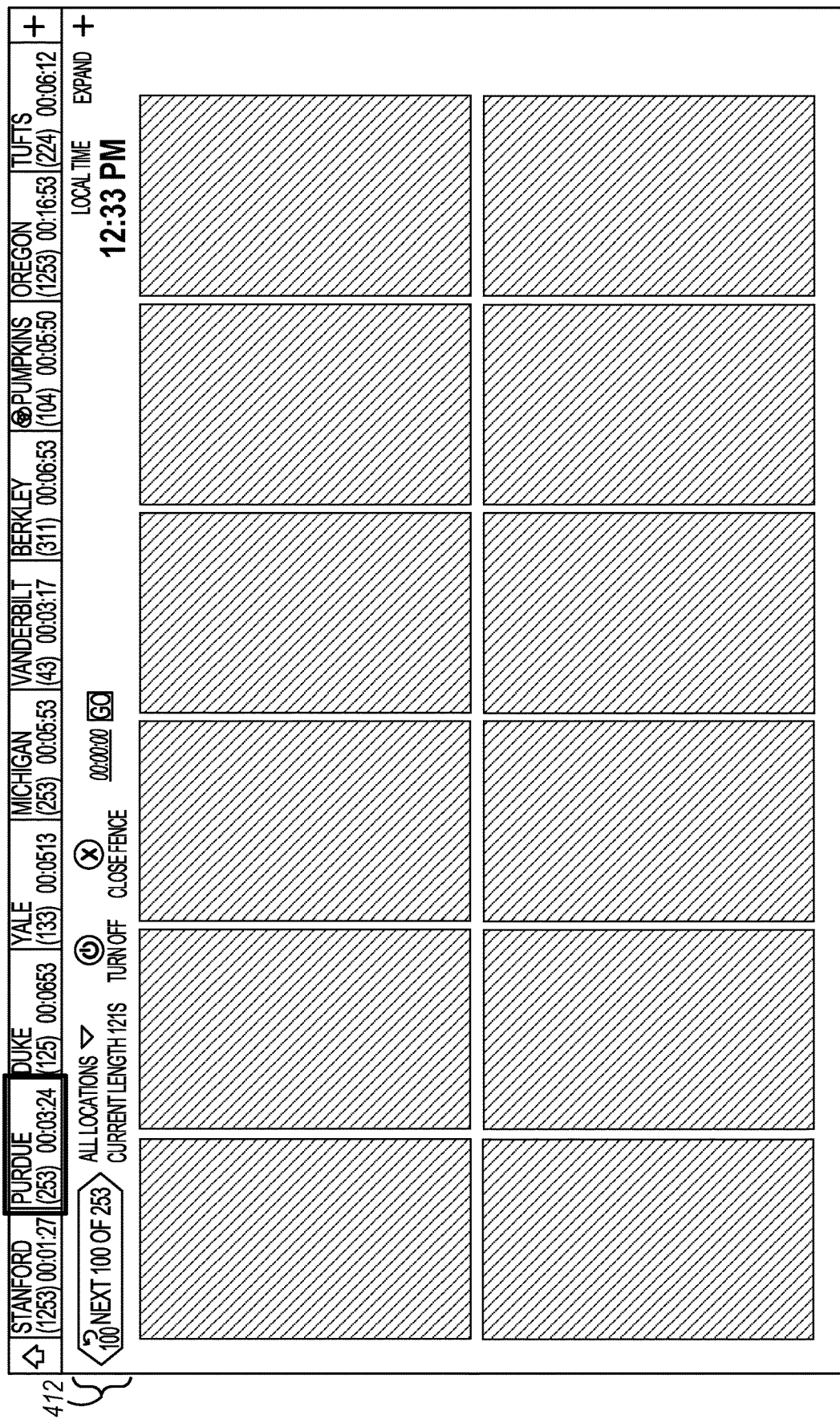

The interface 400 may further include a mechanism for loading the next content items or content messages in the queue. For example, there may be a button 411 that may be selected by the operator 108 to get the next 100 content items or content messages. FIG. 4B shows a collapsed view 412 of the information provided for the selected media collection.

Figure 4C:
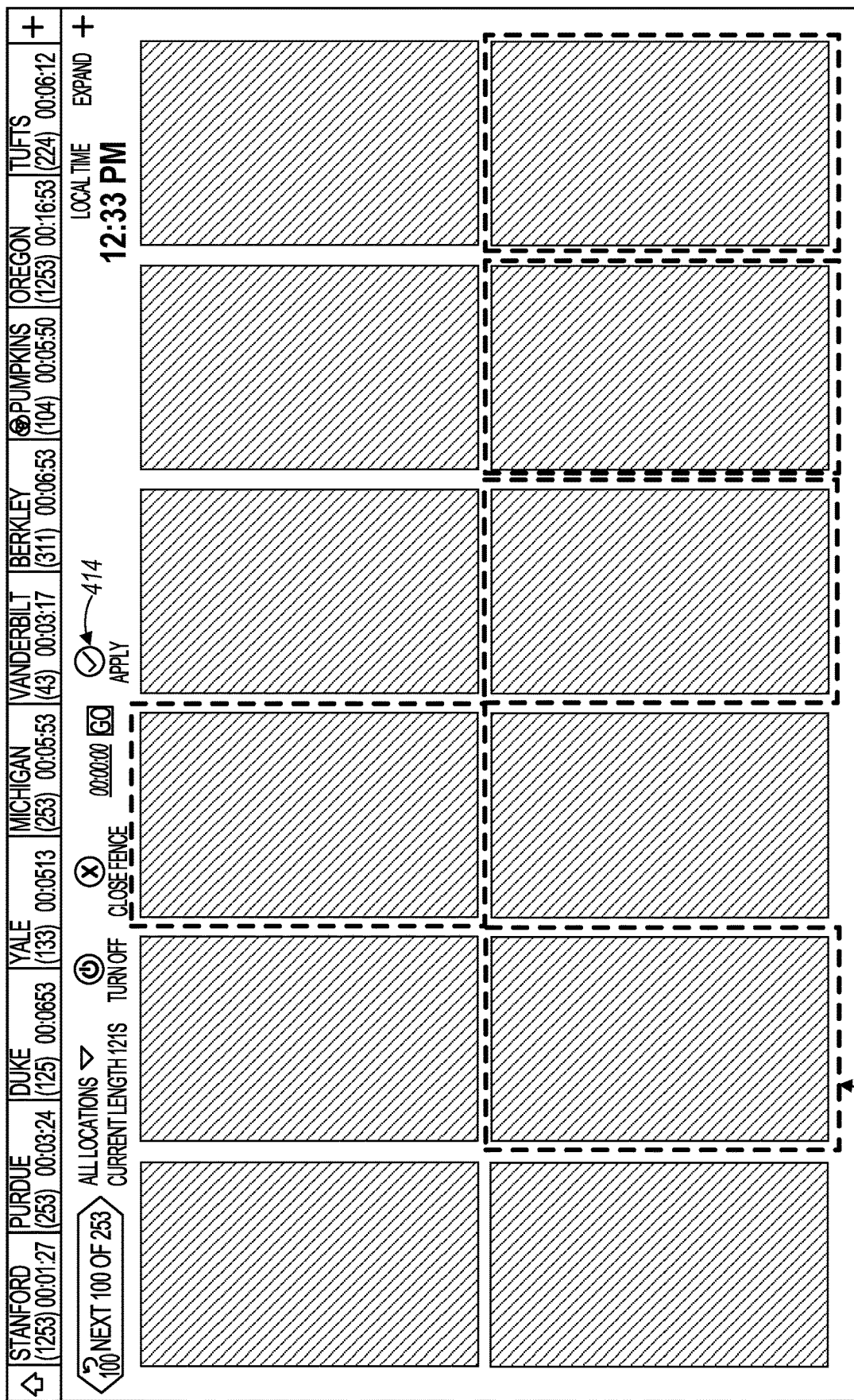
Figure 4D:
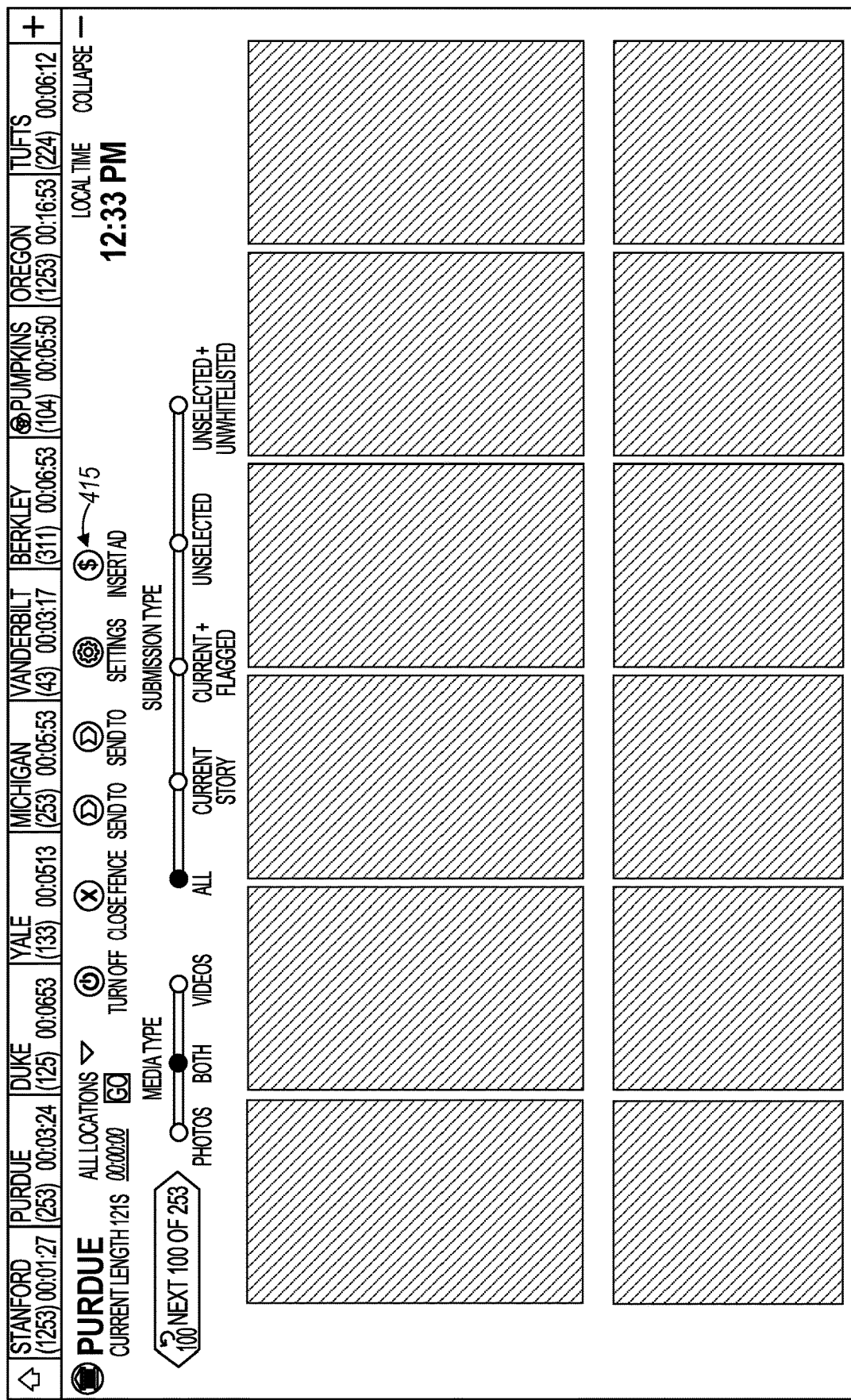
Figure 4E:
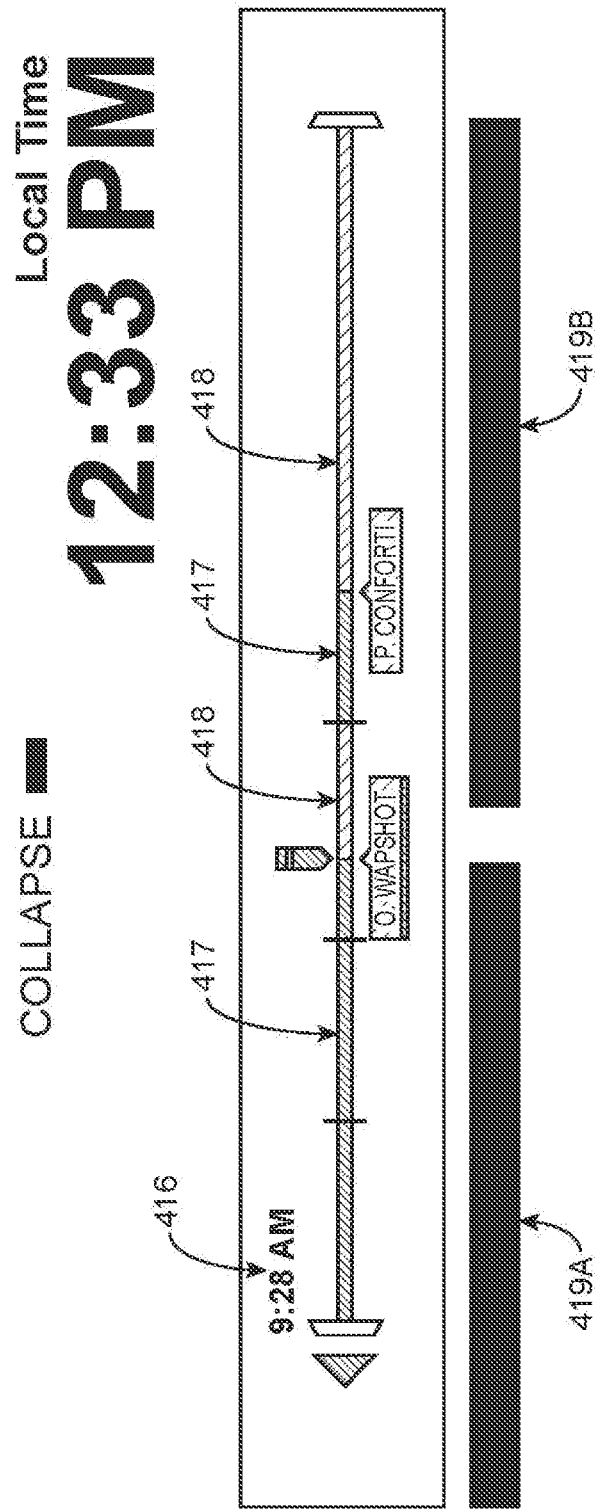

The operator 108 may be able to view a timeline, such as the example timeline 416 shown in FIG. 4E. The timeline 416 may show the progress of operator 108, relative to the rest of the media collection. For example, content items or content messages that have been viewed by the operator 108 may be shown in a first color (e.g., blue) 417 or other indication, and content items or content messages that have not yet been viewed may be represented by a second color (e.g., grey) 418 or other indication. Published content items or content messages (or chapters) may also be represented (e.g., by a bar 419A or 419B).

An operator 108 may also have the option of adding an advertisement to the media collection. For example, an operator 108 may be able to select to add an ad via a button 415 as shown in FIG. 4D. A list of ads may be displayed to the operator 108 (e.g., in a separate window) and the operator 108 may select and drag and drop one or more ads to be included in the media collection. Ads may also appear automatically after chapters are published, when appropriate (e.g., based on an amount of time that has passed in the media collection or since the last ad was displayed in the media collection).

While viewing the content items or content messages for a media collection, the operator 108 may select individual content items or content messages to show that the individual content items or content messages have been approved for pushing live (e.g., "published" to be viewed by users 106 as part of the media collection), as shown in FIG. 4C. A visual indication may be displayed when the individual content item or content message is selected or approved (e.g., it may be highlighted, flash on and off, greyed out, etc.). Once the operator 108 selects the content items or content messages to be approved, the operator 108 may indicate that the selected content items or content messages should be applied, for example, by selecting a "apply" button 414. There may be a number (not shown) that appears next to the apply button 414 that indicates how many approved content items or content messages will be applied. Selecting the apply button 414 will cause the current chapter (e.g., the approved content items or content messages) to be pushed live. For example, the selection of content items or content messages is sent to the server system 120 and it may be received by server system 120 (e.g., content processing server 124) and included in the selection of content in the media collection and made available to users 106 to view as part of the media collection.

Once the approved content items or content messages are applied, the visual indication may change to indicate they have gone live (e.g., the color may change, etc.).

An operator 108 may view and edit individual content items or content messages. For example, a tool may be provided to stabilize shaky video, strip a media overlay or filter off of a content item or content message (e.g., a media overlay that has inappropriate content, covers a key feature or object in the content item or message, etc.), block a particular user 106, report a content item or content message, trip a photograph or video length, etc.

In some embodiments, an operator 108 selects previously generated advertising content to be pushed with the media collection. In some embodiments, a particular order or position within display of content elements is selected by the operation 108. In some embodiments, an operator 108 identifies a position between other content messages as an advertising position in a presentation order, with the particular advertising content to be selected automatically for a particular requesting user that is viewing the media collection. In various embodiments, an interface for selecting advertising and pushing the advertising as part of a media collection is similar to the interface for selecting content as part of the media collection.

In other embodiments, inclusion of advertising within presentation of a media collection is automatic insertion between other selected content items. In some such embodiments, an operation 108 selects or otherwise identifies groups of content items or content elements to be presented sequentially without interruption by advertising content. When a presentation order for pushing content to a client device is determined with automatic inclusion of advertising elements, the continuous presentation groups identified by operator 108 are used to adjust the placement of automatic advertising within the media collection as presented on a client device 110. In some embodiments, as new content messages are received and new content added to some media collections, older content elements and continuous presentation groups are presented later and later in the presentation of the media collection, with newer content elements presented at the beginning. In such embodiments, automatic insertion of advertising content is used to maintain present advertising according to system rules while maintaining the grouped presentation of the continuous presentation group even as the position of the continuous presentation group in a media collection changes.

As mentioned above, server system 120 may receive tens of thousands (or more) of content messages from a plurality of client devices 110 containing media content from a plurality of users 106. It may be very difficult, if not impossible, for an operator 108 to review and curate so many messages for one or more media collections. Moreover, may media collections may relate to a live event where reviewing, curating, and pushing content items or content messages live for a media collection may need to be done in a very timely manner. Accordingly, the curation tool described above provides a number of mechanisms and filters to allow an operator 108 to quickly and easily view and curate content items or content messages related to one or more media collections.

Figure 5:
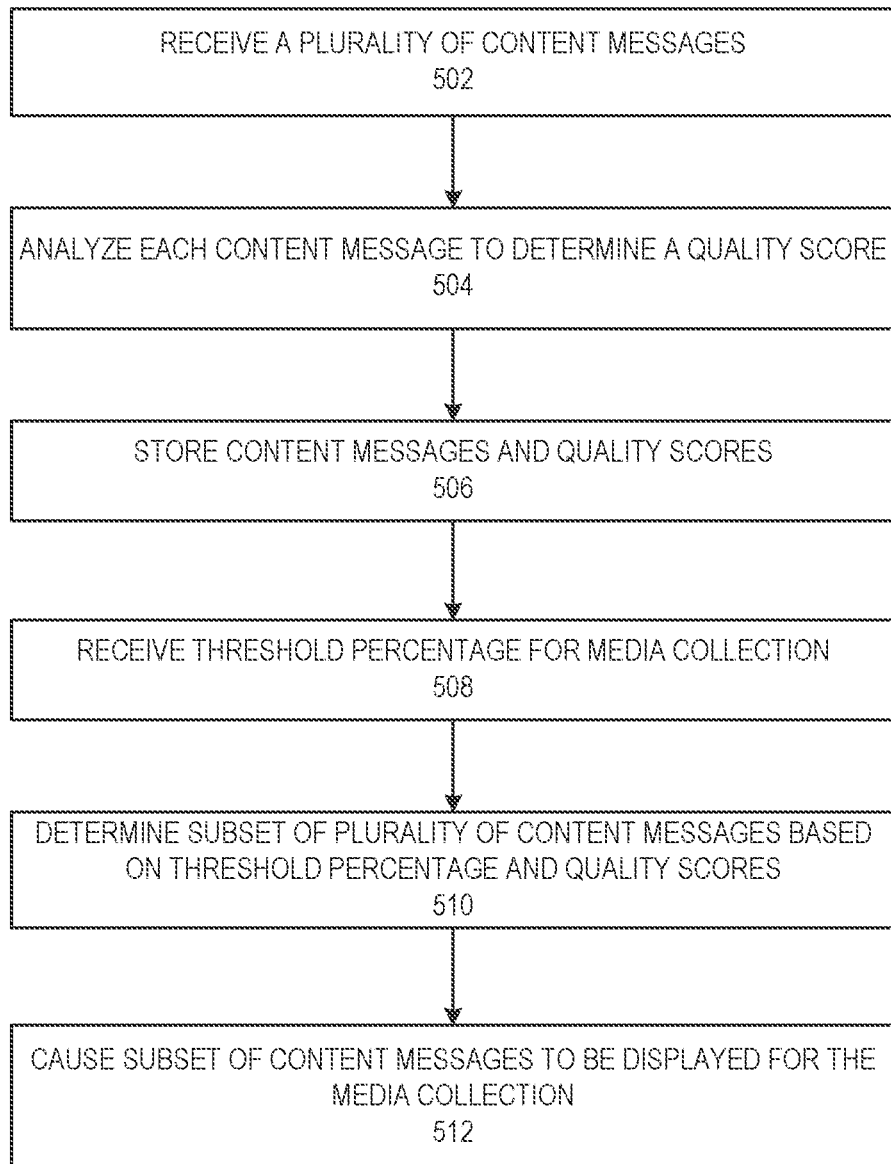
FIG. 5 is a flowchart illustrating aspects of a method, according to some example embodiments.

The curation tool may further provide a mechanism for an operator 108 to filter out a certain percentage of content items or content messages to automate some of the review and curation process so that an operator 108 may be able to efficiently review and curate content items or content messages in a timely manner. FIG. 5 is a flowchart illustrating aspects of a method 500, according to some example embodiments. For illustrative purposes, method 500 is described with respect to networked system 100 of FIG. 1. It is to be understood that method 500 may be practiced with other system configurations in other embodiments.

At operation 502, the server system 120 (e.g., at content processing server 124) may receive a plurality of content messages from a plurality of content sources. The content messages may comprise media content (e.g., photos, video, audio, text, etc.) and may be associated with one or more media collections.

For example, a plurality of users 106 may send a plurality of content messages related to a particular event (e.g., music concert, sports event, street fair, expo, etc.), a geolocation (e.g., concert venue, sports arena, city, neighborhood, state, etc.), a subject or topic (e.g., popular song, product, weather, etc.), a common user interest (e.g., shared interest in sports, music, clothing, celebrities, products, activities, etc.), etc. The content messages may be created and sent by a plurality of client devices 110. For example, a user 106 may take a picture, record a video, incorporate text or a media overlay (e.g., filter) with a picture, video, etc., and send the content message to another user 106 or to server system 120 to be associated with one or more predetermined media collections (or to create a new media collection). Content messages may include additional information such as a timestamp indicating the time the content was created or sent, a username, etc. The timestamp may be used to sort the content chronologically or determine any expiration day/time of a content message. The username may be used to identify the users 106, identify users 106 contributing good content to be flagged as a good contributor, identify users 106 who may be spammers so they can be muted, etc.

For each of the plurality of content messages received by the server system 120 (e.g., by content processing server 124), the content processing server 124 may analyze each of the plurality of content messages to determine a quality score for each of the plurality of content messages, as shown in operation 504. The quality score may be determined based on a number of different factors. For example, the content processing server 124 can analyze the media content in the content message to determine the quality of the audio, photographs, videos, text, or other content. If the quality of the media content is low (e.g., lower resolution, shaky video, blurry text, unclear audio, etc.), the content message is given a lower score than for media content with a higher quality.

Some example factors that may be used to determine a quality score include an explicit content likelihood (e.g., probability that images or videos contain explicit content such as nudity, drug use, profanity, etc.), underexposure (e.g., very dark or completely black images or videos), overexposure (e.g., too bright images or videos), noise level (e.g., images or videos that look to grainy as a result of being taken in low light conditions with a low-end camera), shaky camera (e.g., when camera is too shaky when taking a video), blurry media content (e.g., images and video that look too blurry), low quality compression (e.g., removes content messages with excessive compression artifacts), audio quality, areas within an event (e.g., if too many content messages showing a particular area in an sports arena or a particular play in a game, may be scored lower), content messages that are all black and white, etc.

A combination of different factors may result into a single quality score. For example, quality score may range from 0 to 1, with 0 being the lowest quality and 1 being the highest quality. A content message of lower quality may be scored with a 0 or 0.1. A content message of higher quality may be scored a 0.9 or 1. The factors may be combined into a single quality score using heuristics and/or using machine language based on operator 108 behavior. The content processing server 124 may optionally sort all of the content messages for a media collection by quality score.

A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such manner. For video where multiple sample frames are analyzed, an average of scores for each frame may be used to select a score, a worst score for an individual frame of all the analyzed frames may be used, or any such combination or function of multiple scores or selections of scores may be used.

In some embodiments, a motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio based information may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g. taboo spoken language or explicit music lyrics) can be used for a quality score or a quality threshold flag in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g. landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score. In some embodiments, image or video content may additionally be used to associate certain advertising elements with a media collection, or with certain content elements. Advertising elements in a position close in a presentation order to a certain content element having identified image content types may be used to select the particular advertising element to be positioned in a slot of a presentation order.

Feedback or machine learning is used in certain embodiments to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based in a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night.

In operation 506, the content processing server 124 may store the plurality of content messages, along with the quality score for each of the plurality of content messages, in one or more databases 126. The quality score may be stored as metadata associated with the content message. The content processing server 124 may optionally sort all of the content messages by quality score.

Figure 6:
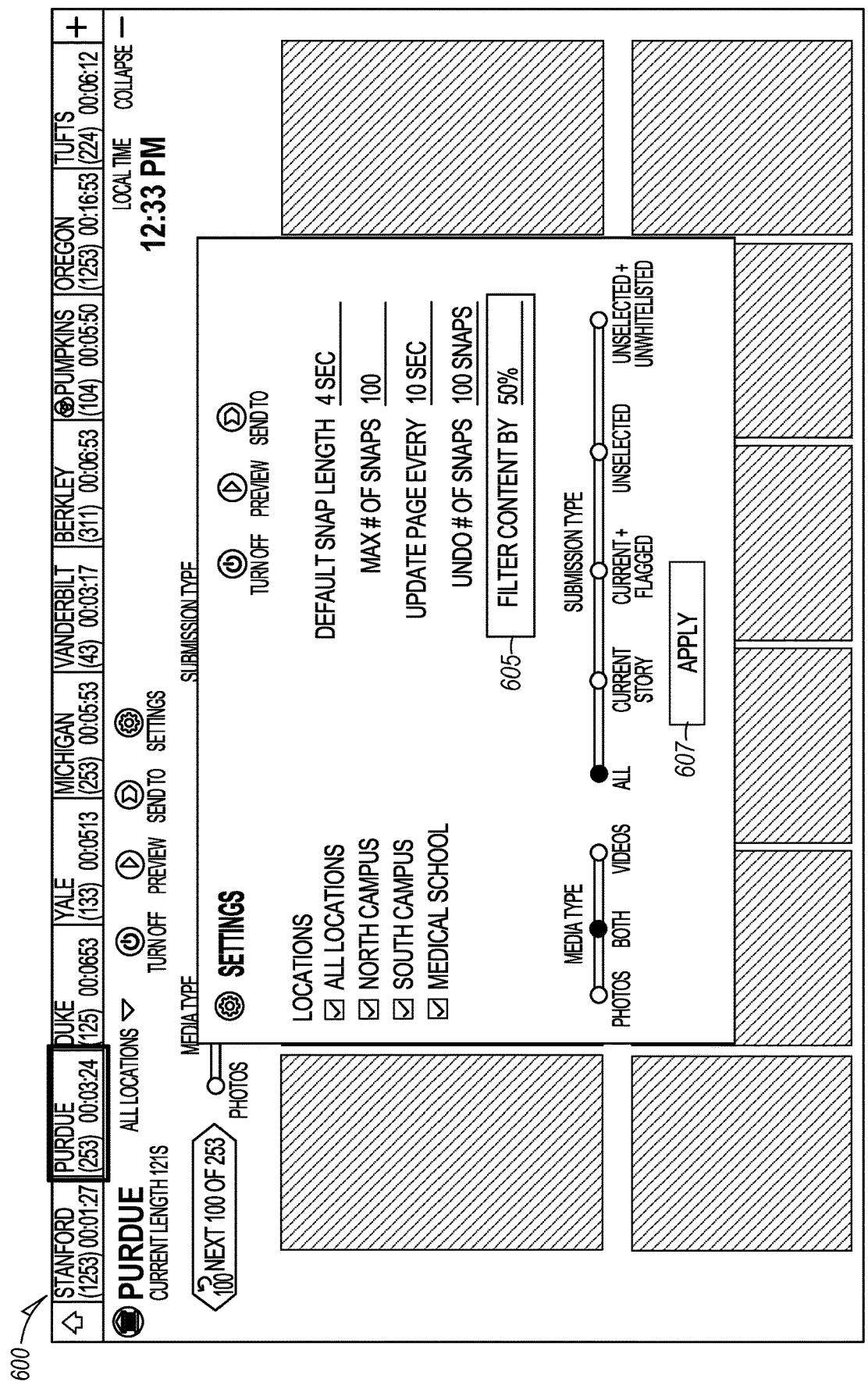
FIG. 6 is an example user interface for filtering content, according to some example embodiments.

In operation 508, the content processing server 124 may receive, from an operator device 130, a threshold percentage for a media collection. For example, the operator 108 may be provided with an interface, such as the interface 600 shown in FIG. 6, to provide a threshold percentage 605 by which to filter the content in the media collection. For example, the operator 108 may only want to receive the top quality content messages (e.g., due to a large volume of content messages in the queue/media collection). The operator 108 may enter a percent (e.g., 50%) and submit the threshold percentage to the content processing server 124 (e.g., via the "APPLY" button 607).

In operation 510, the content processing server 124 may determine a subset of the plurality of content messages associated with the media collection to be made available to the operator 108 (e.g., via an operator device 130) based on the threshold percent received by the operator device 130 and the quality score for each of the plurality of messages. For example, the content processing server 124 may determine the top 50% of the content messages in the media collection based on the quality score for each of the plurality of messages (e.g., the top 50% of highest scoring content messages).

In operation 512, the content processing server 124 may cause only the subset of the plurality of content messages associated with the media collection to be displayed on the operator device 130 for the media collection. For example, if the content processing system 124 has received 10,000 content messages, and the threshold was set to 30%, the content processing system 124 may only cause 3000 content messages to be displayed on the operator device 130.

Since the content processing server 124 may be continuously receiving a plurality of content messages, the content processing server 124 may re-compute the subset of plurality of content messages for a media collection periodically. For example, after causing the initial subset of content messages to be displayed on the operator device 130, the content processing server 124 may determine a subset of newly received content processing messages (e.g., since the last subset was determined) after a predetermined number of content messages have been received (e.g., 100, 1000, etc.) or after a predetermined amount of time (e.g., 30 seconds, 10 minutes, 30 minutes, 1 hour, etc.). Moreover, the operator 108 may change the threshold value from first value (e.g., 50%) to a second value (e.g., 30%). The content processing server 124 may receive the new threshold value and use the new threshold value to determine the subset of the plurality of content messages received going forward. In addition, or in the alternative, the content processing server 124 may also adjust the value of a subset that was already made available to the operator device 130 (e.g., may cause more content messages to be displayed on the operator device 130 if the operator 108 increased the threshold percentage value).

Input from an operator 108 may be used to improve the quality score algorithm. For example, an operator 108 may be able to mark or otherwise indicate when a content message is low-quality. The server system 120 may also track each time an operator 108 flags or accepts a content message, or indicates a content message is related to a particular breaking news story, etc. For example, the content processing server 124 may analyze content messages that were accepted by operators 108 and content messages that were not accepted by operators 108, and use this data to create a model to determine a probability that an operator 108 would accept a particular content message. This factor (e.g., probability of operator acceptance) may be used as a factor in computing the quality score for the content message.

In another example embodiment, a client application 114 may be provided that includes a media collection creation and curation tool for an end user 106. The tool may allow the user 106 to create new media collections, view a list of media collections, view a plurality of content items or content messages associated with a predetermined media collection, select and/or curate content into media collections for immediate, ongoing, or periodic posting, etc. The plurality of media content may have been received by server system 120 in a plurality of content messages from a plurality of users 106 (e.g., via client devices 110). For example, a user 106 may wish to create a new media collection associated with a personal event, such as a wedding reception, child's birthday party, family vacation, etc. The user 106 may use a client device 110 to establish an account, create new media collections (e.g., one for his wedding reception, one for his niece's birthday party, one for an upcoming family vacation, etc.), view existing media collections, to view content messages (e.g., from friends and family) associated with media collections, and to select and/or curate content messages to be included in one or more media collections.

Figure 7A:
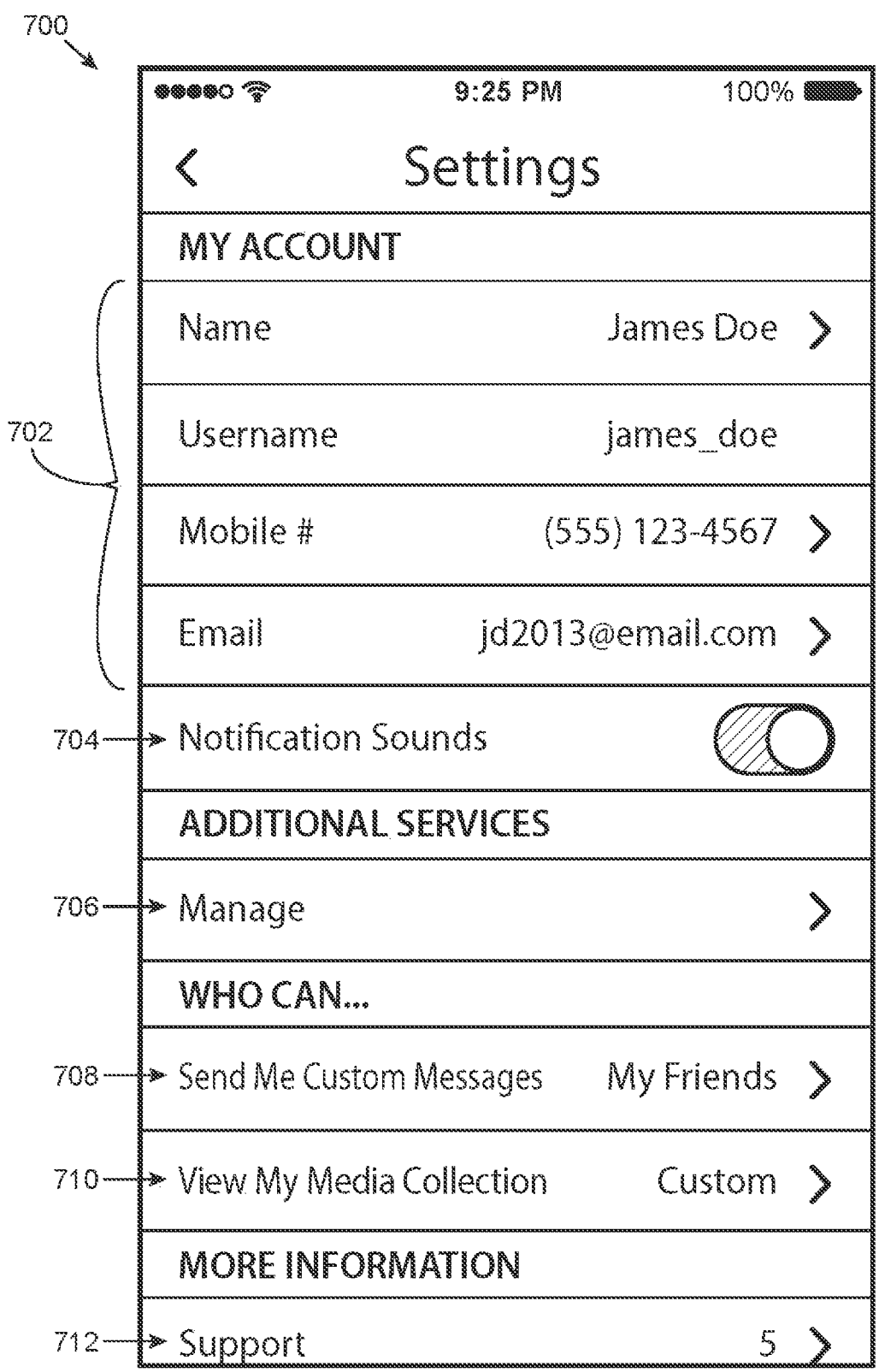
FIG. 7A is an example interface for account settings, according to some example embodiments.

A user 106 may first provide identifying information to establish an account to create new media collections, view existing media collections, to view content messages associated with media collections, and to select and/or curate content messages to be included in one or more media collections. For example, the client device 110 may cause an interface to be displayed on the client device 110, such as the interface 700 shown in in FIG. 7A. Some examples of identifying information 702 may include the user 106's name, a username, a mobile phone number, email. Other identifying information 702 may include a home address, a work address, an alternate email address, an alternate phone number, etc. In some example embodiments, the interface 700 may also allow the user 106 to set notification sounds on or off 704, manage additional services 706, specify who can send the user 106 content messages 708, view his own one or more media collections 710, and get help or support 712.

The user 106 may then submit the identifying information 702 (and any other information) to establish his account. The client device 110 may receive the identifying information 702 from the user 106 and send the identifying information 702 to server system 120 to establish an account. The server system 120 may receive the identifying information 702 and authenticate the identifying information 702 (e.g., confirm that there are no existing accounts with the same information, make sure the information is legitimate, etc.). Once the server system 120 has confirmed that the account may be established, the server system 120 may create a new account and store the identifying information 702 associated with the account in one or more databases 126. The server system 120 may send a notification to the client device 110 that the account has been established. The client device 110 may display a message to the user 106 that the account was established.

Figure 7B:
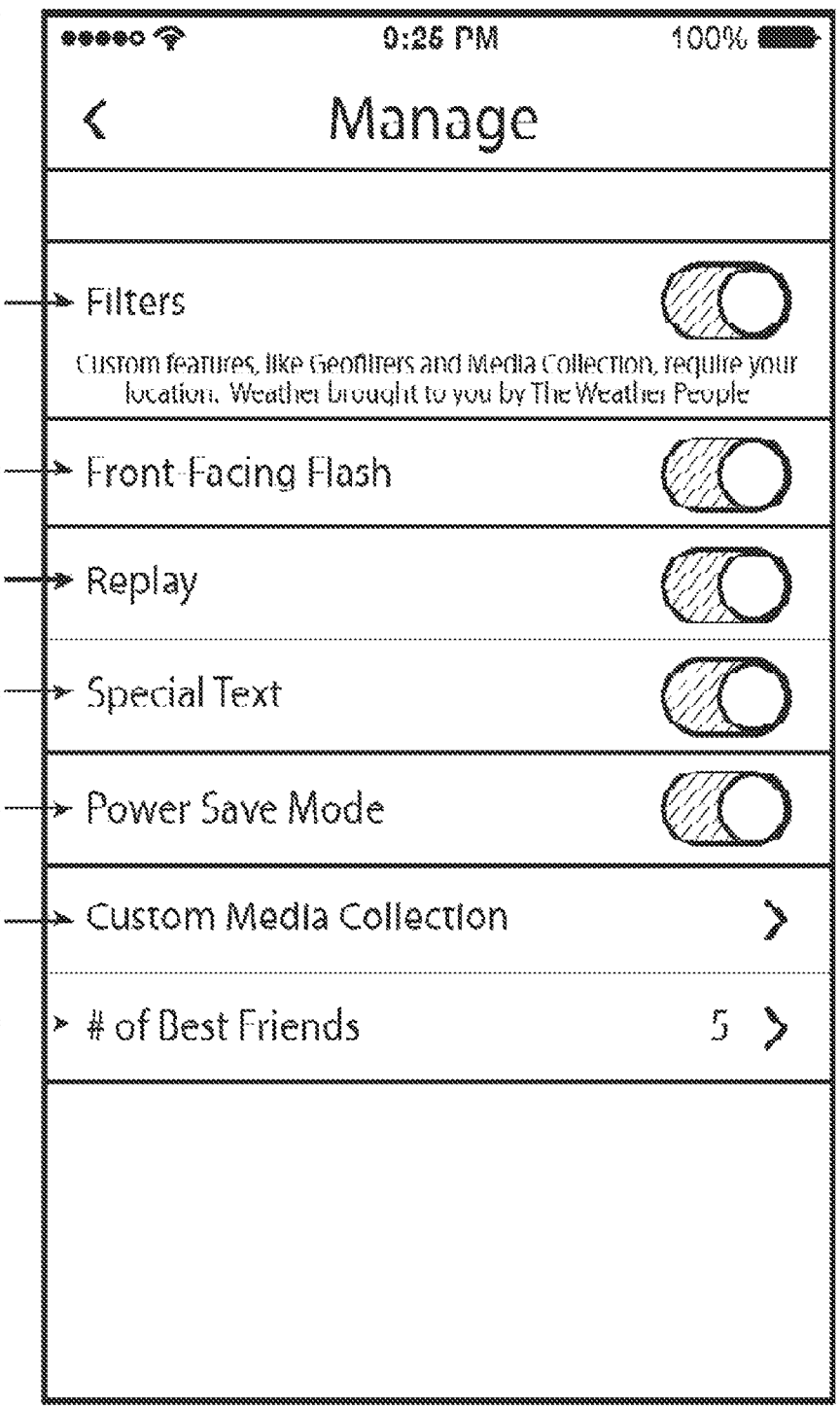
FIG. 7B is an example interface for managing an account, according to some example embodiments.

The application 114 on the client device 110 may provide a mechanism for the user 106 to manage various aspects of his account. For example, the client device 110 may display an interface 715 as shown in FIG. 7B. The user 106 may be able to manage filters 717 (e.g., media overlays), manage camera settings for capturing images such as front-facing flash 719, and other features, such as, replay 721, special text 723, power save mode 725, number of best friends 729, etc.

The interface 715 may further allow the user 106 to create a new personal media collection 727. The user 106 may select an option to create a new personal media collection (e.g., press or swipe menu item 727). The client device 110 may detect that the user 106 has selected to create a new personal media collection and request or allow a user 106 to enter various parameters associated with the media collection.

Figure 7C:
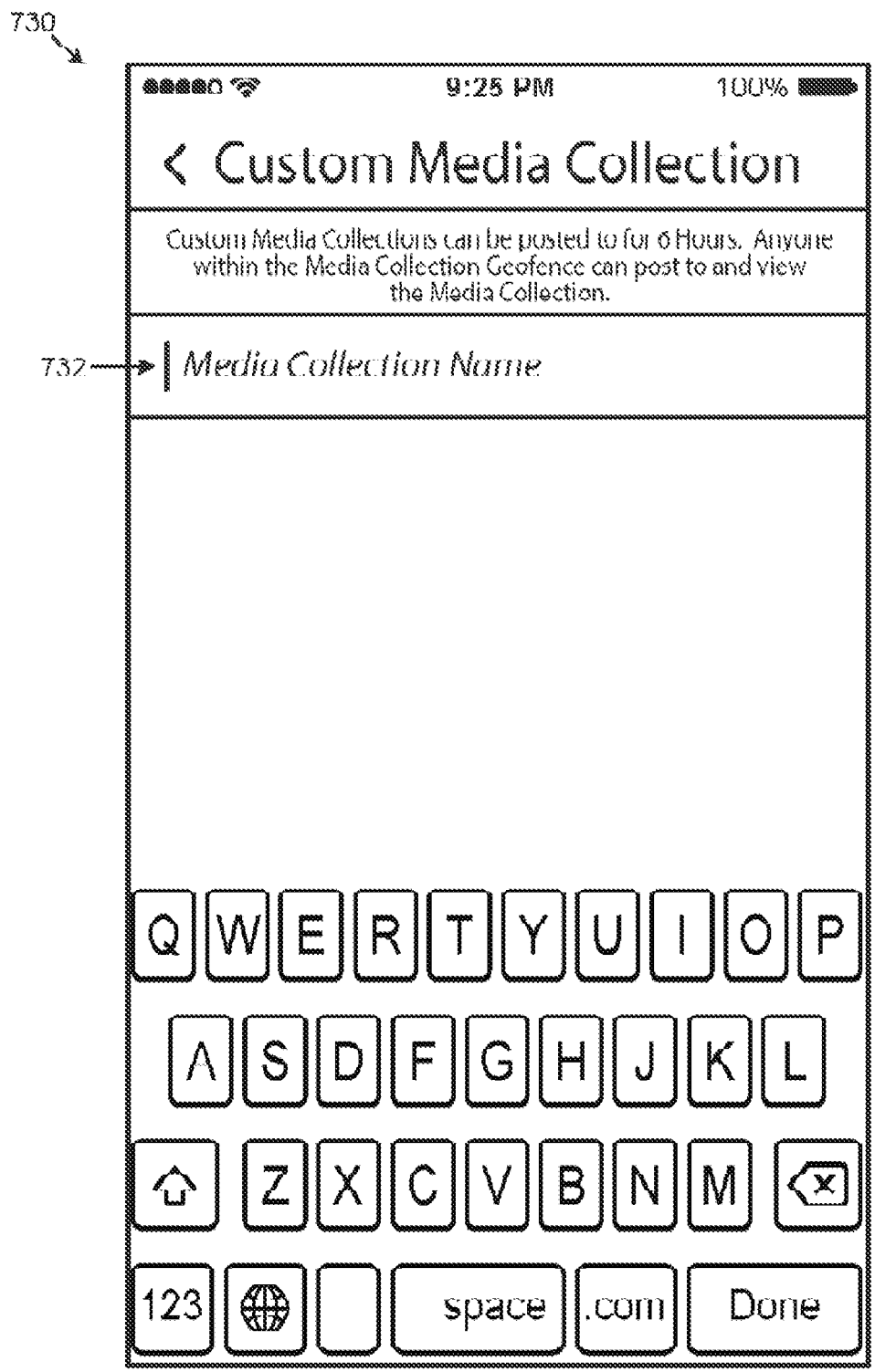
FIG. 7C-7H are example interfaces for creating a new media collection, according to some example embodiments.

One parameter may be a name for the personal media collection. For example, the client device 110 may display an interface such as interface 730 as shown in FIG. 7C, to request a name for the media collection 732.

Figure 7D:
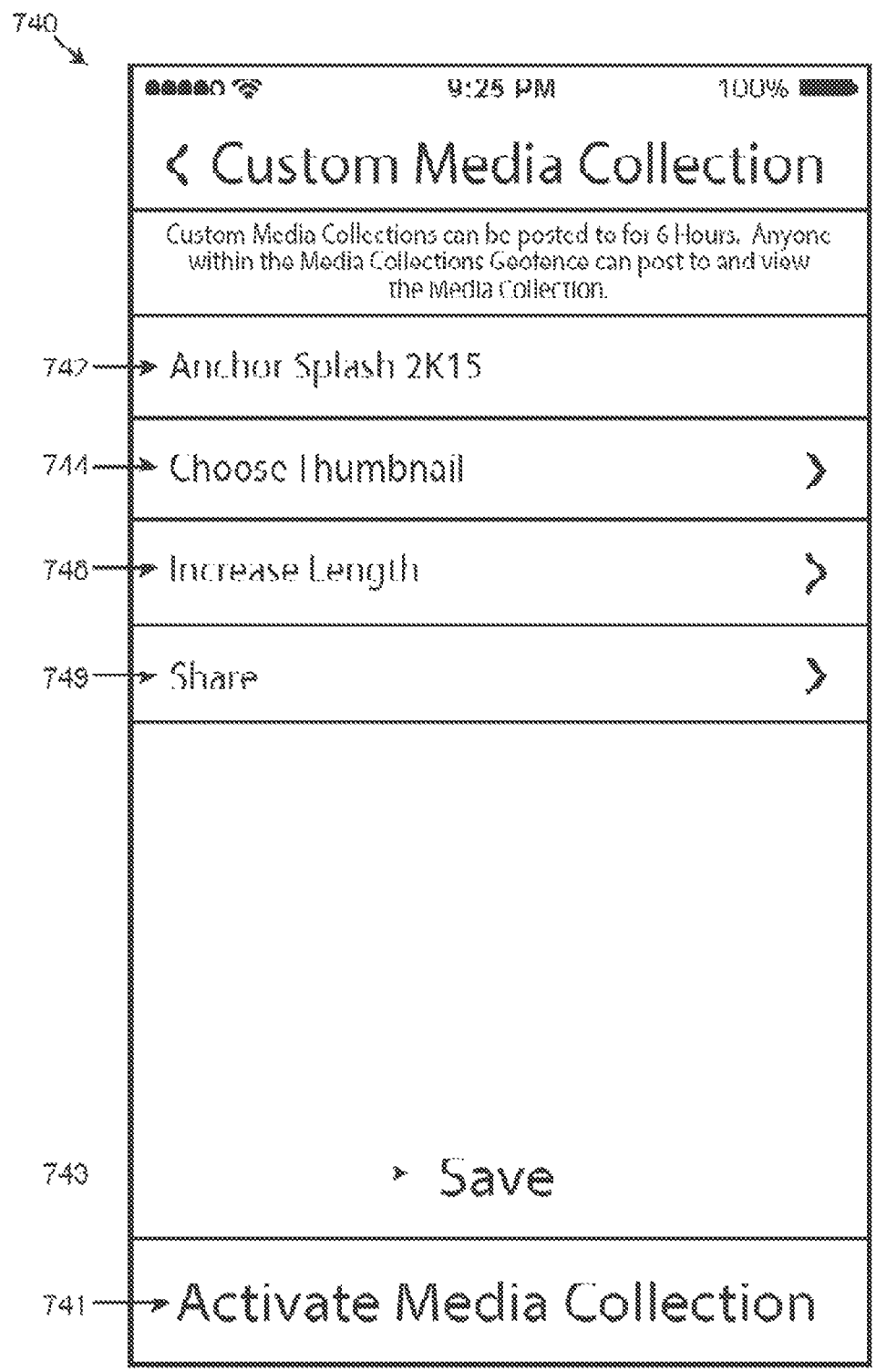

The user 106 may be able to enter additional parameters for the media collection, as shown in FIG. 7D. For example, the client device 110 may display an interface such as interface 740 to request additional parameters from the user 106 and allow the user 106 to enter the additional information associated with the example media collection 742 titled "Anchor Splash 2K15." An additional parameter may include choosing a thumbnail 744 to associate with the media collection (e.g., a custom thumbnail created by the user 106, or a default composite of images in the media collection, etc.).

Figure 7E:
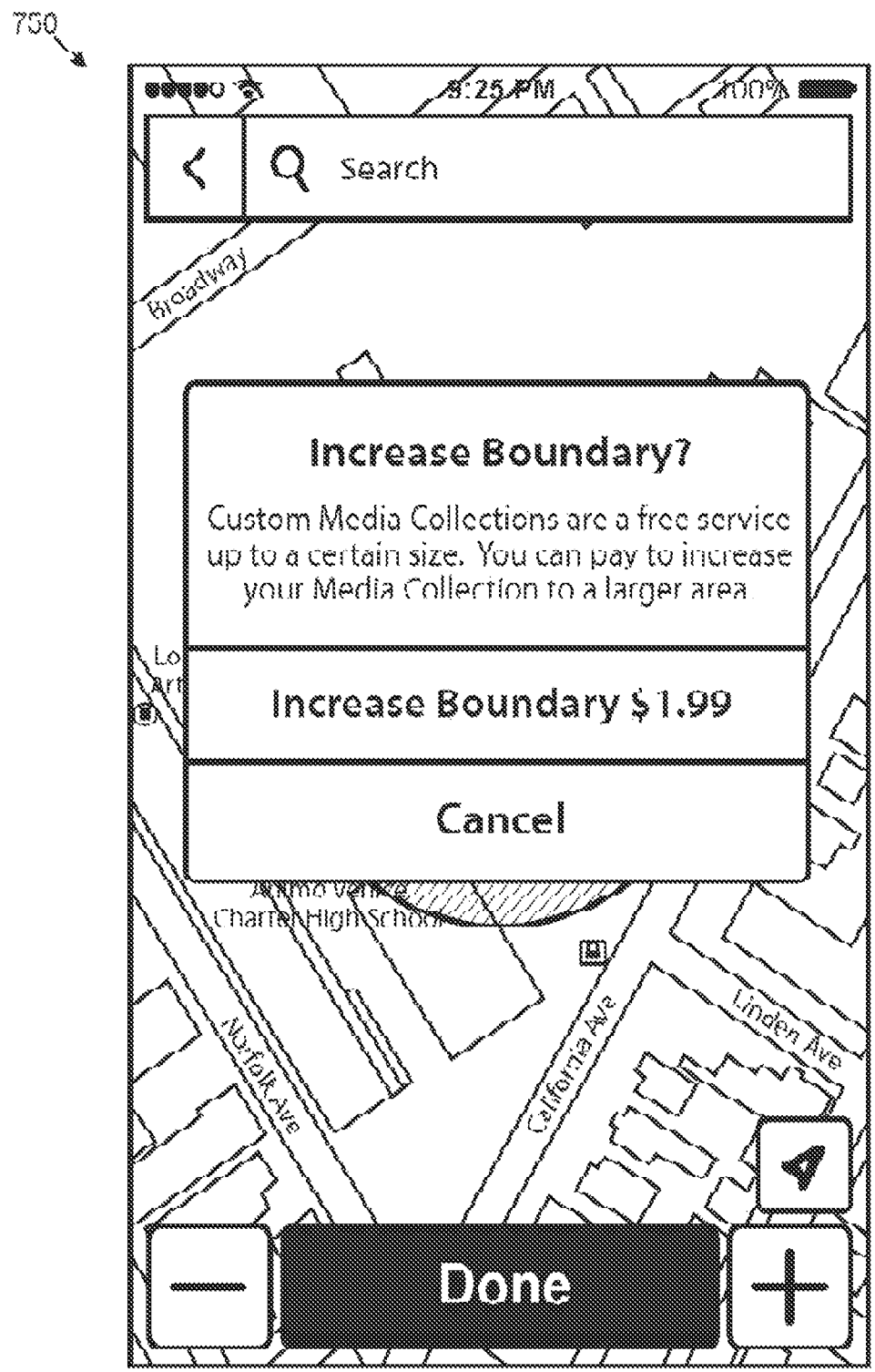
Figure 7F:
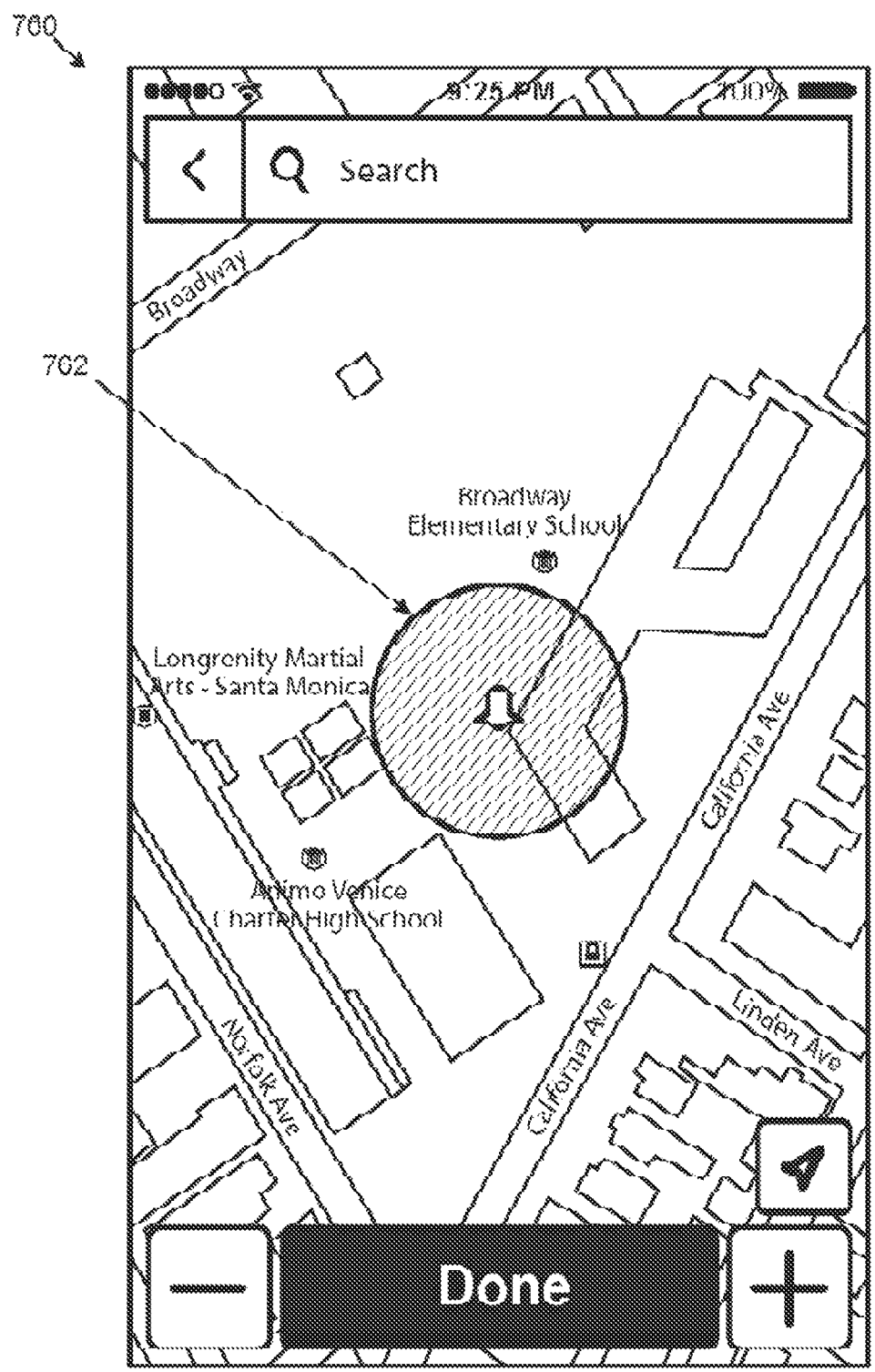
Figure 7G:
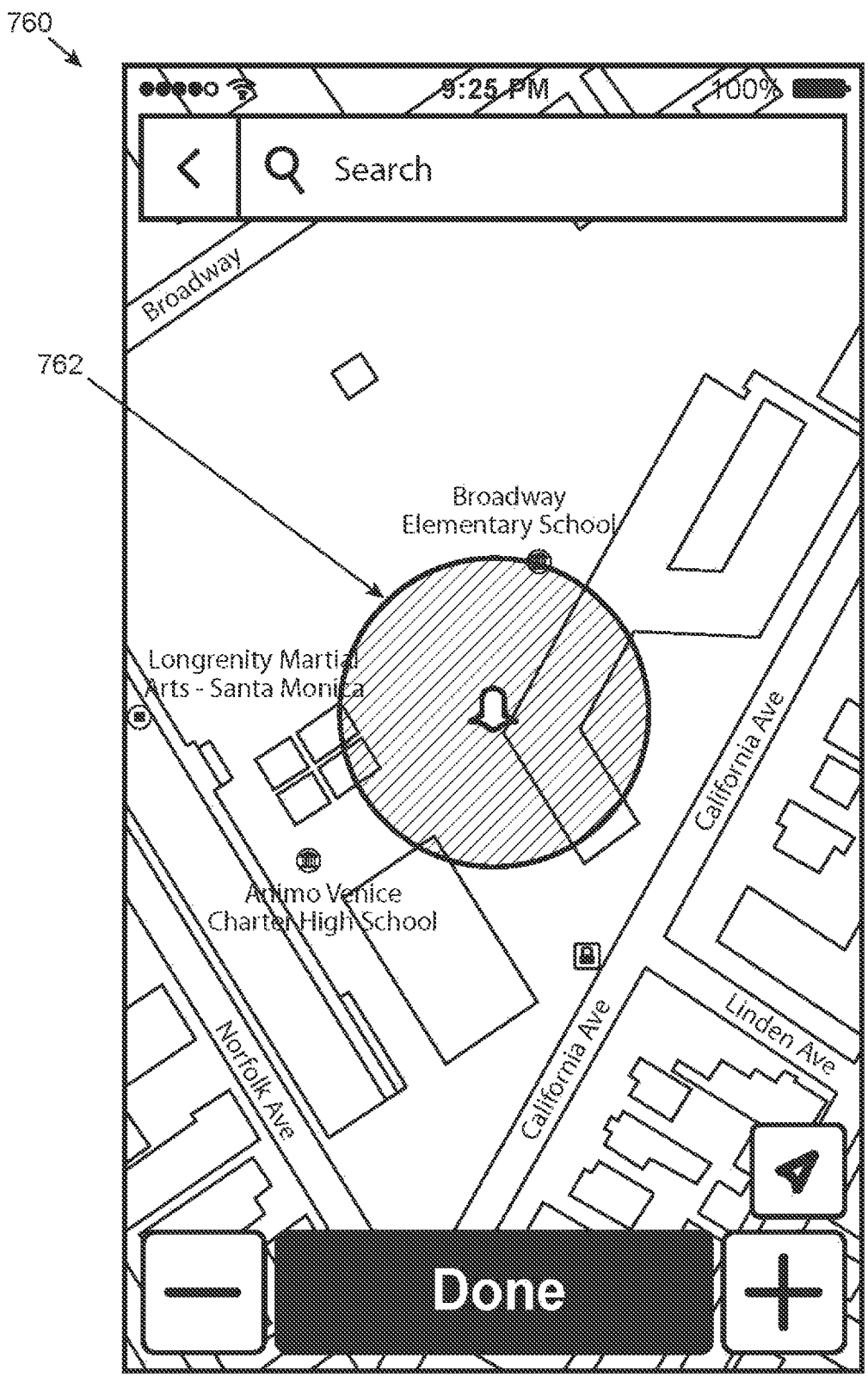
Figure 7H:
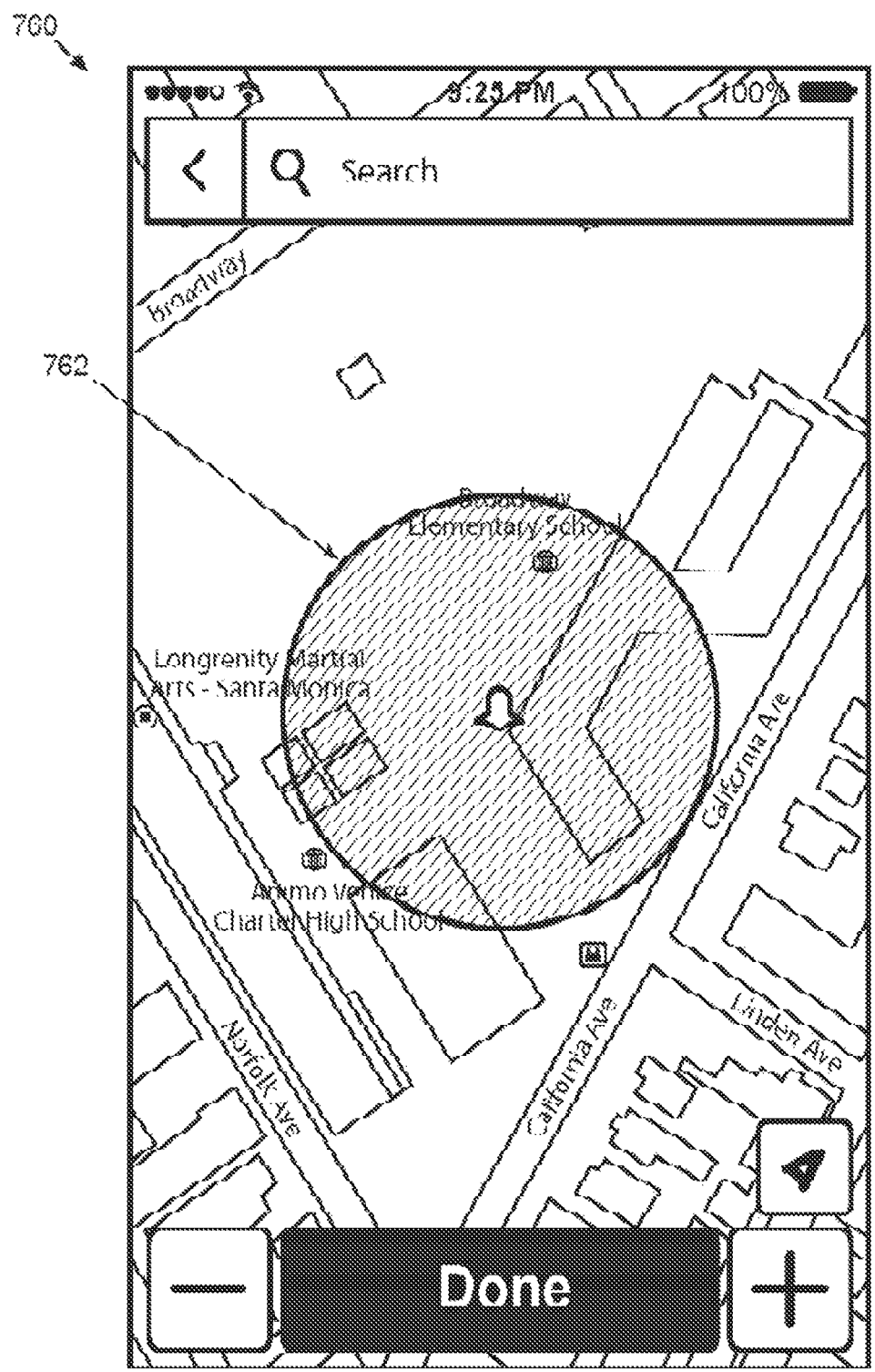

Another parameter may include setting a boundary or geofence to indicate the area in which users must be located to submit content messages for a media collection or where users must be located to view a media collection. The application 114 may include a predetermined maximum geofence or boundary size. If the user 106 would like to increase the maximum boundary size, the user 106 may need to pay an additional fee to do so, as shown in interface 750 in FIG. 7E. In one example embodiment, the user 106 may set the geofence and expand or decrease the size of the geofence radius via an interface such as the one shown in the interface 760 in FIGS. 7F, 7G, and 7H. For example, the user 106 may resize the area 762 from smaller (e.g., 7F) to larger (e.g., 7G, 7H) and vice versa.

Returning to FIG. 7D, another parameter may be the length of the life of the media collection (e.g., the duration of the event, 6 hours, 24 hours, 1 day, 1 week, etc.). There may be an option presented to the user 106 to increase the length 748 of the life of the media collection from a predetermined amount of time (e.g., 6 hours, duration of the event, etc.). In one example embodiment, the user 106 may need to pay an additional fee if he wishes to increase the length of the story to a length longer than the predetermined amount of time.

The user 106 may also be able to specify one or more audience members for the media collection. An audience member may be a user 106 who has permission to view the media collection. The user 106 may also be able to specify a max audience size 749 for which to share the media collection. In one example embodiment, there may be a predetermined maximum size, and the user 106 may need to pay an additional fee to increase the audience size to greater than the predetermined maximum size. The audience may be either a user 106 located in a geofence associated with the media collection, or a user 106 in the public who follows the media collection. For example, the user 106 may specify whether the media collection is public or private. If the user 106 specifies that the media collection is public, then anyone may view the media collection. If the user 106 specified that the media collection is private, then the audience is limited to a group or to users 106 within a specific geofence.

The user 106 may also be able to specify one or more contributors. A contributor may be a user 106 who has permission to post or submit content items or content messages to be included in the media collection. In one example embodiment, a contributor may need to be within the geofence associate with the media collection to post or submit content items or content messages to be included in the media collection. For example, a user 106 may only be given an option to send content messages to be included in the media collection if the user 106 is within the geofence for the media collection.

Once the user 106 enters the parameters of the media collection, he may submit the information to activate the media collection (e.g., via "Activate Media Collection" button 741) or may save the information (e.g., via "Save" button 743).

Figure 8:
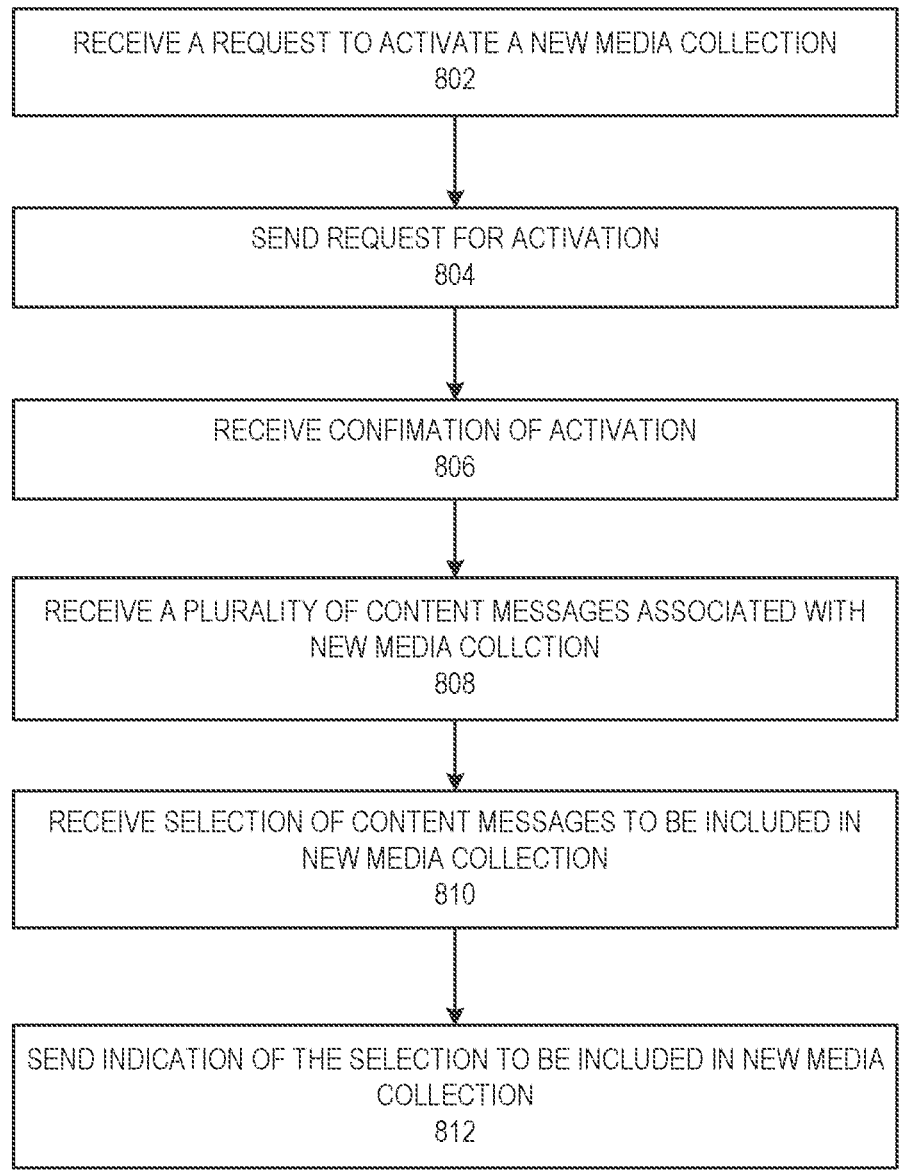
FIG. 8 is a flowchart illustrating aspects of a method, according to some example embodiments.

FIG. 8 is a flowchart illustrating aspects of a method 800, according to some example embodiments. For illustrative purposes, method 800 is described with respect to networked system 100 of FIG. 1. It is to be understood that method 800 may be practiced with other system configurations in other embodiments.

In operation 802 the client device 110 (e.g., a first computing device) may receive a request from a user 106 to activate a new media collection. The request may include one or more parameters, as described above. For example, the request may include a name for the media collection, a geofence associated with the media collection, one or more contributors, one or more audience members, a max audience size, a thumbnail, a length of the life of the media collection, etc.

In operation 804 the client device 110 may send the request to a server computer (e.g., at server system 120) for activation of the new media collection. The server computer may receive and evaluate the request and information and create a new media collection and store the associated information in one or more databases 126. The server computer may generate a message (e.g., confirmation) indicating that a new media collection has been created and send it to the client device 110. The client device 110 may receive, from the server computer, the confirmation that the new media collection was activated, as shown in operation 806.

The server computer may receive a plurality of content messages from a plurality of content sources (e.g., users 106 via client devices 110). The content messages may comprise media content (e.g., images, video, audio, etc.) and may be associated with one or more media collections, as explained above. For each of the plurality of content messages received by the server system 120 (e.g., by content processing server 124), the content processing server 124 may associate the content in the content message with one or more predetermined media collections, as also explained above. The content processing server 124 may store the content message associated with the one or more media collections, and/or may forward the content message associated to the appropriate client device 110.

The client device 110 may receive a plurality of content messages associated with the new media collection, as shown in operation 808. The plurality of content messages may be received from a plurality of users 106, as explained above. The client device 110 may display the plurality of content messages to the user 106 and the user 106 may be able to select one or more of the content messages to be included in the media collection. For example, the user 106 may select a subset or all of the content messages. In operation 810, the client device 110 may receive, from the user 106, a selection of the plurality of content messages to be included in the new media collection.

In operation 812, the client device 110 may send, to the server computer, and indication of the selection of the content messages to be included in the new media collection. The server computer may store the selection for the media collection and cause the selection of content messages to be included in the new media collection and displayed in response to a request from at least a second client device 110 (e.g., a second computing device) to view the media collection. For example, an audience member (e.g., the user 106 or another user 106) may view the media collection (e.g., the selection of plurality of content messages) on his client device 110. For example, the audience member may be within the geofence for the media collection or may enter a unique identifier (e.g., a username) or scan a code (e.g., QR code, barcode, etc.) to follow/view the media collection. In another example, the server computer may cause the new media collection to be displayed in response to the request from at least a second computing device after the server determines that a second user associated with the second computing device is part of a predefined audience.

Figure 9A:
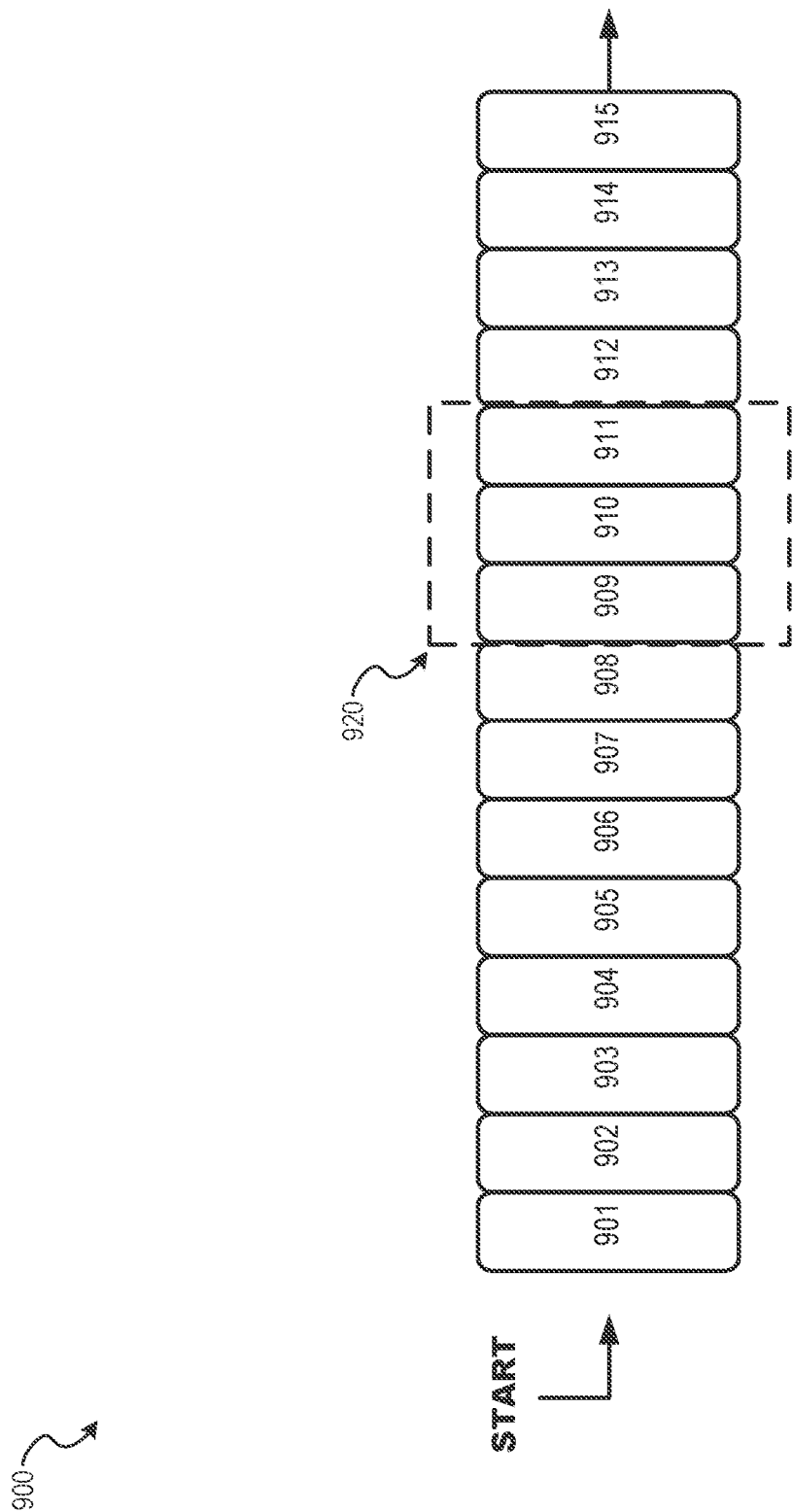
FIG. 9A illustrates a presentation order for content elements of a media collection in accordance with some example embodiments.
Figure 9B:
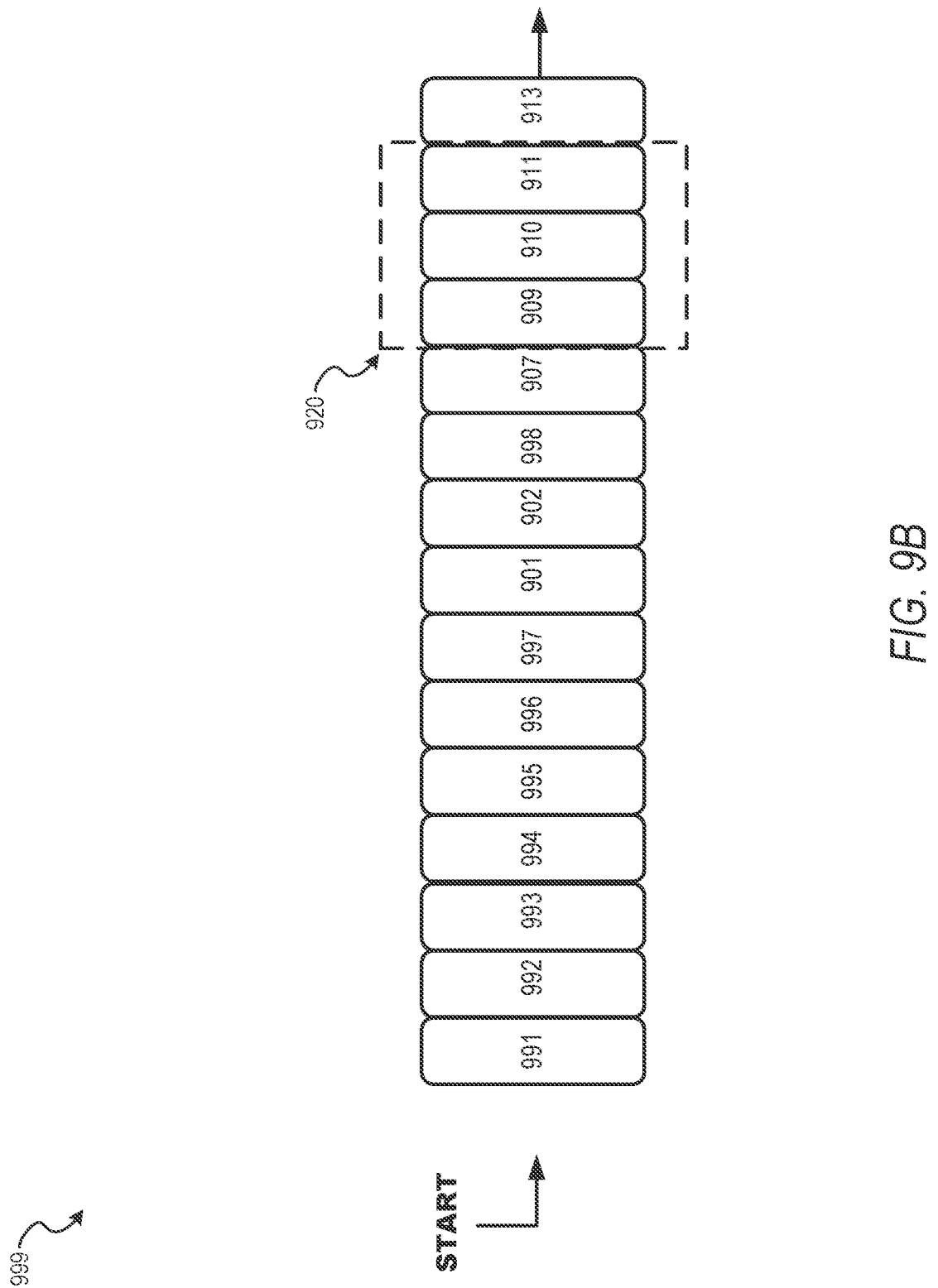
FIG. 9B illustrates a presentation order for content elements of a media collection in accordance with some example embodiments.

FIG. 9A illustrates a presentation order 900 for content elements 901-915 of a media collection in accordance with some example embodiments. FIG. 9B illustrates a second presentation order 999 for content elements of the same media collection presented in FIG. 9A in accordance with some example embodiments. In some embodiments, a first device requesting a media collection will receive the content in presentation order 900, and second client device requesting the same media collection may receive the media collection with presentation order 999 which includes content elements included in the media collection after the media collection content is sent to the first device. In some embodiments, the first device may receive the same content, with new content elements streamed as they are received.

Figure 10A:
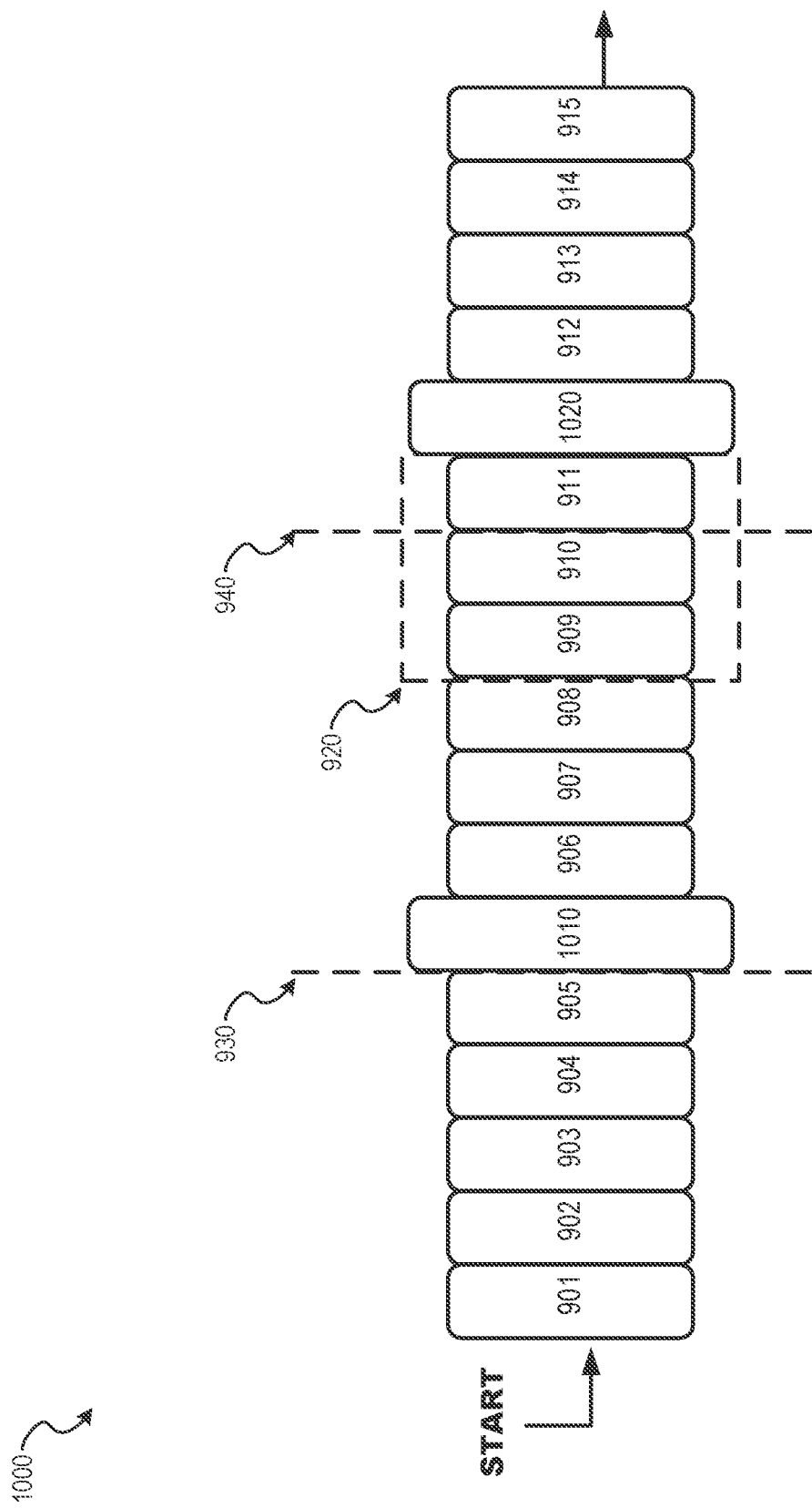
FIG. 10A illustrates an adjusted presentation order for content elements with advertising elements automatically inserted into the adjusted presentation order in accordance with some example embodiments.

FIG. 10A illustrates an adjusted presentation order 1000 for content elements 901-915 with advertising elements 1010 and 1020 automatically inserted into the adjusted presentation order 1000 in accordance with some example embodiments. As described above, client devices 110 may communicate content messages to a server system 120, and a content processing server 124 may sort these received messages to associate the messages and the content of the messages with media collections. In addition to simply identifying an association of content messages with media collections, as described above, various aspects of the content may be analyzed to determine a presentation order 900.

Presentation order determines the order in which content elements are displayed on a client device 110 when the media collection is selected from server system 120. In the example presentation order 900, content elements 901-915 are set by presentation order to be displayed in ascending order. In some embodiments, a user may select an interface option to navigate through the presentation order by skipping some or all display time for some presentation elements, but absent a user input, each content element of the media collection including content elements 901-915 displays for an associated display time before the next content element is automatically presented. In some embodiments, content order 900 is merely based on time, with all content elements selected to be included in the media collection displayed in a time based presentation order 900. In other embodiments, content scores or operator 108 curation are used to determine presentation order 900.

Over time, as new content messages are received, the presentation order 900 for the media collection of FIG. 9A may be updated to presentation order 999 of FIG. 9B for the same media collection with newly added content. Automatic updates or an alert initiated curation update may be used to adjust presentation order 900 to presentation order 999, which includes new content elements 991-997, along with previously included content elements 901, 902, 909-911, and 913.

Both presentation order 900 and presentation order 999 include continuous presentation group 920, which includes content elements 909, 910, and 911. As discussed above, continuous presentation group 920 may be generated by a selection of an operation 108 using an operator device 130 to select content elements 909, 910, and 911 to prevent these content elements from being interrupted by an advertising element. As the position of continuous presentation group 920 shifts within the media collection, the impact on advertising element placement stays the same. In some embodiments, the composition of a particular continuous presentation group may change. For example, continuous presentation group 920 could have another content element added between or adjacent to any of content elements 909-911, or could have any content element removed. In the absence of an adjustment from the system to change the association of continuous presentation group 920 or to remove member elements of continuous presentation group 920 from the media collection, the elements of continuous presentation group 920 remain together and are not interrupted by automatic insertion of advertising elements.

FIG. 10A then illustrates an adjusted presentation order 1000 associated with the presentation order 900 of content elements 901-915 of FIG. 9A. In adjusted presentation order 1000, advertising elements are inserted into presentation order 900 periodically. In the example of FIG. 10A, every 5 content elements, an advertising element is inserted, so that advertising insertion point 930 and advertising insertion point 940 are set as positions for advertising element placement of advertising elements 1010 and 1020. Because advertising insertion point 940 occurs within continuous presentation group 920, the placement of advertising element 1020 is adjusted to avoid interfering with the continuous display of content elements 909-911.

Figure 10B:
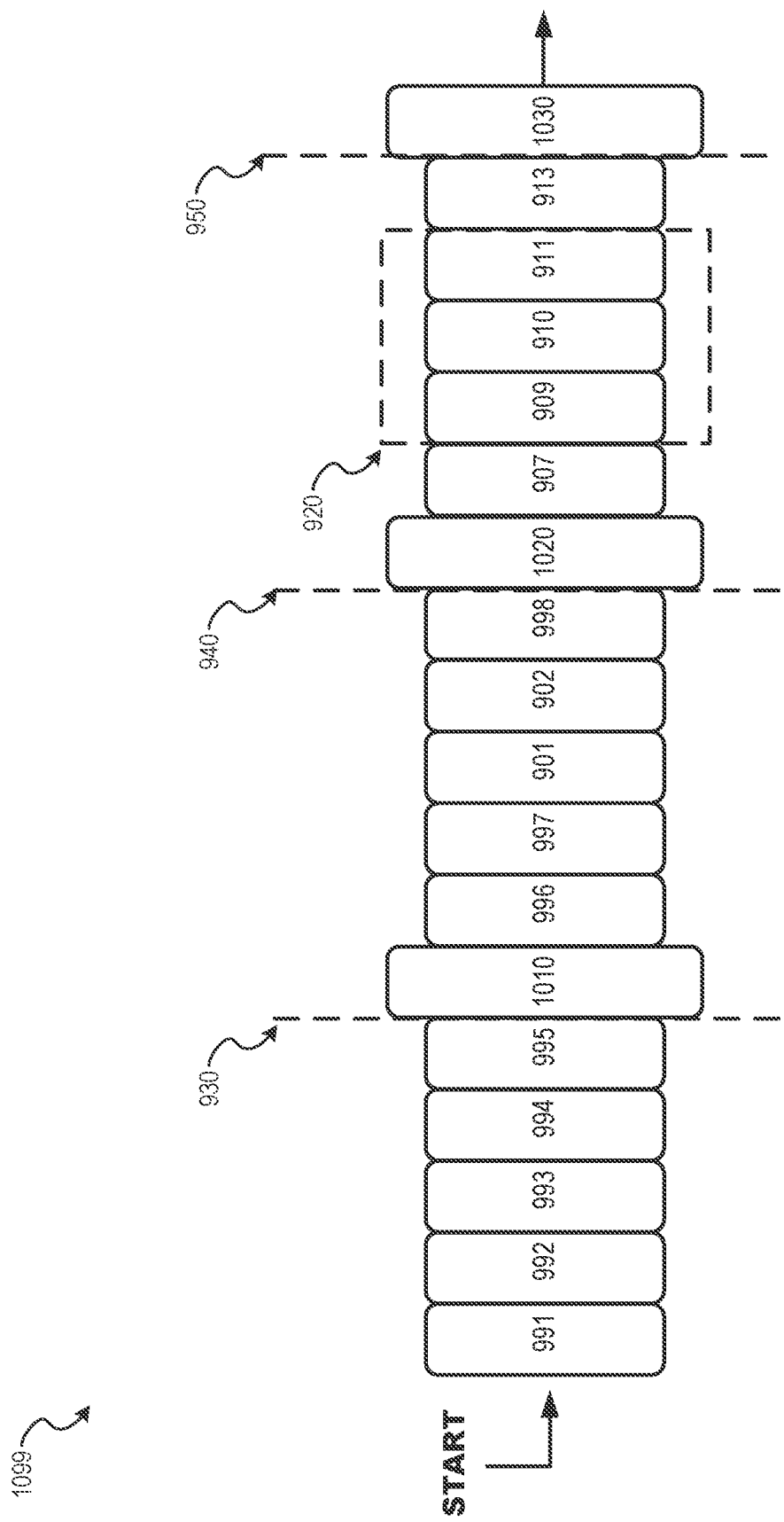
FIG. 10B illustrates an adjusted presentation order for content elements with advertising elements automatically inserted into the adjusted presentation order in accordance with some example embodiments.

FIG. 10B illustrates a similar adjusted presentation order 1099 corresponding to presentation order 999 of FIG. 9B. In FIG. 10B, the position of continuous presentation group 920 has shifted to a position where no advertising insertion point 930, 940, 950 falls within continuous presentation group 920, and so advertising elements 1010, 1020, and 1030 are placed at the periodic position determined by the system rule for advertising placement.

In other embodiments, any number of continuous presentation groups may be presented within a media collection, and a media collection may have any number of content elements as well as multiple rules for advertising element placement. In some embodiments, multiple advertising elements are placed together at advertising insertion points. In some embodiments, a combination of a number of content elements as well as a minimum time between a most recent advertising element display are used to determine a next advertisement insertion point.

FIGS. 9A-B and 10A-B are described above as associated with a single media collection. In some embodiments, autoforwarding between media collections results in the continuous display of content elements, until a user device 110 input terminates display of content and autoforwarding between content collections. In some such embodiments, advertising elements are inserted between content collections, as well as periodically between content elements of a content collection.

In addition, as described above, continuous presentation group 920 may be generated by operator 108 selection. In other embodiments, however, continuous presentation groups may be automatically generated by content processing server 124. In such embodiments, an analysis tool described herein may be used to associate particular content elements with a continuous presentation group. For example, content elements showing the same object from multiple view, or the same object or position over time may be automatically associated to generate a continuous presentation group. In some embodiments, content including text or drawings related to another content element may be associated within a continuous presentation group. In other embodiments, any other such operations for associating content elements into continuous presentation groups may be used.

In addition to spacing advertising elements based on a number of content elements, other system rules may be used for spacing advertising elements. Some embodiments particularly provide benefits by enabling a regular advertising experience for a user within a content where many different content elements with a short duration may be presented as part of one or more media collections. By tracking both the presentation order of content and adjusted presentation orders with advertising elements included, a standard user experience may be generated automatically by a server system 120. In contrast with, for example, a television environment or news story environment where a scripted video or audio content with a scheduled expected content display time is used with advertising between content, the environment with client devices 110 communicating large numbers of content messages which are updated regularly is an environment where a user experience may vary based on automatically selected content. In some embodiments, advertisement placement points may occur between dozens of content elements that are only a few seconds long. In some embodiments hundreds of content elements are displayed between advertising elements.

Figure 11:
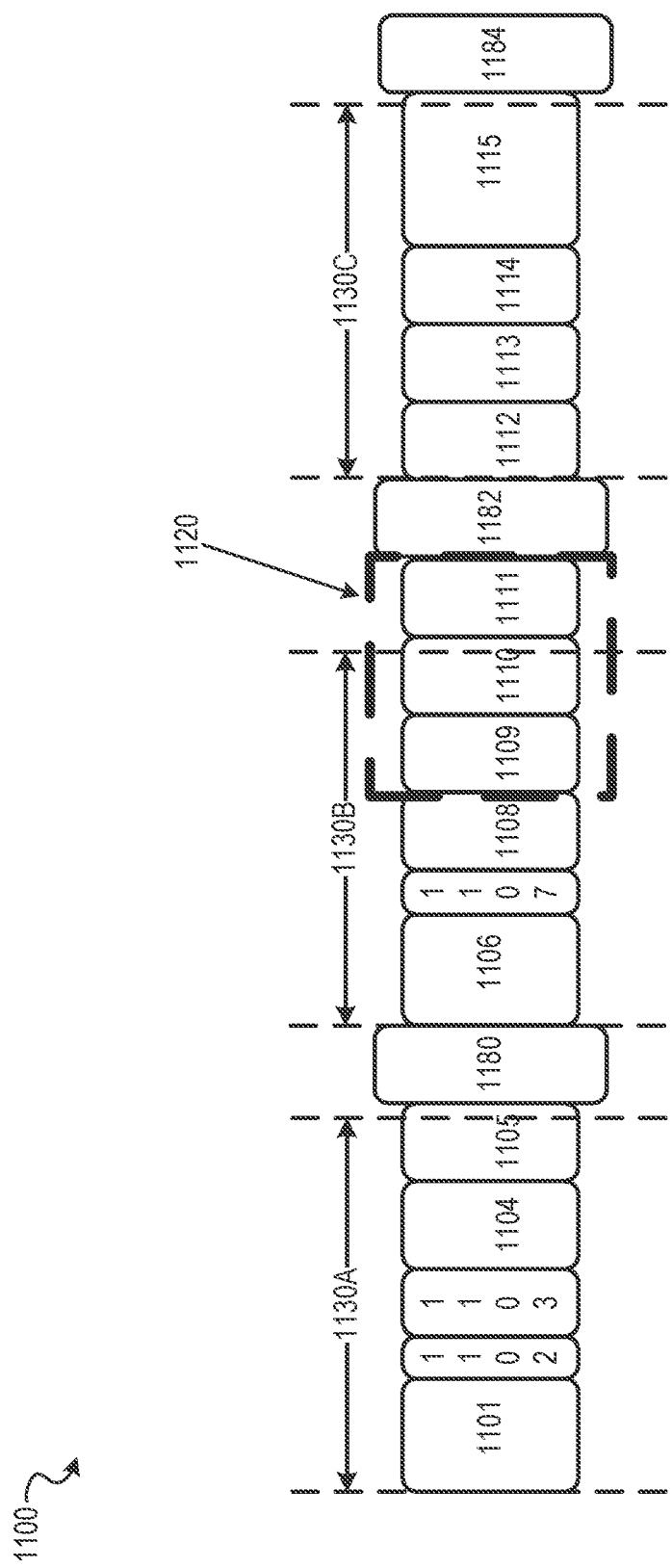
FIG. 11 illustrates an adjusted presentation order for content elements with advertising elements automatically inserted in accordance with some example embodiments.

FIG. 11 illustrates an adjusted presentation order 1100 for content elements 1101-1115 with advertising elements 1180, 1182, and 1184 automatically inserted. As illustrated in FIG. 11, the display time of content elements 1101-1115 may vary. This variation may be due to a selection by a user of a client device generating the content elements for the original content message, or may be due to a client device that is displaying the media collection receiving an input at a user interface to skip to a next element. In the embodiment of FIG. 11, advertising elements such as advertising element 1180, 1182, and 1184 are inserted based on display times for content, illustrated by content display threshold 1130.

In the embodiment of FIG. 11, display of media content in presentation order 1100 begins with content element

1101, and proceeds through the display of content element 1105. During display of content element 1105, a first content display threshold 1130A is met, and so at least a first advertising element 1180 follows content element 1105. Following display of advertising element 1180, a counter associated with content display threshold 1130B may begin. Content display threshold 1130B is met during display of content element 1110, but content element 1110 is part of continuous display group 1120, and therefore the next advertising element 1182 is delayed until after content element 1111, which is the final content element of continuous display group 1120. Presentation order 1100 then continuous with display of content elements 1112-1115 until threshold 1130C is met, and advertising element 1184 then follows. The display presented on the content device may then continue with additional elements associated with the content or media collection. In some embodiments, a single content collection may continue presenting new content and advertising elements indefinitely, when new content messages provide content elements for the media collection faster than the content elements are displayed. In other embodiments, content collections are closed, and do not have content added over time. In such embodiments, display of content elements for a particular media collection may end. In such embodiments, a server system may automatically select a next content collection, and automatically begin sending content elements for the next content collection, along with inserted advertising elements, to the device. This may continue indefinitely until a device receives a command to terminate media collection display, or the device loses network access to the server system. In such autoforward systems, the timing for advertising elements may reset at the end of each content collection, with our without one or more advertising elements at the end of the content collection, before content elements for the new content collection begin display.

Additionally, as described above, some display orders may be responsive to user inputs at a client device. In such embodiments, an initial display order may be communicated from a server system to the client device, and the client device may adjust the presentation order in response to user inputs received at the device (e.g. inputs to skip to a next element.) For example, in the embodiment of FIG. 11, an expected presentation order different from the one shown may be received at a client device from a server system, and the client device may track the display timing against the display threshold 1130 to determine when to display advertising elements. In such embodiments, the client device may such determinations in conjunction with received information about continuous display groups, rather than the decision being made at the server device(s).

FIG. 12 illustrates a method for communicating content elements with automated advertising in accordance with some embodiments. In various embodiments, method 1200 may be implemented in a server system 120, a content processing server 124, or using any device or combination of devices described herein. In some embodiments, method 1200 is represented by a non-transitory computer readable medium comprising instructions that, when executed by one or more processors, cause a device to perform method 1200.

Method 1200 includes receiving, at a server computer, a first plurality of content messages from a plurality of content sources, each content message comprising media content, and each content message being associated with a first media collection in operation 1202. Then, in operation 1204, the server generates a presentation order for the first plurality of messages of the first media collection. The server also generates at least a first continuous presentation group by associating a first content element from a first content message of the plurality of content messages and a second content element from a second content message of the plurality of content messages to associate the first content element and the second content element as the first continuous presentation group in operation 1206.

In operation 1208, advertising element placement within the presentation order for the first media collection is determined, and in operation 1210, placement of a first advertising element within the presentation order is adjusted based on the association between the first content element and the second content element as the continuous presentation group to generate an adjusted presentation order.

In some embodiments, the server computer receives requests for the media collection from client devices, and the server computer sends the content elements and advertising elements to the client devices using the adjusted presentation order. In embodiments where a "live" content collection is updated over time, the adjusted presentation order may be updated automatically or in response to curated operator inputs to further adjust the presentation order as described above. Different client devices requesting the same media collection may thus have the media collection presented with different content elements, advertising elements, and presentation orders depending on the timing of the request.

Further, as mentioned above, in some embodiments, determining advertising element placement comprises periodically inserting an advertising element between content elements following a set number of content elements. This may be performed automatically by modules of a server computer. In some embodiments, this automated advertising placement is combined with curated ad placement, or is adjusted by various rules including identified continuous presentation groups. For automatic placement, a threshold time period may be used to periodically insert advertising elements between content elements. In other embodiments, a counter may place advertising elements following threshold numbers of content elements (e.g. following a set number of photos, video clips, or other discrete content elements from content messages.) In other embodiments, a combination of content elements and timing may be used. In some embodiments, for example, a table may be used to match timing and numbers of elements, such that a timing threshold changes slightly as the number of content elements in a row presented increases. In other embodiments, various other combinations of thresholds may be used to determine placement of advertising elements in a presentation order.

In FIGS. 10A, 10B, and 11, the advertising element is shown following completion of a content element after a threshold has been met. In some embodiments, an advertising element may be placed before a threshold is met. For example, in some embodiments where a long continuous presentation group is present, and a threshold falls near the beginning of the group, the system or displaying device places an advertisement element before the continuous presentation group. In some embodiments, a device may determine if a threshold is expected during the first half of a content element or group, and essentially "round" to the beginning or end, depending on system settings and where the threshold falls within the content. In other embodiments, other methods for determining exact placement of advertising elements is used.

In various embodiments described above, an initial or baseline presentation order may be generated and have advertising elements inserted based on display thresholds that assume that content elements and advertising elements are displayed for a full time associated with each element. This full time for each element is a full runtime for any video clips, and a display time associated with images that may be set when the image is captured, by the server system automatically, by a curator or operator 108, or using any other selection process. Some embodiments, as mentioned above, allow users viewing media collections to navigate through the display order, including skipping to a next content element, or skipping to a next advertising element. In embodiments where media collections are made up of content elements having associated display times that are similar to or shorter than the display times of advertising elements, automatic balancing presents a technical problem not present in other media environments, where longer pieces of content with interspersed advertising (e.g. a 10-15 minute content segments separated by 3-5 minute advertising segments) is highly curated and broadcast without individual customization and limited opportunity for the broadcaster to know if certain content is skipped. Embodiments described herein, where content elements received from client devices are used to generate media collections with advertising elements in a display order customized for individual users provides benefits for efficiency, user feedback, and an enhanced user experience customized by automatic feedback from user selections.

For example, in some embodiments, when an advertising element begins displaying, an interface allowing a user to select to end the advertising element display may be presented. In some embodiments, a minimum display time may be used. For example, an advertising element with a full display time of 20 seconds may have a minimum display time of 2 seconds, after which the rest of the advertising element may be skipped. In such embodiments, the use of simple thresholds may not provide desirable balance between content elements and advertising elements. Some embodiments may thus track actual display time associated with content elements compared with actual display time for advertising elements, and dynamically adjust presentation order for an individual user account or device based on the actual display time on the device, rather than expected display times determined at the server system. Some such embodiments use a target ratio of advertising display time to content display time to determine a presentation order. Some embodiments may use a window of acceptable advertising to content ratios. Some embodiments may use a combination of minimum content elements or continuous content display times coupled with target content to advertising rations. Various embodiments may use other such metrics to generate and adjust a presentation order to balance display of content elements and advertising elements.

Figure 13:
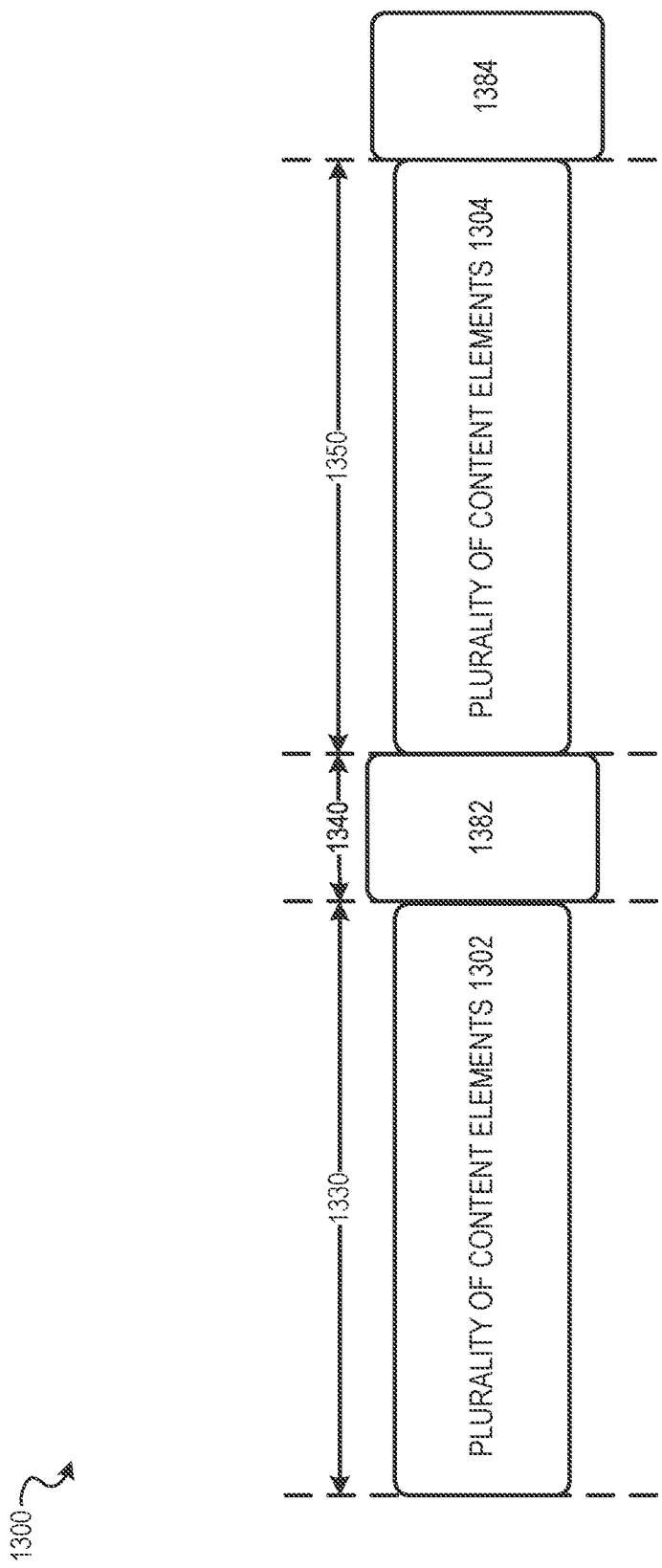
FIG. 13 illustrates a presentation order for a media collection in accordance with some example embodiments.

FIG. 13 illustrates an example presentation order 1300, with a plurality of content elements 1302 followed by an advertising element 1382, followed by a second plurality of content elements 1304, followed by a second advertising element 1384. For the purpose of illustration, the representative advertising element 1382 is associated with a full display time 1340. In some embodiments, when the media collection associated with presentation order 1300 begins displaying content of the plurality of content elements 1302, the device displaying the media collection begins tracking display times. After advertising element 1382 finishes, the device will have an advertising display time to content element display time ratio, which is display time 1340 divided by display time 1330. This ratio may be compared with a target ratio, and the number of content elements scheduled for the plurality of content elements 1304 can be adjusted to influence the target ratio. Similarly, a display time associated with advertising element 1384 may be adjusted based on the actual ratio compared with the target ratio, or additional advertising elements may be scheduled following advertising element 1384.

Some embodiments may have additional guidelines or system settings for presentation orders. For example, a minimum display time between groups of advertising elements may be used, a minimum initial content display time may be used, a minimum number of sequential content elements may be used, or any other such presentation order limits or thresholds may be used, in some embodiments, in addition to a target ratio of advertising display time to content display time.

Some embodiments, for example, are structured with a target content display time followed by a target advertising display time as a target display unit. After a media collection is selected for display at a device, the initial display unit such as the plurality of content elements 1302 and advertising element 1382 may be structured so that the target ratio of content display to advertising display is met if no user inputs to skip content are received. Without such user inputs, a server scheduled presentation order is maintained within the system settings and at the target advertising to content ratio.

Figure 14:
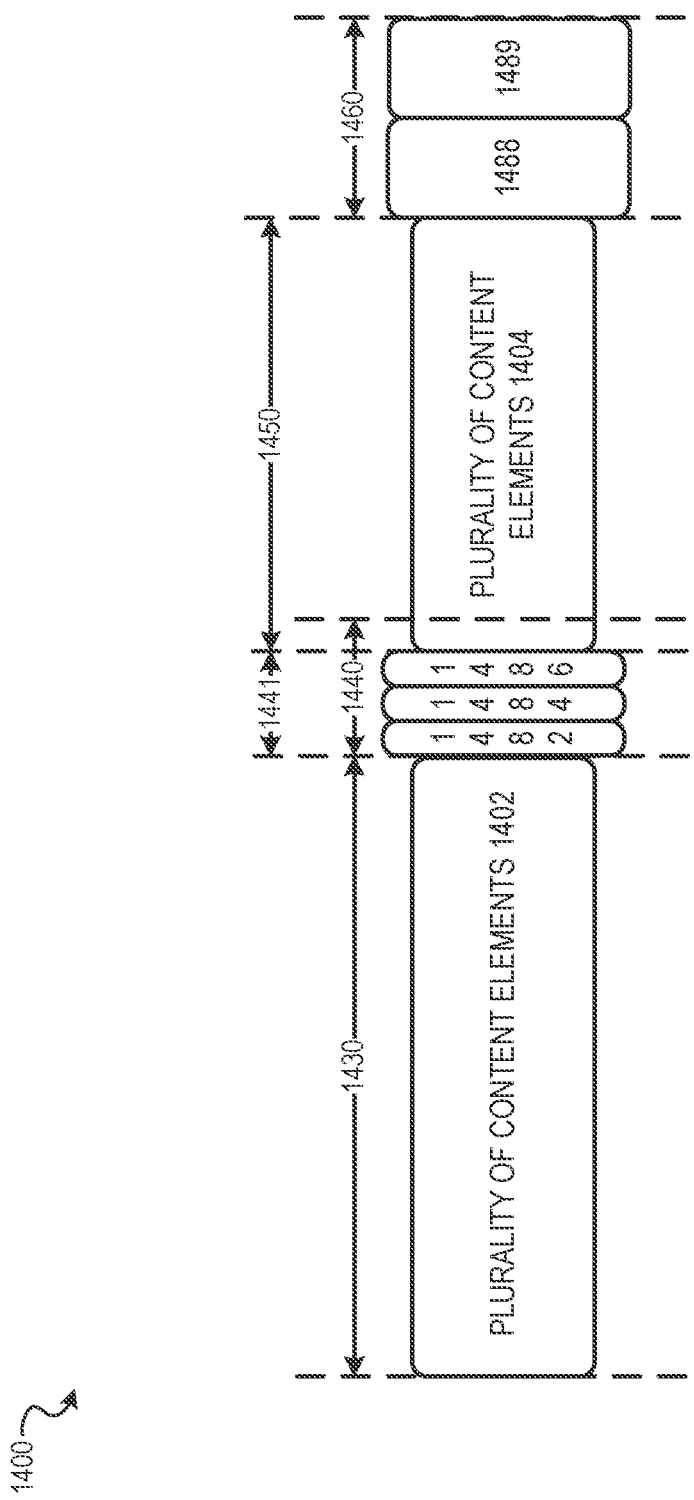
FIG. 14 illustrates a presentation order for a media collection in accordance with some example embodiments.

In FIG. 14, however, after the initial display of the plurality of content elements 1402 for content display time 1430, user inputs to skip portions of advertising elements 1482, 1484, and 1486 are received. In the embodiment of FIG. 14, a minimum advertising display time 1441 is present, and so the presentation order is adjusted to presentation order 1400 from a previous presentation order which targeted presentation of advertising element 1482 for a full advertisement time of 1440. Because of the received input to skip the remaining content of advertising element 1482, the presentation order is adjusted to include advertising element 1484. Similarly, when advertising element 1484, is skipped, advertising element 1486 is added. Due to a maximum continuous number of advertising elements in the embodiment of FIG. 14, following the input to skip presentation of advertising element 1486, display of the plurality of content elements 1404 begins with an actual ratio of advertising display to content display (e.g. time 1441 divided by time 1430) lower than the target ratio which was associated with display time 1440 following display time 1430. Based on the actual ratio of advertising display to content display being lower than the target following display of a portion of advertising element 1450, the number of content elements associated with the plurality of content elements 1404 may be reduced to shorten the content display time between display of advertising elements 1486 and 1488. Similarly, advertising element 1489 may be added to presentation order 1400, so that the display unit of content and advertising during display times 1450 and 1460 bring the overall ratio of advertising display to content display back to the target ratio.

Various embodiments thus operate with the following limits: a minimum and/or maximum number of sequential content elements, a minimum and/or maximum continuous content display time, a minimum and/or maximum number of sequential advertising elements, a minimum and/or maximum continuous advertising display time, a minimum display time for an individual content element or advertising element, a minimum and/or maximum ratio of content display time to advertising display time since the beginning of display for a media collection, a minimum and/or maximum ratio of content display time to advertising display time for each content and advertising display unit, a minimum and/or maximum ratio of content display time to advertising display time during display of multiple content collections (e.g. during autoforward operation), or any other such operational limits. Different embodiments may operate with combinations of any or all such limitations, using a combination of automatic system adjustments or operator curated adjustments to presentation order of content elements and advertising elements to achieve the targets.

Figure 15:
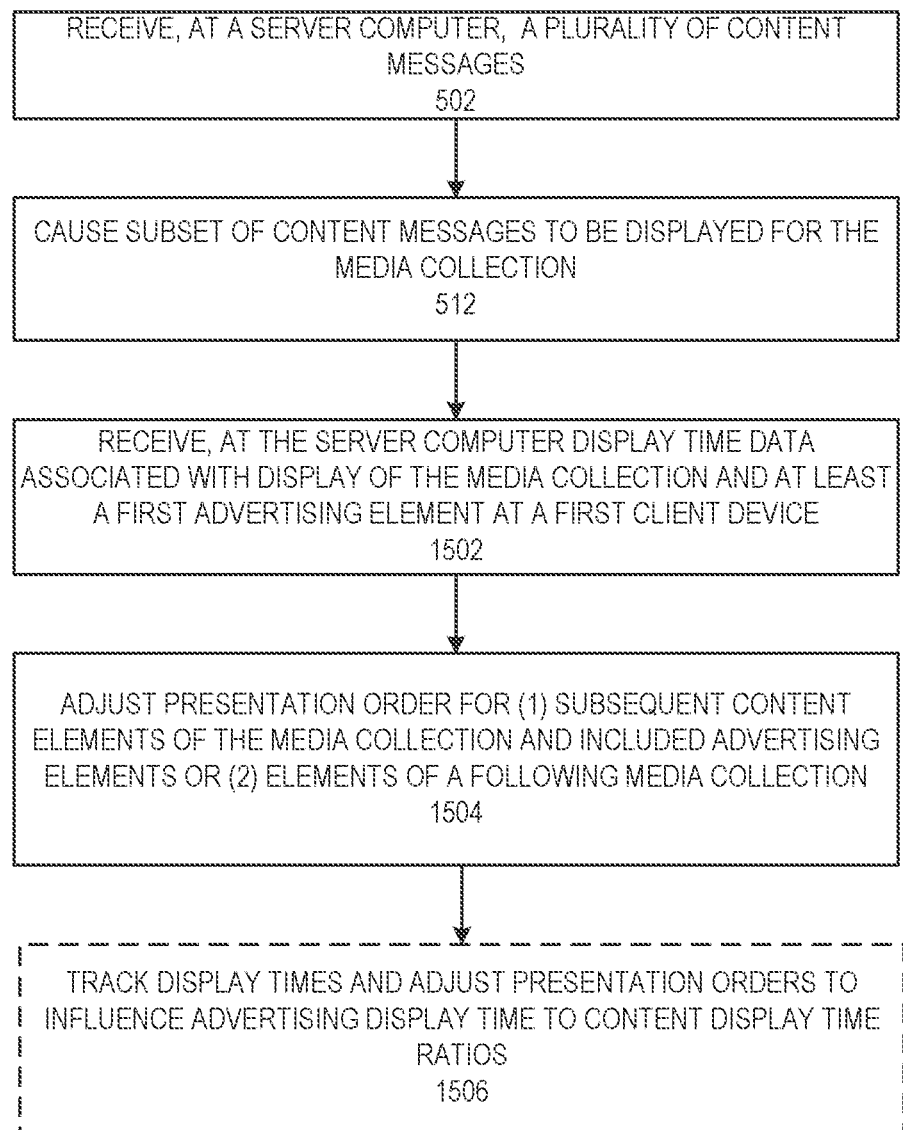
FIG. 15 illustrates a method for communicating content elements with automated advertising in accordance with some embodiments.

FIG. 15 then describes an example method 1500 for determining a presentation order in accordance with some embodiments. Method 1500 begins with operations 502 and 512, similar to the operations described above for method 500. In method 1500, following display of content messages, a server computer receives display time data associated with display of the media collection and at a first client device. For example, this operation 1502 may, in some embodiments, involve receiving data for times 1330 and 1340 following display of the plurality of content elements 1302 and advertising element 1382 in the embodiment of FIG. 13. Similarly, this could involve receiving a communication with data for times 1430 and 1441, as well as a separate communication for times 1450 and 1460 in the embodiment of FIG. 14. In operation 1504, this information is used to adjust the following presentation order. In some embodiments, this involves adjusting the order of content elements and advertising elements for the same media collection that continues to be displayed on the client device that provided the display time data. In some embodiments, this involves adjusting a presentation order for a subsequent media collection to be displayed on the first client device that provided the display time data. In operation 1506, display times are then tracked over time as media collections are presented on a user device to influence advertising display time to content display time ratios. In some embodiments, this tracking may be performed for a user account in a communication system that uses multiple devices, such that the target ratio may be set for all viewing from multiple devices associated with the account. As described above, in addition to targeting advertising to content display ratios, the display time data may be used to meet other content and advertising targets for a system as well.

Figure 16:
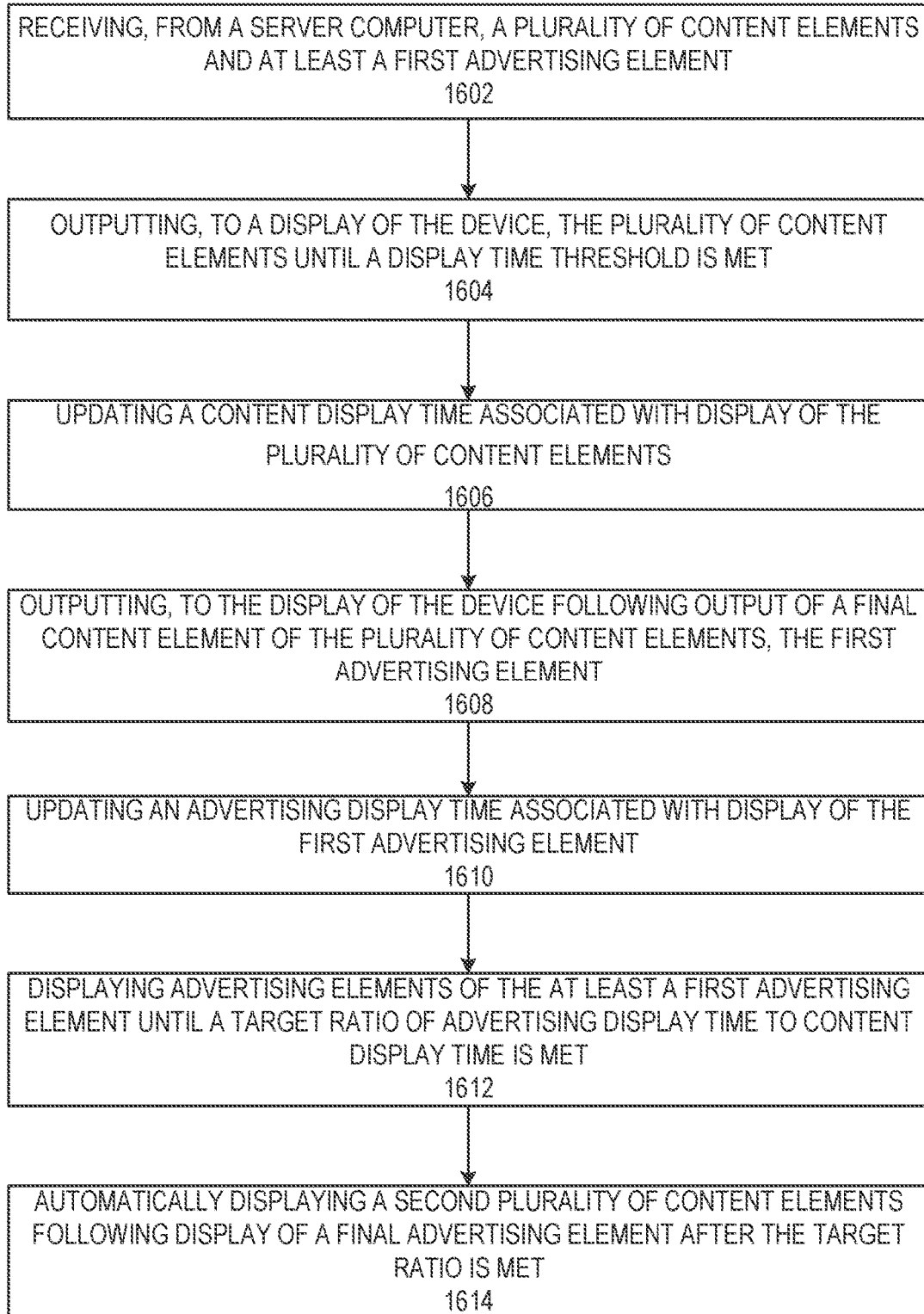
FIG. 16 illustrates a method for communicating content elements with automated advertising in accordance with some embodiments.

FIG. 16 describes an additional embodiment of a method for setting a presentation order. Method 1600 of FIG. 16 describes a method performed by a client device. In various other embodiments, similar or corresponding operations are performed by a server computer, either to enable the described operations at the client device, or to enable similar operations at a server computer in accordance with the function of the various different embodiments. Additionally, various embodiments may perform similar operations in varying order, including repetition of some or all described operations, or inclusion of additional operations between the described operations.

Method 1600 begins with operation 1602 involving the client device receiving, from a server computer, a plurality of content elements and at least a first advertising element. The client device outputs the plurality of content elements to a display of the device until a display time threshold is met in operation 1604. In some such embodiments, the plurality of content elements are associated with a presentation order from the server computer, and the advertising element is received from the server computer, but not scheduled within the presentation order. After the display time threshold is met in operation 1604, operations 1606 and 1608 occur in any order, or simultaneously. In operation 1606, the client device updates a content display time associated with display of the plurality of content elements, and in operation 1608, the client device displays the first advertising element following display of a final content element of the plurality of content elements. In other words, after the threshold for display of content is met, the device finishes displaying the current content element, either until a display time associated with the content element finishes, or a user input terminating display of the content element occurs. Following this, an advertisement element is displayed After the first advertising element finishes displaying as part of operation 1608, then in operation 1610, the client devices updates an advertising display time associated with display of the first advertising element. Based on the content display time and the advertising display time, the client device determines if a target ratio of advertising to content display time is met in operation 1612. If the ratio is not yet met (e.g. if an actual ratio of advertising to content is below a target), then the device follows the first advertising element with a second advertising element. The device continues displaying advertising elements until the target is met in operation 1612. As described above, in some embodiments, a maximum number of sequential advertising elements may be included as a limit in some embodiments. For example, one embodiment may have a maximum number of 4 sequential advertising elements. After four advertising elements are initiated sequentially, such an embodiment will display a content element after the fourth advertising element even if the target ratio is not met. In other embodiments, other limits may be used.

In the embodiment of method 1600, after the target ratio is met in operation 1612, then in operation 1614, a second plurality of content elements is displayed following display of the final advertising element. In various embodiments, display of a content element or an advertising element is not terminated because a ratio is met, and the device may updating the actual ratio during display of an advertising element or only between elements. For example, in some embodiments, a user may interact with an advertising element to select a long form advertisement, a link to additional advertising content, or other such interactions that extend an expected display time for the advertising element. In some embodiments, this allows the actual ratio of advertising display to far exceed a minimum target ratio. In some embodiments, maximum advertising to content ratios may also be used, such that the second plurality of content elements is extended until the ratio of advertising to content falls below the maximum ration. In other embodiments, such ratios may only apply to a certain number of recent display units, or to a single display unit (e.g. a combination of a set of continuous content elements followed by a one or more continuous advertising elements.)

Various additional embodiments may operate in a variety of ways, or in combination with other embodiments described herein. For example, in some embodiments, each content element of the plurality of content elements of a media collection or content collection is associated with an individual display time. This may, for example, be a maximum display time of five seconds, ten seconds, 15 seconds, one minute, or any such time limit. Similarly, minimum display times such as one second or three seconds may be implemented before a user may skip a content or advertising element.

Some embodiments may operate according to method 1600, with additional operations following. For example, in some embodiments, additional operations include receiving, at an input of the device, a user selection terminating display of the first advertising element prior to a complete display of the first advertising element, and in response to the input, selecting the target ratio as a minimum target ratio. The client device then adjusts a display order associated with the second plurality of content elements to reduce a time from an end of the first advertising element to a beginning of a second advertising element.

Similarly, some further embodiments involve operations of displaying the second advertising element for a full display time and displaying a second plurality of advertising element comprising the second advertising element until a full target ratio of advertising display time to content display time is met, wherein the full target ratio is larger than the minimum target ratio.

An additional embodiment involves receiving, at an input of the device, a user selection interacting with the first advertising element prior to a complete display of the first advertising element. Then, in response to the input, the client device extends a display time associated with the first advertising element and adjusts a display order associated with the second plurality of content elements to increase a time from an end of the first advertising element to a beginning of a second advertising element.

Additional such operations or combinations of operations should be apparent from the various descriptions provided herein.

Figure 17:
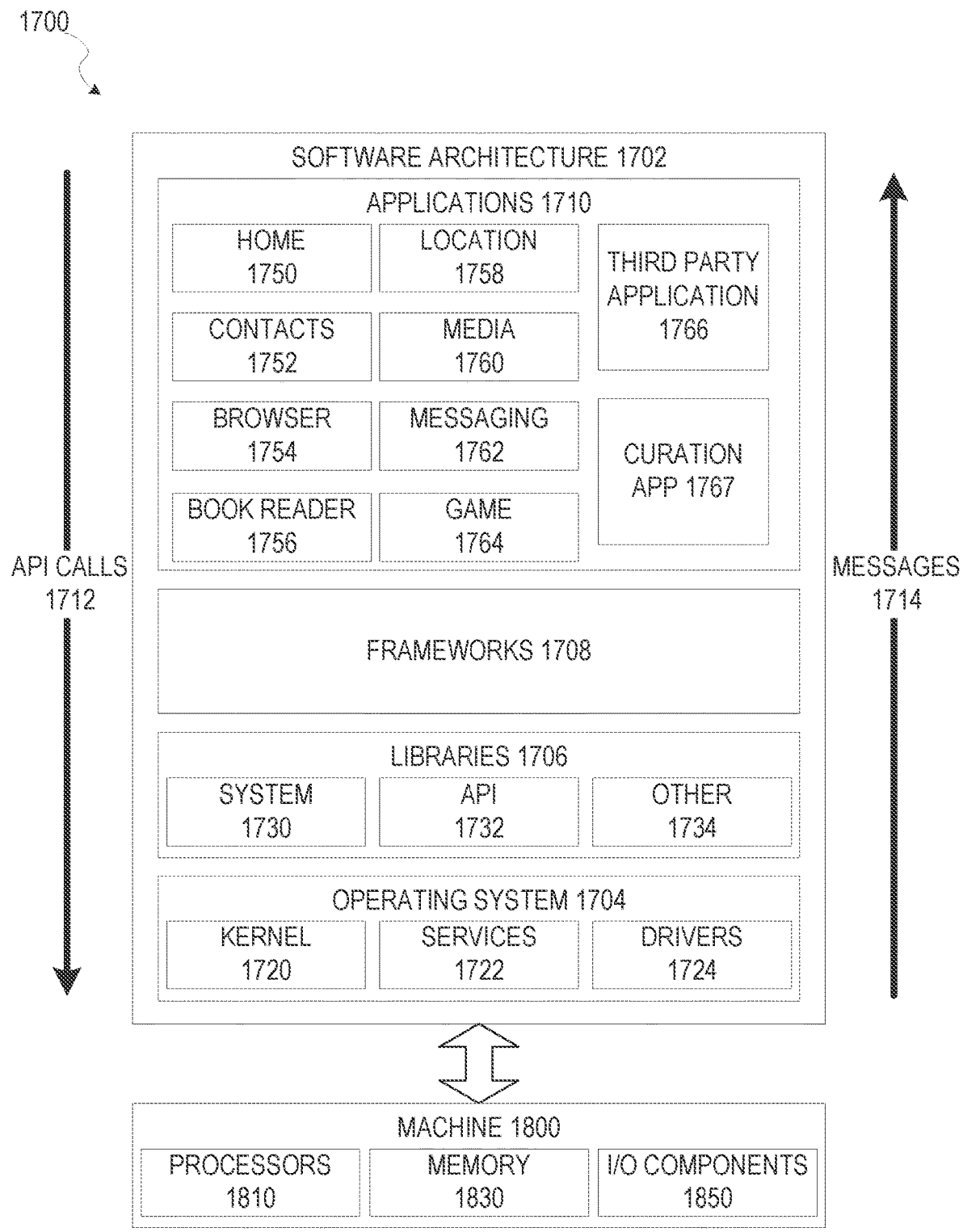
FIG. 17 is a block diagram illustrating an example of a software architecture that may be installed on a machine, according to some example embodiments.

FIG. 17 is a block diagram 1700 illustrating architecture of software 1702, which can be installed on any one or more of the devices described above. For example, in various embodiments, client device(s) 110, operator device(s) 170, server system 120, and web server 122, and content processing server 124, may be implemented using some or all of the elements of software architecture 1702. FIG. 17 is merely a non-limiting example of a software architecture, and it will be appreciated that many other architectures can be implemented to facilitate the functionality described herein. In various embodiments, the software architecture 1702 is implemented by hardware such as machine 1800 of FIG. 18 that includes processors 1810, memory 1830, and I/O components 1850. In this example architecture, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke application programming interface (API) calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third party application 1766 (e.g., an application 1710 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1766 can invoke the API calls 1712 provided by the operating system 1704 to facilitate functionality described herein.

Some embodiments may particularly include a curation application 1767. In certain embodiments, this may be a stand-alone application that operates to manage communications with a server system such as server system 120. In other embodiments, this functionality may be integrated with another application such as a media application 1760 or another such application. Curation application 1767 may manage collection of content using a camera device of machine 1800, communication with a server system via I/O components 1850, and receipt and storage of received media collections in memory 1830. Presentation of content and user inputs associated with content may be managed by curation application 1767 using different frameworks 1708, library 1706 elements, or operating system 1704 elements operating on a machine 1800.

Figure 18:
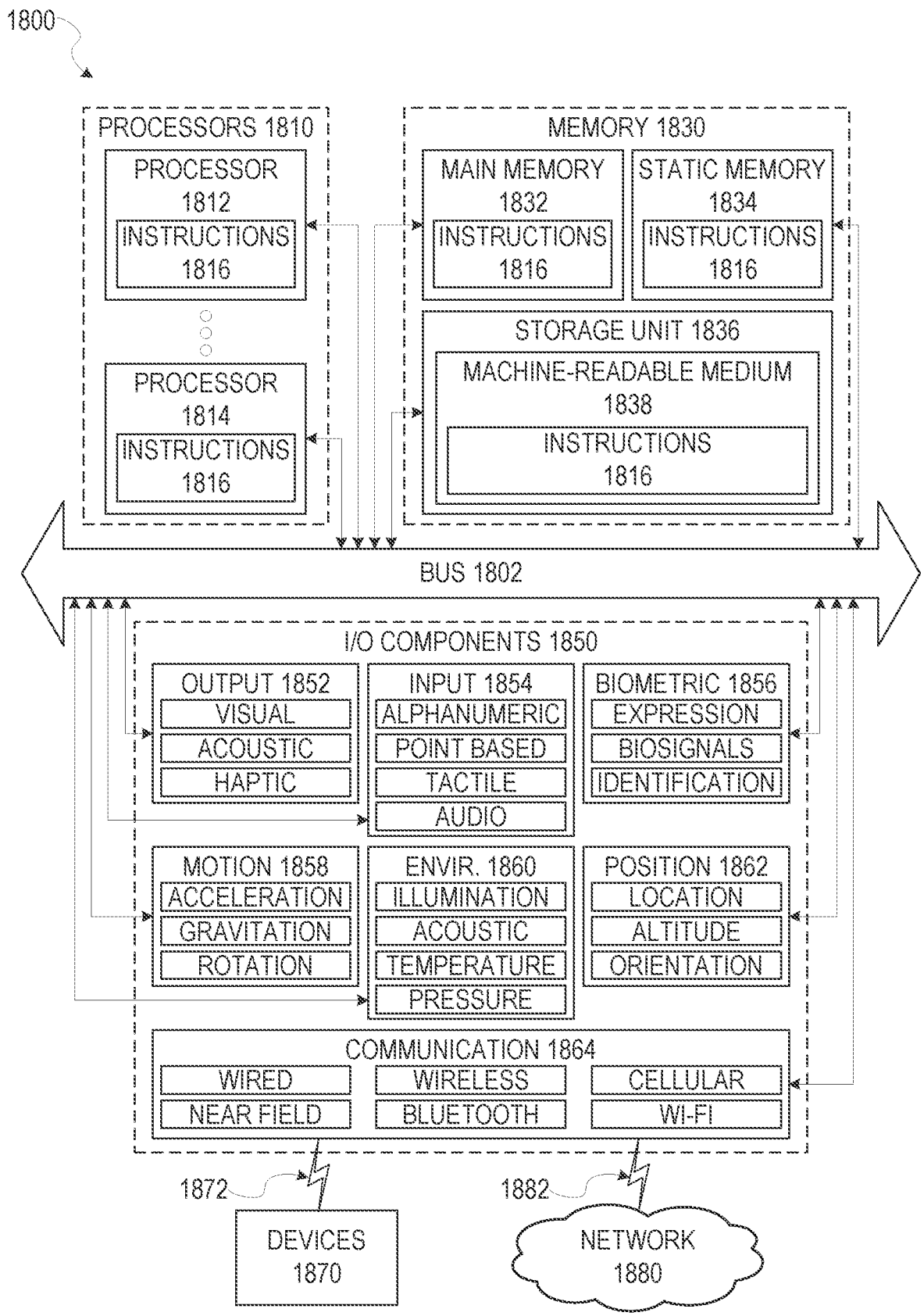
FIG. 18 illustrates a diagrammatic representation of a machine in the form of a computer system within which a set of instructions may be executed for causing the machine to perform any one or more of the methodologies discussed herein, according to an example embodiment.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application 1710, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server machine 122, 124 or a client 110, 170 in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

In various embodiments, the machine 1800 comprises processors 1810, memory 1830, and I/O components 1850, which can be configured to communicate with each other via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1812 and a processor 1814 that may execute the instructions 1816. The term "processor" is intended to include multi-core processors 1810 that may comprise two or more independent processors 1812, 1814 (also referred to as "cores") that can execute instructions 1816 contemporaneously. Although FIG. 18 shows multiple processors 1810, the machine 1800 may include a single processor 1810 with a single core, a single processor 1810 with multiple cores (e.g., a multi-core processor 1810), multiple processors 1812, 1814 with a single core, multiple processors 1810, 1812 with multiples cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1838 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1838.

As used herein, the term "memory" refers to a machine-readable medium 1838 able to store data temporarily or permanently and may be taken to include, but not be limited to, random-access memory (RAM), read-only memory (ROM), buffer memory, flash memory, and cache memory. While the machine-readable medium 1838 is shown, in an example embodiment, to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions 1816, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1870 may be another machine 1800 or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1880 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1838 is non-transitory (in other words, not having any transitory signals) in that it does not embody a propagating signal. However, labeling the machine-readable medium 1838 "non-transitory" should not be construed to mean that the medium is incapable of movement; the medium 1838 should be considered as being transportable from one physical location to another. Additionally, since the machine-readable medium 1838 is tangible, the medium 1838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
causing display of a first set of content elements;
causing display of a first set of advertising elements after the first set of content elements have been displayed;
automatically determining to display a second set content elements following display of the first set of advertising elements, based on a target ratio of advertising display time to content display time being met using respective display times for the first set of advertising elements and the first set of content elements; and
displaying, based on the automatically determining, the second set of content elements following display of the first set of advertising elements.

2. The method of claim 1, wherein user-skipped portions for the first set of advertising elements were skipped in response to user input, and
wherein the display time for the first set of advertising elements is based on adding advertising elements to the first set of advertising elements, in response to the user input to skip portions for the first set of advertising elements.

3. The method of claim 1, wherein the display time for the first set of advertising elements is subject to a maximum continuous number of advertising elements.

4. The method of claim 1, further comprising:
causing a second set of advertising elements to be displayed after the second set of content elements have been displayed;
determining that the target ratio is met with respect to display time for the second set of advertising elements compared to display time for the second set of content elements, based at least in part on user-skipped portions for the second set of advertising elements; and
causing, based on determining that the target ratio is met with respect to display time for the second set of advertising elements, display of a third set of content elements following display of the second set of advertising elements.

5. The method of claim 1, further comprising:
selecting the first set of content elements from a plurality of content sources; and
selecting the second set of content elements from the plurality of content sources.

6. The method of claim 5, wherein the first set of content elements is selected based on quality scores relating to media content of individual content elements within the first set of content elements, and
wherein the second set of content elements is selected based on quality scores relating to media content of individual content elements within the second set of content elements.

7. The method of claim 1, wherein each of the first and second sets of content elements comprises a preset number of content elements.

8. A system comprising:
a processor; and
a memory storing instructions that, when executed by the processor, configure the processor to perform operations comprising:
causing display of a first set of content elements;
causing display of a first set of advertising elements after the first set of content elements have been displayed;
automatically determining to display a second set content elements following display of the first set of advertising elements, based on a target ratio of advertising display time to content display time being met using respective display times for the first set of advertising elements and the first set of content elements; and
displaying, based on the automatically determining, the second set of content elements following display of the first set of advertising elements.

9. The system of claim 8, wherein user-skipped portions for the first set of advertising elements were skipped in response to user input, and
wherein the display time for the first set of advertising elements is based on adding advertising elements to the first set of advertising elements, in response to the user input to skip portions for the first set of advertising elements.

10. The system of claim 8, wherein the display time for the first set of advertising elements is subject to a maximum continuous number of advertising elements.

11. The system of claim 8, the operations further comprising:
causing a second set of advertising elements to be displayed after the second set of content elements have been displayed;

determining that the target ratio is met with respect to display time for the second set of advertising elements compared to display time for the second set of content elements, based at least in part on user-skipped portions for the second set of advertising elements; and causing, based on determining that the target ratio is met with respect to display time for the second set of advertising elements, display of a third set of content elements following display of the second set of advertising elements.

12. The system of claim 8, the operations further comprising:
selecting the first set of content elements from a plurality of content sources; and
selecting the second set of content elements from the plurality of content sources.

13. The system of claim 12, wherein the first set of content elements is selected based on quality scores relating to media content of individual content elements within the first set of content elements, and
wherein the second set of content elements is selected based on quality scores relating to media content of individual content elements within the second set of content elements.

14. The system of claim 8, wherein each of the first and second sets of content elements comprises a preset number of content elements.

15. A non-transitory computer-readable storage medium, the computer-readable storage medium including instructions that when executed by a computer, cause the computer to perform operations comprising:
causing display of a first set of content elements;
causing display of a first set of advertising elements after the first set of content elements have been displayed;
automatically determining to display a second set content elements following display of the first set of advertising elements, based on a target ratio of advertising display time to content display time being met using respective display times for the first set of advertising elements and the first set of content elements; and
displaying, based on the automatically determining, the second set of content elements following display of the first set of advertising elements.

16. The non-transitory computer-readable storage medium of claim 15, wherein user-skipped portions for the first set of advertising elements were skipped in response to user input, and
wherein the display time for the first set of advertising elements is based on adding advertising elements to the first set of advertising elements, in response to the user input to skip portions for the first set of advertising elements.

17. The non-transitory computer-readable storage medium of claim 15, wherein the display time for the first set of advertising elements is subject to a maximum continuous number of advertising elements.

18. The non-transitory computer-readable storage medium of claim 15, the operations further comprising:
causing a second set of advertising elements to be displayed after the second set of content elements have been displayed;
determining that the target ratio is met with respect to display time for the second set of advertising elements compared to display time for the second set of content elements, based at least in part on user-skipped portions for the second set of advertising elements; and
causing, based on determining that the target ratio is met with respect to display time for the second set of advertising elements, display of a third set of content elements following display of the second set of advertising elements.

19. The non-transitory computer-readable storage medium of claim 15, the operations further comprising:
selecting the first set of content elements from a plurality of content sources; and
selecting the second set of content elements from the plurality of content sources.

20. The non-transitory computer-readable storage medium of claim 15, wherein the first set of content elements is selected based on quality scores relating to media content of individual content elements within the first set of content elements, and
wherein the second set of content elements is selected based on quality scores relating to media content of individual content elements within the second set of content elements.

* * * * *